US012769278B2

(12) United States Patent
Mikhailov et al.

(10) Patent No.: US 12,769,278 B2
(45) **Date of Patent: *Oct. 20, 2026**

(54) SYSTEM AND METHOD FOR AUTONOMOUS INSPECTION FOR ASSET MAINTENANCE AND MANAGEMENT

(71) Applicant: EXPLORATION ROBOTICS TECHNOLOGIES INC., Houston, TX (US)

(72) Inventors: Oleg Mikhailov, Piedmont, CA (US); Richard Clarke, Houston, TX (US); Dmitri Kossakovski, S. Pasadena, CA (US); Yaroslav Shchekaturov, Toronto (CA)

(73) Assignee: Exploration Robotics Technologies Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/193,389

(22) Filed: Apr. 29, 2025

(65) Prior Publication Data

US 2025/0321561 A1 Oct. 16, 2025

Related U.S. Application Data

(63) Continuation of application No. 17/735,563, filed on May 3, 2022, now Pat. No. 12,292,725.

(Continued)

(51) Int. Cl.

*G05D 109/20* (2024.01)
*G05B 19/406* (2006.01)

(Continued)

(52) U.S. Cl.

CPC ......... *G05B 19/406* (2013.01); *G05D 1/2465* (2024.01); *G05D 1/661* (2024.01);

(Continued)

(58) Field of Classification Search

None

See application file for complete search history.

(56) References Cited

U.S. PATENT DOCUMENTS 7,357,179 B2 4/2008 Zheng et al.
8,242,445 B1 8/2012 Scanlon et al.

(Continued)

FOREIGN PATENT DOCUMENTS

CA 3039506 A1 4/2018
EP 3996058 A1 5/2022

(Continued)

OTHER PUBLICATIONS

Office Action for Canadian Patent Application No. 3172561, mailed Aug. 7, 2025, 4 pages.

(Continued)

*Primary Examiner* — Jennifer L Norton

(74) *Attorney, Agent, or Firm* — Withrow + Terranova, PLLC; Vincent K. Gustafson

(57) ABSTRACT

A method for performing an autonomous inspection comprises traversing, by an autonomous sensor apparatus, a path through a site having three-dimensional objects located therein. The method comprises obtaining, by a plurality of sensors on-board the autonomous sensor apparatus, one or more data sets throughout the path. Each of the one or more data sets are associated with an attribute of one or more three-dimensional objects. The method comprises generating, by the first, second, or third processor, a working model from a collocated data set; and comparing, by the first, second, or third processor, the working model with one or more pre-existing models; to determine the presence and/or absence of anomalies. The presence and/or absence of anomalies are communicated as human-readable instructions.

17 Claims, 18 Drawing Sheets

Related U.S. Application Data

(60) Provisional application No. 63/307,879, filed on Feb. 8, 2022, provisional application No. 63/242,818, filed on Sep. 10, 2021.

(51) Int. Cl.

*G05D 1/246* (2024.01)
*G05D 1/661* (2024.01)
*G05D 109/10* (2024.01)

(52) U.S. Cl.

CPC .............. *G05B 2219/32197* (2013.01); *G05D 2109/10* (2024.01); *G05D 2109/20* (2024.01)

(56) References Cited

U.S. PATENT DOCUMENTS

| | | | |
|---|---|---|---|
| 8,625,854 | B2 | 1/2014 | Valkenburg et al. |
| 8,872,818 | B2 | 10/2014 | Freeman et al. |
| 8,929,176 | B2 | 1/2015 | Debrunner et al. |
| 8,942,062 | B2 | 1/2015 | Debrunner et al. |
| 9,082,015 | B2 | 7/2015 | Christopulos et al. |
| 9,129,355 | B1 | 9/2015 | Harvey et al. |
| 9,262,789 | B1 | 2/2016 | Tofte |
| 9,607,370 | B2 | 3/2017 | Freeman |
| 9,619,691 | B2 | 4/2017 | Pang et al. |
| 9,672,446 | B1 | 6/2017 | Vallespi-Gonzalez |
| 9,709,394 | B2 | 7/2017 | Schoner et al. |
| 10,055,831 | B2 | 8/2018 | Loveland et al. |
| 10,108,867 | B1 | 10/2018 | Vallespi-Gonzalez et al. |
| 10,127,685 | B2 | 11/2018 | Qian et al. |
| 10,186,049 | B1 | 1/2019 | Boardman et al. |
| 10,260,875 | B2 | 4/2019 | Schoner et al. |
| 10,351,240 | B1 | 7/2019 | Sills et al. |
| 10,586,385 | B2 | 3/2020 | Moghadam et al. |
| 10,846,511 | B2 | 11/2020 | Ozkucur et al. |
| 10,913,154 | B2 | 2/2021 | Tan et al. |
| 11,435,746 | B1 | 9/2022 | Ebrahimi Afrouzi et al. |
| 11,480,521 | B2 * | 10/2022 | Alkadi .................. G01N 21/39 |
| 12,292,725 | B2 * | 5/2025 | Mikhailov ........... G05B 19/406 |
| 12,346,121 | B2 * | 7/2025 | Heinzle .................. G01S 17/42 |
| 2001/0022614 | A1 | 9/2001 | Iida et al. |
| 2009/0138140 | A1 | 5/2009 | Pinney |
| 2014/0067333 | A1 | 3/2014 | Rodney et al. |
| 2014/0267627 | A1 | 9/2014 | Freeman et al. |
| 2014/0270492 | A1 | 9/2014 | Christopulos et al. |
| 2016/0019108 | A1 | 1/2016 | Banerjee et al. |
| 2017/0028561 | A1 | 2/2017 | Yamada et al. |
| 2017/0192424 | A1 * | 7/2017 | Poole ..................... G01C 21/20 |
| 2017/0322551 | A1 | 11/2017 | Zang |
| 2018/0002010 | A1 | 1/2018 | Bauer et al. |
| 2018/0095458 | A1 | 4/2018 | Sharber et al. |
| 2018/0130196 | A1 | 5/2018 | Loveland et al. |
| 2018/0321692 | A1 | 11/2018 | Castillo-Effen et al. |
| 2018/0329433 | A1 | 11/2018 | Zhao et al. |
| 2018/0329904 | A1 | 11/2018 | Gupta et al. |
| 2018/0357932 | A1 * | 12/2018 | Zavesky ................ G01V 11/00 |
| 2019/0066283 | A1 | 2/2019 | Gros et al. |
| 2019/0096069 | A1 | 3/2019 | Qian et al. |
| 2019/0108396 | A1 | 4/2019 | Dal Mutto et al. |
| 2019/0145765 | A1 | 5/2019 | Luo et al. |
| 2019/0188521 | A1 | 6/2019 | Barzelay et al. |
| 2019/0242696 | A1 | 8/2019 | McAleenan et al. |
| 2019/0248487 | A1 | 8/2019 | Holtz et al. |
| 2019/0253623 | A1 | 8/2019 | Lim et al. |
| 2020/0019167 | A1 | 1/2020 | Alshamrani et al. |
| 2020/0045880 | A1 | 2/2020 | Letsky |
| 2020/0066034 | A1 | 2/2020 | Tham et al. |
| 2020/0082168 | A1 | 3/2020 | Fathi et al. |
| 2020/0103552 | A1 * | 4/2020 | Phelan .................... G01W 1/10 |
| 2020/0174129 | A1 | 6/2020 | Abdelkader et al. |
| 2020/0219234 | A1 | 7/2020 | Sotodate |
| 2020/0250944 | A1 * | 8/2020 | Griffis .................... G08B 13/19 |
| 2020/0258207 | A1 * | 8/2020 | Gros ......................... G06T 7/40 |
| 2020/0279320 | A1 | 9/2020 | Stewart |
| 2020/0306969 | A1 | 10/2020 | Bryner et al. |
| 2020/0333466 | A1 | 10/2020 | Hansen et al. |
| 2020/0401138 | A1 | 12/2020 | Rentz et al. |
| 2021/0102861 | A1 * | 4/2021 | Ellis ........................ G01M 3/16 |
| 2021/0173414 | A1 * | 6/2021 | Starr ....................... B60L 58/12 |
| 2021/0357664 | A1 | 11/2021 | Kocer et al. |
| 2022/0004672 | A1 | 1/2022 | Santarone et al. |
| 2022/0024577 | A1 | 1/2022 | Stamatovski |
| 2022/0050461 | A1 | 2/2022 | Karachalios et al. |
| 2022/0107977 | A1 | 4/2022 | Marthouse et al. |
| 2022/0157136 | A1 | 5/2022 | Metzler et al. |
| 2022/0169381 | A1 * | 6/2022 | Alrasheed .............. B64U 10/13 |
| 2022/0214702 | A1 * | 7/2022 | Ortiz .................... G05D 1/0011 |
| 2022/0383128 | A1 | 12/2022 | Gonzales et al. |
| 2023/0008107 | A1 * | 1/2023 | Duke ................... G05D 1/0094 |
| 2023/0055428 | A1 | 2/2023 | Nordell et al. |
| 2023/0079054 | A1 | 3/2023 | Mikhailov et al. |
| 2023/0221695 | A1 | 7/2023 | Shao et al. |
| 2024/0201240 | A1 | 6/2024 | Blanc-Paques et al. |
| 2024/0361124 | A1 | 10/2024 | Michini et al. |
| 2024/0377808 | A1 * | 11/2024 | Korablev ........... G05B 19/4069 |

FOREIGN PATENT DOCUMENTS

| | | | |
|---|---|---|---|
| JP | 2004005449 | A | 1/2004 |
| WO | 2016033797 | A1 | 3/2016 |
| WO | 2020088739 | A1 | 5/2020 |
| WO | 2022098407 | A1 | 5/2022 |

OTHER PUBLICATIONS

Intention to Grant for European Patent Application No. 22194426.7, mailed Oct. 21, 2025, 8 pages.

Office Action for Canadian Patent Application No. 3172561, mailed Oct. 27, 2023, 9 pages.

European Search Report for European Patent Application No. 22194426.7, mailed Jan. 23, 2023, 11 pages.

Examination Report for European Patent Application No. 22194426.7, mailed Nov. 25, 2024, 5 pages.

* cited by examiner

SYSTEM AND METHOD FOR AUTONOMOUS INSPECTION FOR ASSET MAINTENANCE AND MANAGEMENT

CROSS-REFERENCE TO RELATED APPLICATIONS

This application is a continuation of U.S. patent application Ser. No. 17/735,563 filed on May 3, 2022 and subsequently issuing as U.S. Pat. No. 12,292,725, which claims priority to each of U.S. Provisional Patent Application No. 63/307,879 filed on Feb. 8, 2022 and U.S. Provisional Patent Application No. 63/242,818 filed on Sep. 10, 2021, wherein the entire contents of the foregoing applications and patent are hereby incorporated by reference herein.

TECHNICAL FIELD

The present teachings generally relate to a system and method for autonomous inspection for asset maintenance and management. The system and method may be advantageous in performing inspections and comparing present inspections to prior inspections to identify similarities and/or differences in three-dimensional objects between different times. The system and method may be advantageous in identifying anomalies to be addressed and enables intuitive communication to operations and maintenance personnel.

BACKGROUND

Inspections of manufactured articles, equipment, facilities, and the like is conventionally performed in-person, by inspectors. Inspectors use various senses such as sight, touch, hearing, and smell to observe various characteristics of objects. In addition, inspectors sometimes use specialized metrology equipment to measure various physical characteristics of the objects. However, in-person inspection is a time-consuming process that involves an inspector traveling to various locations, traversing an entire site, observing many different objects, recording observations, and attributing each observation to a specific object. Physiological observations, such as those related to sight, touch, hearing, and smell are also prone to human error and cannot be precisely compared between different days and between different observers. Furthermore, specialized metrology equipment can be subject to limitations in data volume because captured data is normally confined to small areas on the surfaces of objects. A single measurement on a single surface provides limited insight as to physical characteristics of objects as a whole. It is often impractical to capture data of an entire object that is large or complex from various positions and/or angles. Even if data is captured of an entire object, organizing data to recall which particular data point was obtained from a particular surface of an object takes care, attention, and an abundance of time. The investment in time grows even larger if many of such objects must be inspected and if many different types of measurements must be recorded for each and every object or if the object must be inspected repeatedly at different times. Because of the amount of human labor involved in inspections, they can be time consuming and costly.

Extrapolating useful information from the aforementioned inspections can be an arduous process. Inspectors generally review all of their notes, pick out relevant details, cross-reference some details with others in order to confirm their conclusions, and generate summarized reports that distill an abundance of observed information into comprehensively manageable briefs. This endeavor can be further complicated if objects are repeatedly inspected at various subsequent points in time. In this case, sometimes inspectors must cross-reference notes from current inspections with notes from one or more preceding inspections in order to glean what similarities and differences exist between the temporally distinct inspections. In some instances, missing details can spoil some or all of the data. For example, if the identity of an object is not recorded, then all of the data associated with said subject loses meaning because issues cannot be traced back to their source. Furthermore, the accuracy of anomaly detection can vary widely. Inspector's observations may be prone to human error (e.g., overlooking details) or the detection of certain anomalies may be outside of the capabilities of the inspector's senses, or the metrology equipment employed.

Digital measurement recording can provide a wealth of information. However, an increased volume of information may not be without certain limitations. The more information that must be recorded, processed, and analyzed, the larger the digital file sizes and consequently the longer it takes to transmit data between computing devices, process the data, and render visualizations of the data. Furthermore, data storage, whether provided locally or by cloud services, can be expensive. In the case where a historical database of many prior inspections is typically maintained, the costs of maintaining the database can become unmanageable and/or a financial burden.

The speed of data communication is typically limited by the bandwidth available. Furthermore, data communication can be expensive where relatively large quantities of data are involved. Inspections with sensors such as cameras can accumulate large quantities of data dependent on the scale of the objects or sites being inspected, the different types of data being captured by different types of sensors, and/or the resolution of the data accumulated. Due to communication speed requirements and bandwidth availability, it may not be practical to transmit large quantities of data over a network. Edge computing, as defined herein, may provide a solution by concentrating the computational processing in computer devices located in the field (e.g., at a site) and/or distributing computation between various devices. By such edge computing, data sets may be drastically reduced in size (e.g., 10× or more, 50× or more, 100× or more, or even 1,000× or more reduction in size). The reduced-size data then may be suitable to transmit over a network to other computing devices. As a result, information may be communicated in a time-sensitive manner and costs may be managed.

It would be desirable to provide a system and method that autonomously performs inspections. It would be desirable to provide a system and method that autonomously performs operations on sensed data to distill the data into an easily comprehensible format to aid inspectors in their review. It would be desirable to provide a system and method that utilizes multiple types of sensors that capture data that would otherwise be obtained through physiological observations and specialized metrology equipment. It would be desirable to provide a system and method that collocates sensed data in order to associate multiple types of data points with points in physical space on and/or in an object. It would be desirable to provide a system and method that can autonomously identify objects by comparisons of collocated data. It would be desirable to provide a system and method that cross-references two or more different, temporally distinct inspections and indicates to users the similarities and differences of objects between inspections. It would be desirable to provide a system and method that cross-references collocated data with pre-fabricated digital models and indicates to users the similarities and differences of objects as compared to the pre-fabricated digital models. It would be desirable to provide a system and method that processes data in substantially real-time, after data collection, in order to manage the time, cost, and hardware demands of data transmission, processing, and visualization. It would be desirable to provide a system and method that performs calculations and/or corrections on data to produce accurate and precise digital models of objects. It would be desirable to provide a system and method that utilizes edge computing to process data into a manageable size for network communication. The present application is directed towards a system and method for achieving one or any combination of the above desired objectives.

SUMMARY

The present disclosure relates to a method for performing an autonomous inspection, which may satisfy at least some of and possibly all the desired objectives above. The method may comprise departing, by an autonomous sensor apparatus, a docking station. The method may comprise traversing, by the autonomous sensor apparatus, a path through a site having three-dimensional objects located therein. The method may comprise obtaining, by a plurality of sensors on-board the autonomous sensor apparatus, one or more data sets throughout the path, each of the one or more data sets associated with an attribute of one or more three-dimensional objects. The method may comprise locating and traveling to a proximity of, by the autonomous sensor apparatus, the three dimensional objects. The method may comprise orienting toward, by the autonomous sensor apparatus and/or the plurality of sensors, the three-dimensional objects. The method may comprise returning, by the autonomous sensor apparatus, to the docking station. While the above steps may be recited herein together, not all of the above steps are necessary or essential to be employed with the other above steps. While the above steps may be recited herein together with other steps, not all steps are necessary or essential to be employed with the above steps.

The method may comprise pre-processing, by a first, second, or third processor, the one or more data sets. The method may comprise collocating, by the first, second, or third processor, the one or more data sets to produce a collocated data set. The method may comprise generating, by the first, second, or third processor, a working model from the collocated data set. The method may comprise determining, by the first, second, or third processor, an identity of the one or more three-dimensional objects embodied by the working model. The method may comprise comparing, by the first, second, or third processor, the working model with one or more pre-existing models to determine the presence and/or absence of anomalies. While the above steps may be recited herein together, not all of the above steps are necessary or essential to be employed with the other above steps. While the above steps may be recited herein together with other steps, not all steps are necessary or essential to be employed with the above steps.

The method may comprise defining, by the first, second, or third processor, the criticality of the anomalies and the actions required for human operators to address them. The method may comprise communicating, by the first, second, or third processor, through a digital communication network (e.g., cellular network, satellite link, etc.) the human-readable instructions to address the anomalies to one or more computer devices (e.g., mobile, or stationary) accessible by human operators. The method may comprise receiving, by a computing device, human-readable instructions to address the anomalies, a location of the one or more three-dimensional objects having the anomalies, and optionally an overlay model. The overlay model may have a size that is about 5 to 6 orders of magnitude less than the one or more data sets. While the above steps may be recited herein together, not all of the above steps are necessary or essential to be employed with the other above steps. While the above steps may be recited herein together with other steps, not all steps are necessary or essential to be employed with the above steps.

The step of the autonomous sensor apparatus departing the docking station through the step of determining the identity of the one or more three-dimensional objects embodied by the working model may be repeated for one or more iterations.

The one or more pre-existing models may be constructed of one or more prior data sets obtained earlier in time relative to the one or more data sets or are constructed by computer assisted design software. The identity of the one or more pre-existing models may be pre-identified by a human operator.

The method may comprise receiving, by the first, second, and/or third processor, an input from the human operator of the identity of the one or more pre-existing models. The one or more pre-existing models may be fabricated by computer assisted design software.

The one or more prior data sets may be independent from the one or more data sets.

A prior autonomous sensor apparatus obtaining the one or more data sets may be different from or the same as the autonomous sensor apparatus that obtained the one or more data sets.

The plurality of sensors obtaining the one or more prior data sets may be different types of sensors from the plurality of sensors obtaining the one or more data sets.

The method may comprise retrieving, by the first, second, or third processor, the one or more pre-existing models from a first, second, or third storage medium. The first storage medium may be located on-board the autonomous sensor apparatus. The second storage medium may be located on-board the docking station. The third storage medium may be located on-board a computing device. The computing device may be located remote from the autonomous sensor apparatus and the docking station.

The path or portions thereof may be pre-defined, directed by artificial intelligence, or both.

The plurality of sensors may include at least a camera sensor and one or more additional camera sensors, LiDAR sensors, thermal sensors, acoustic sensors, vibration sensors, chemical sensors, or any combination thereof.

The plurality of attributes may include at least a visual signature and a thermal signature, an acoustic signature, a vibration signature, a chemical signature, or any combination thereof.

The plurality of attributes for normal operating conditions of the three-dimensional objects may be defined on the one or more pre-existing models. The method may comprise autonomously determining, by the first, second, or third processor, differences between a current state of the plurality of attributes and the normal operating conditions of the plurality of attributes.

The method may comprise autonomously determining, by the first, second, or third processor, differences between a current state of the plurality of attributes and the normal operating conditions of the plurality of attributes.

The differences between the current state of the plurality of attributes and the normal operating conditions of the plurality of attributes may be classified as anomalies.

The method may comprise ranking, by the first, second, or third processor, the anomalies according to multiple levels of criticality (e.g., emergency, critical, and/or non-critical).

The method may comprise determining, by the first, second, or third processor, a timing and manner of communication of the anomalies in accordance with the level of criticality assigned to the anomalies.

The communication of the human-readable instructions may be performed by radio, telephone, text message, email, the like, or any combination thereof.

The method may comprise communicating a record of the anomalies and a record of normal operating conditions to a Computerized Maintenance Management System associated with the site.

The method may comprise toggling, by the human operator via the computing device, between different views of the overlay model. Each of the different views may depict a different attribute. The overlay models may be displayed on a graphical user interface of the computing device.

The method may comprise toggling, by the human operator via the computing device, between different overlay models of different three-dimensional objects. The overlay models may be displayed on a graphical user interface of the computing device.

The method may comprise exploring, by the human operator via the computing device, the overlay model by rotation of an X, Y, Z coordinate space, zooming in, zooming out, panning, or any combination thereof. The overlay model may be displayed on a graphical user interface of the computing device.

The method may comprise applying, by the first, second, or third processor, visual indicators onto the overlay model, the visual indicators identifying the location of anomalies on the overlay model.

The first processor, second processor, and/or the third processor may be located on-board the autonomous sensor apparatus, docking station, and/or computing device.

The first processor may be located on-board the autonomous sensor apparatus. The second processor may be located on-board the docking station. The third processor may be located on-board a computing device. The computing device may be located remote from the autonomous sensor apparatus and the docking station.

The autonomous sensor apparatus may be engaged with the docking station prior to departing therefrom and upon returning thereto.

The autonomous sensor apparatus, when engaged with the docking station, may signally communicate with the docking station via a wired and/or wireless connection.

The docking station may signally communicate with the computing device via a wired and/or wireless connection.

The step of pre-processing may comprise one or more of: (a) discarding, by the first, second, or third processor, extraneous data in the one or more data sets to reduce the digital memory size occupied by the one or more data sets on a memory storage medium, the extraneous data not being associated with the one or more three-dimensional objects; (b) combining, by the first, second, or third processor, data sub-sets, the data sub-sets being associated with redundant data obtained by each of the plurality of sensors, to reduce the digital memory size occupied by the one or more data sets on a memory storage medium and/or reduce noise of the one or more data sets; (c) compensating, by the first, second, or third processor, for differences in illuminance with two-dimensional image data; (d) compressing, by the first, second, or third processor, the one or more data sets; (e) correcting the one or more data sets for a positional variance between each of the plurality of sensors; (f) calculating, by the first, second, or third processor, a mean of quantitative values associated with each of one or more points in physical space obtained from a plurality of different positions along the path; and (g) correcting, by the first, second, or third processor, for an angle of incidence of the plurality of sensors relative to one or more points in physical space, the angle of incidence being defined by a position of the plurality of sensors relative to an orthogonal axis of the one or more points in physical space.

The positional variance may be corrected by a distance between each of the plurality of sensors. The positional variance may be corrected by a distance between each of the plurality of sensors and a point of reference.

The model may be generated by first determining the location of the plurality of sensors with respect to the one or more three-dimensional objects (e.g., via visual data) and then projecting the one or more data sets onto the model.

The method may comprise comparing ("joint analysis"), by the first, second, or third processor, two or more collocated data sub-sets to identify an underlying cause of the anomalies.

The identity determining step may comprise either: (a) autonomously interpreting, by a processor, the collocated data set, by comparison to one or more pre-existing models, to determine an identity of the one or more three-dimensional objects associated with the working model; or (b) receiving an input, from a user, of the identity of the one or more three-dimensional objects associated with the one or more first three-dimensional models.

The step of determining the identity, the step of comparing the working model, or both may utilize a neural network.

The three-dimensional objects may be manufactured objects.

The three-dimensional objects may include consumer articles, industrial equipment, residential facilities, commercial facilities, resource supply infrastructure, transportation infrastructure, or any combination thereof.

The plurality of sensors may be able to rotate and/or linearly translate relative to the autonomous sensor apparatus.

The step of locating, by the autonomous sensor apparatus, and orienting, by the autonomous sensor apparatus may be performed, at least in part, by: (a) utilizing, by the first, second, or third processor, the one or more pre-existing models of the three-dimensional objects to detect the positions of the three-dimensional objects within the site; and (b) utilizing, by the first, second, or third processor, the detected positions of the three-dimensional objects to direct the autonomous sensor apparatus to the proximity of the three-dimensional objects.

The step of orienting, by the plurality of sensors, is performed, at least in part, by utilizing the detected positions of the three-dimensional objects to direct the plurality of sensors on the autonomous sensor apparatus to the direction of the three-dimensional objects. The orienting step may be performed with the objective of achieving the best measurements of the three-dimensional objects' properties by the plurality of sensors.

The overlay model may be an overlay of the working model and one or more pre-existing models.

One or any combination of the above steps may be performed autonomously.

The present disclosure provides for a system for collocating sensed data of one or more three-dimensional objects.

The system may comprise one or more autonomous sensor apparatuses. The one or more sensor apparatuses may comprise a plurality of sensors. The system may comprise one or more docking stations. The one or more docking stations may be located within or proximate to a site. The system may comprise one or more computing devices.

Each of the one or more autonomous sensor apparatuses, docking stations, and computing devices may comprise one or more processors and/or one or more memory storage media. The memory storage media may be non-transient.

The one or more autonomous sensor apparatuses, docking stations, and computing devices may be in signal communication with one another.

The signal communication may be wired and/or wireless.

One or any combination of the aforementioned method steps may be performed by the one or more autonomous sensor apparatuses, docking stations, computing devices, or any combination thereof.

DETAILED DESCRIPTION

Figure 1:
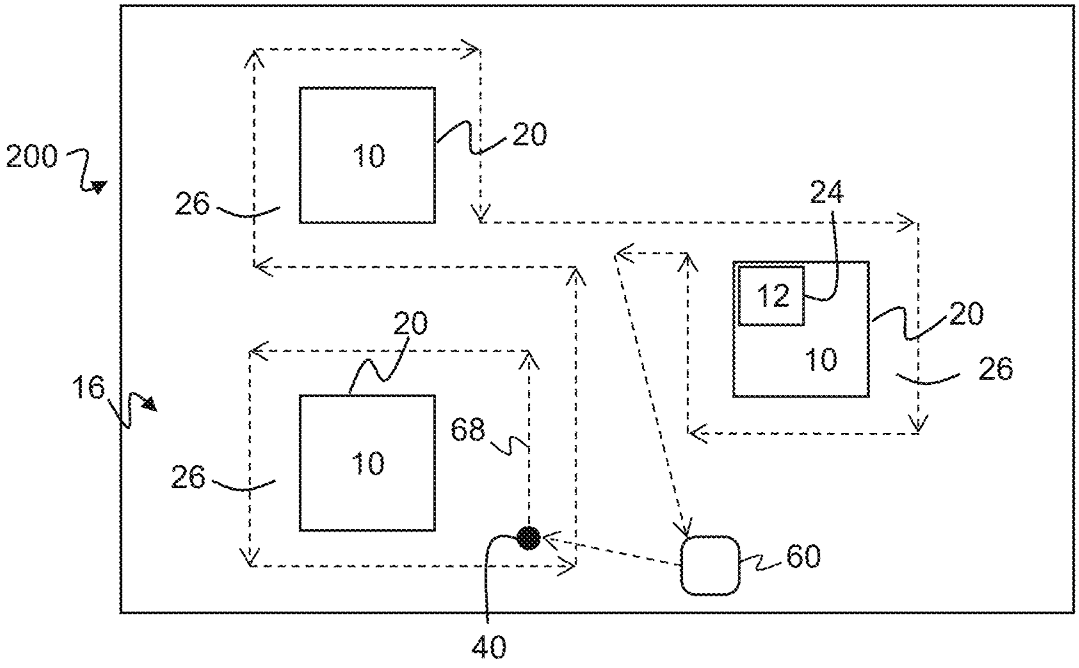
FIG. 1 shows a plan view of a roving operation of a sensor apparatus.

The present teachings meet one or more of the above needs by the improved system and method described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Introduction

The present disclosure provides for a system and method for autonomous inspection for asset maintenance and management. The system may include one or more sensor apparatuses comprising a plurality of sensors. The plurality of sensors may capture data associated with three-dimensional objects. The sensor apparatuses may cooperate with one or more docking stations to at least communicate data. The sensor apparatuses and/or docking stations may communicate data to one or more computing devices. The system may comprise processors that carry out computer-readable instructions corresponding to the method of the present disclosure. The processors may be located on-board the sensor apparatuses, docking stations, computing devices, or any combination thereof. The computer-readable instructions may be stored on one or more non-transitory storage media. The non-transitory storage media may be located on-board the sensor apparatuses, docking stations, computing devices, or any combination thereof. All or at least part of the method may be performed autonomously, in real-time, or both. All or at least part of the method may be free of user direction and/or interaction. The system and method may provide users with visual reproductions (models) of three-dimensional objects accompanied by visual indicators that convey similarities and/or differences of an object between two temporally distinct inspections.

Three-Dimensional Object

The present disclosure provides for a method and system for autonomous inspection for asset maintenance and management. The assets may be referred to herein as three-dimensional objects ("objects"). The three-dimensional objects may be manufactured objects. The manufactured object may include one or more consumer articles, industrial equipment, residential facilities, commercial facilities, resource supply infrastructures, transportation infrastructures, the like, or any combination thereof. The three-dimensional objects may be commodities used to produce manufactured objects.

The consumer articles may include any article commercially available to consumers. The consumer articles may include vehicles, household appliances, furniture, construction equipment, the like, or any combination thereof.

The industrial equipment may include any equipment commercially available to businesses. The industrial equipment may include metalworking machines (e.g., computer numerical control (CNC) machines), robotic automation systems, HVAC units, conveyors, ovens, coolers, compressed air tanks, storage containers, the like, or any combination thereof.

The residential facilities may include any type of residential dwelling. The residential facilities may include apartment buildings, condominiums, houses, the like, or any combination thereof.

The commercial facilities may include any type of site used in the course of business. For example, the commercial facilities may include office buildings, retail buildings, restaurants, manufacturing factories, chemical factories, laboratories, natural resource extraction facilities, energy facilities, the like, or any combination thereof.

The natural resource extraction facilities may include oil rigs, oil wells, natural gas wells, mines, the like, or any combination thereof.

The energy facilities may include hydroelectric power plants, thermal power plants, solar power plants, wind power plants, the like, or any combination thereof.

The resource supply infrastructure may include power lines, power line towers, power line poles, oil pipelines, natural gas pipelines, cellular network towers, dams, the like, or any combination thereof. The transportation infrastructure may include roads, bridges, railways, transportation hubs (e.g., train stations and airports), the like, or any combination thereof.

The commodities may include, but are not limited to, agricultural commodities, energy commodities, metals, or any combination thereof. The commodities, by their physical nature, may be typically stored in containers (e.g., boxes, tubs, barrels, tanks, etc.). The commodities may be arranged in piles.

The three-dimensional objects may be at various stages of assembly. For example, a manufacturing factory may be under construction or a finished construction.

Three-dimensional objects may abut and/or be connected to one or more other three-dimensional objects, forming one or more interfaces. The one or more three-dimensional objects may be at least partially framed by one or more surrounding spaces. The surrounding spaces may be proximal to the three-dimensional objects.

The three-dimensional objects may comprise one or more surfaces. The surfaces may include any surface that is located on an exterior or interior of the one or more three-dimensional objects. The surfaces may be observable from surrounding spaces of the three-dimensional objects.

The three-dimensional objects may comprise one or more three-dimensional subcomponents.

The three-dimensional objects may be characterized by an identity, one or more properties, one or more operating conditions, or any combination thereof.

The three-dimensional objects may comprise one or more three-dimensional subcomponents ("subcomponents"). The three-dimensional subcomponents may be the constituent parts of the three-dimensional objects. For example, a vehicle may include a chassis, body, engine, transmission, electrical system, and exhaust system, each of which are three-dimensional subcomponents of the vehicle. The three-dimensional subcomponents may provide and/or enable a function for the operation, structural integrity, or both of the three-dimensional objects.

The three-dimensional subcomponents may abut and/or be connected to one or more other three-dimensional subcomponents, forming one or more interfaces. The three-dimensional subcomponents may abut and/or be connected to one or more three-dimensional objects, forming one or more interfaces. The three-dimensional subcomponents may be at least partially framed by one or more surrounding spaces. The surrounding spaces may be proximal to the one or more three-dimensional subcomponents.

The three-dimensional subcomponents may comprise one or more surfaces. The surfaces may include any surface that is located on an exterior or interior of the three-dimensional subcomponents. The surfaces may be observable from one or more surrounding spaces of the three-dimensional subcomponents.

The three-dimensional subcomponents may include one or more other three-dimensional subcomponents. It may be appreciated by a skilled artisan that objects and subcomponents thereof may be broken down into various degrees of hierarchy. For example, a CNC machine may include an electrical system, and the electrical system may include a controller.

The three-dimensional subcomponents may be characterized by an identity, one or more properties, one or more operating conditions, or any combination thereof.

The three-dimensional objects may be located within one or more sites (facilities). The sites may include one or more subdivisions of a structure, delineations of property, or both. For example, a subdivision of a structure may include a factory floor of a manufacturing factory in which machinery is located. As another example, a delineation of property may include a plot of land on which oil wells are located.

The sites may be defined by a length, a width, a height, one or more angles, or any combination thereof.

The sites may be an open site, enclosed site, or both. For example, an open site may include an oil field. As another example, an enclosed site may include an interior of a manufacturing factory.

The sites may have one or more three-dimensional objects situated therein. Three-dimensional objects may be distributed throughout the sites. Three-dimensional objects may be statically situated within the one or more sites. For example, heavy machinery may be situated within and even fastened to a floor of a site. The one or more three-dimensional objects may be movable within the one or more sites. For example, a forklift may be movable within a site. The three-dimensional objects may occupy a volume of the one or more sites. A position of the three-dimensional objects within the site may change from time to time. For example, positions of industrial equipment in manufacturing factories may be changed to improve efficiency of an assembly line or to reconfigure an assembly line for a new product. Three-dimensional objects may be added to and/or removed from the one or more sites from time to time. For example, new industrial equipment may be purchased by a manufacturing factory.

The three-dimensional objects, three-dimensional subcomponents thereof, or both may be characterized by an identity. The identity may include a common name of the objects and/or subcomponents. The common name may include a name that is attributed to all objects and/or subcomponents of their respective type, regardless of make, model, or the like. For example, the common name, "CNC machine", may encompass a large number of commercially available machinery. The identity may include a manufacturer and/or seller of the objects and/or subcomponents. The identity may include a make, model, year in which the objects and/or subcomponents were manufactured, the like, or any combination thereof. The identity may include a unit number. The unit number may be arbitrarily designated. The unit number may be particularly advantageous in distinguishing between a plurality of identical objects and/or subcomponents. For example, three identical CNC machines may be designated "CNC 1", "CNC 2", and "CNC 3". The identity may include a nickname. The nickname may be arbitrarily designated. The identity may be extrapolated from the plurality of attributes. For example, by comparing a three-dimensional model constructed from a scan of an object and comparing the same to a catalogue of CAD models, one may determine the identity of the object.

The identity of a three-dimensional object and/or subcomponent may be associated with data associated with one or more attributes. The identity may be associated with a visual signature, thermal signature, acoustic signature, vibration signature, chemical signature, or any combination thereof.

The three-dimensional objects, three-dimensional subcomponents thereof, or both may comprise a plurality of attributes. The plurality of attributes may function to characterize the physical conformation and/or condition of the objects and/or subcomponents.

The plurality of attributes may include any measurable quality associated with the objects and/or subcomponents. The plurality of attributes may be measurable as a quantity. The plurality of attributes may include one or more points in physical space, color, illuminance, thermal signature, acoustic signature, vibration signature, chemical signature, or any combination thereof. Points in physical space, color, illuminance, or any combination thereof may be referred to herein, singularly or in any combination, as a visual signature.

The points in physical space ("point cloud") may be defined by coordinates in two-dimensional space (X, Y), coordinates in three-dimensional space (X, Y, Z), or both. The one or more points in physical space may be defined by one or more reference points ("zero point"). The reference points may be arbitrarily designated. The reference points may be designated to coincide with a landmark or a point of interest. For example, a reference point may be located at an approximately geometrical center point of a space. The points in physical space may characterize a position of the three-dimensional objects, three-dimensional subcomponents thereof, or both within a site. The points in physical space may characterize a volume of a site occupied by the objects and/or subcomponents.

The points in physical space may be obtained by one or more sensors. The sensors may include global positioning system (GPS) sensors, camera sensors, LiDAR sensors, laser interferometer sensors, or any combination thereof. Since these sensors determine the points in physical space occupied by a three-dimensional object and/or subcomponents thereof, the relative positions of other sensors (e.g., thermal sensors) to these sensors may be accounted for to accurately attribute a location to the data of the other sensors. For example, the temperature of a point on a three-dimensional object may be attributed to a location determined by a LiDAR sensor offset by a position of the LiDAR sensor relative to the thermal sensor.

Color may be defined by greyscale, a color space, or both. The greyscale may include a pixel value scale of 0-255. The color space may include an RGB color space, IHS color space, the like, or any combination thereof. The color of the three-dimensional objects, three-dimensional subcomponents thereof, or both may be natural or artificial. Natural color may refer to the color of materials in their natural state. For example, iron is typically silver-grey. Artificial color may refer to the color of paint, coatings, pigments, the like, or any combination thereof that are applied onto or integrated within the one or more three-dimensional objects, three-dimensional subcomponents thereof, or both.

Illuminance may be defined by a quantity of incident light that illuminates one or more surfaces of the three-dimensional objects, three-dimensional subcomponents thereof, or both. The illuminance may characterize illuminated portions and shaded portions on the objects and/or subcomponents. The illuminance may change during the course of a day. The illuminance may result from natural light (e.g., sunlight), artificial light, intervening objects casting a shadow, or any combination thereof. The illuminance may result from direct light or reflected light.

The thermal signature may be defined by temperature, heat flux, or both. The thermal signature may result from heating elements (e.g., resistive heating wires) in the objects and/or subcomponents; electromagnetic activity of the objects and/or subcomponents; chemical processes (exothermic and/or endothermic) occurring within objects and/or subcomponents; frictional forces generated by the objects and/or subcomponents; radiant heat, originating from external sources, incident on the objects and/or subcomponents; ambient temperature surrounding the objects and/or subcomponents; the like; or any combination thereof.

The acoustic signature may be defined by sound amplitude, frequency, or both. The acoustic signature may be characterized by a time-series wavelet. The time-series wavelet may be obtained from a wavelet transform although other types of transforms are contemplated by the present teachings. The time-series wavelet may include one or more frequencies present at one or more points in time.

Raw data and/or transformed data collected at one or more points in or durations of time may be compared. Data of two or more three-dimensional objects collected in the same duration of time may be compared. For example, the acoustic signature of two identical air compressors may be compared to determine if their operating state is similar. If their operating state is not similar, one may infer that one of the air compressors is operating abnormally. Data of a three-dimensional object collected at different points in time or durations of time may be compared. For example, the acoustic signature of a three-dimensional object may be collected at a first time and data of the same three-dimensional object may be collected at a second time to determine if its operating state is generally constant over time. If the operating state is not generally constant then one may infer that at one point in or duration of time, the three-dimensional object is operating abnormally.

The acoustic signature may result from electromagnetic activity of the objects and/or subcomponents; chemical processes occurring within the objects and/or subcomponents; frictional forces generated by the objects and/or subcomponents; mechanical operation of the objects and/or subcomponents; fluid flow; sound originating from other objects and/or subcomponents reverberating off of the objects and/or subcomponents; the like; or any combination thereof.

The vibration signature may be defined by movement or oscillation of the objects and/or subcomponents about an equilibrium position. The vibration signature may result from electromagnetic activity of the objects and/or subcomponents; chemical processes occurring within the objects and/or subcomponents; frictional forces generated by the objects and/or subcomponents; mechanical operation of the objects and/or subcomponents; forces translated, by one or more external sources, to the objects and/or subcomponents; fluid flow; the like; or any combination thereof.

The chemical signature may be defined by the presence, quantity, identity, or any combination thereof of any chemical. The chemical may be used by the objects and/or subcomponents during their operation. For example, a cooler may utilize refrigerant during its operation. The chemical may be foreign to the objects and/or subcomponents. For example, a solvent may be spilled next to an object, but the solvent may not be used by the object for its operation.

The plurality of attributes may change from time to time. For example, an industrial oven may be operational at a first time resulting in a first thermal signature, and at a second time the industrial oven may not be operational resulting in a second thermal signature that is distinguishable from the first thermal signature. The plurality of attributes may be observable from one or more surfaces of the objects and/or subcomponents. The plurality of attributes may be integral to one or more surfaces of the objects and/or subcomponents. For example, points in physical space and color are integral to one or more surfaces. The plurality of attributes may be projected onto one or more surfaces of the objects and/or subcomponents. For example, a thermal signature may originate from an interior of an object and by radiant and/or conductive heating, the thermal signature may be projected onto one or more surfaces.

Quantitative measurements of the plurality of attributes may be each associated with one or more points in physical space of the objects and/or subcomponents. For example, each data point of a thermal signature may be associated with an X, Y, and Z coordinate in physical space.

Data points from different types of attributes may be associated with the same point in physical space. In this manner, three-dimensional models of the objects and/or subcomponents may be constructed. The three-dimensional models may provide a visualization of one or simultaneously any combination of the plurality of attributes.

The one or more three-dimensional objects, three-dimensional subcomponents thereof, or both may comprise one or more properties. The properties may be characterized by qualitative descriptions of the objects and/or subcomponents. The properties may be extrapolated from the plurality of attributes.

The properties may include physical conformations of the objects and/or subcomponents. The physical conformation may include the presence, absence, and/or position of a three-dimensional object or subcomponents thereof. For example, an object may have a door having an open conformation and closed conformation. As another example, a subcomponent of an object may have broken away from the object and such condition may be qualitatively described as "missing subcomponent".

The properties may include physical conditions of the objects and/or subcomponents. For example, an oven may normally operate at a specific temperature, which can be qualitatively described as "normal temperature". The physical condition may include a condition of a material. For instance, a material may be corroded, worn, abraded, the like, or any combination thereof.

The properties may include one or more operating conditions. The operating conditions may include any physical conformation and/or condition of the objects and/or subcomponents when they are operational. The operating condition may include a value or range of temperature, pressure, vibration, the like, or any combination thereof.

The one or more properties may include a stagnant condition. The stagnant condition may include any physical conformation and/or condition of the objects and/or subcomponents when they are non-operational.

The properties may be described by qualitative verbal descriptors. The qualitative verbal descriptors may include binary descriptors, scaled descriptors, or both. The binary descriptor may differentiate between two distinct physical conformations and/or conditions. For example, the binary classification of a position of a door can be "open" or "closed". The scaled descriptors may differentiate between three or more distinct physical conformations and/or conditions. For example, an oven may be "cool", "hot", or "overheated".

The properties may be extrapolated from the plurality of attributes. Two or more attributes may be associated with the same property. For example, one or more points in physical space and a thermal signature may both indicate a position of a door. Two or more attributes may be compared to confirm one or more properties associated with the one or more attributes when considered individually. The properties may be manually associated with the plurality of attributes, by a user (human operator). For example, a user may access a three-dimensional model of an object, displaying a thermal signature, and manually designate the thermal signature with one or more properties. In this manner, a historical database of three-dimensional models of objects and/or subcomponents may be created, and any future three-dimensional working model may be autonomously compared to one or more three-dimensional models in the historical database and one or more properties may be autonomously attributed to the future three-dimensional working models. The properties may be autonomously associated with the plurality of attributes. A neural network may be utilized by the system of the present disclosure to autonomously identify three-dimensional objects and/or subcomponents thereof. A neural network may be utilized by the system of the present disclosure to autonomously determine properties of the objects and/or subcomponents based upon a plurality of attributes.

System and Hardware

The present disclosure provides for a system (data collection and processing system) for autonomous inspection for asset maintenance and management. The system may function to collect data, receive data, transmit data, perform operations with data, or any combination thereof. The data may be associated with a plurality of attributes of three-dimensional objects, three-dimensional subcomponents thereof, or both.

The system may be located within a site, remote from the site, or both. The system may be movable within the site. For example, a sensor apparatus may move within a site. The data collection and processing system may be movable between sites. For example, a docking station and sensor apparatus may be moved from one site to another.

Individual elements of the system may be connected via a wired connection, wireless connection, or both. Individual elements of the system may be connected via a network. The data collected by the system may be stored locally, remotely, or both. As referred to herein, "local" or "on-board" may refer to hardware that is located physically on or within a particular element (e.g., a hard drive in a computer) and "remote" may refer to hardware that is located physically apart from a particular element (e.g., cloud storage).

The system may comprise one or more sensor apparatuses, docking stations, computing devices, application servers, database servers, diagnostic devices, or any combination thereof.

The data collection and processing system may comprise one or more sensor apparatuses. The sensor apparatuses may function to collect data, receive data, transmit data, perform operations with data, or any combination thereof. The sensor apparatus may be autonomous, as defined herein.

The sensor apparatuses may include a roving device, stationary device, or both. The roving device may be movable within a site. The roving device may comprise on-board transportation componentry. The stationary device may be free of transportation componentry. The transportation componentry may include wheels, tracks, propellers, rotors, wings, the like, or any combination thereof. The roving device may be autonomously piloted, manually piloted, or both. The roving device may be an air-mobile drone, a ground-mobile robot, the like, or any combination thereof. Operation of a roving device may be referred to herein as a roving operation.

The stationary device may be attached to a static structure. The static structure may include a frame for providing structural support, building structure, three-dimensional object, the like, or any combination thereof. The frame may be freestanding; or coupled to a building structure, three-dimensional object, or both. The stationary device may be movable on the static structure. The static structure may include one or more tracks on which the stationary device is movable. The stationary device may have a stationary location, a stationary orientation, a dynamic location, a dynamic orientation, or any combination thereof while attached to the static structure. Orientation may refer to a direction in which the stationary device and/or sensors located thereon are facing. The dynamic location may be any location confined to a static structure.

Operation of a stationary device having a stationary location while sensed objects and/or subcomponents move relative to the stationary device may be referred to as a stationary operation. Operation of a stationary device having a dynamic location while sensed objects and/or subcomponents move relative to the stationary device may be referred to as a mutually relative motion operation.

The sensor apparatuses may comprise one or more sensors, processors, storage media, batteries, power ports, data ports, network modules, location modules, user interfaces, or any combination thereof.

Data may be acquired by a plurality of sensors at different times. Data may be acquired by a plurality of sensors on-board different types of sensor apparatuses at different times. For example, data of a three-dimensional object may be obtained at a first time by a plurality of sensors on-board a ground-mobile robot and data of the same three-dimensional object may be obtained at a second time by a plurality of sensors on-board an air-mobile drone.

The one or more sensors, processors, storage media, batteries, power ports, data ports, network modules, location modules, user interfaces, or any combination thereof may be located within and/or coupled to the same housing. The housing may protect elements of the sensor apparatus from environmental conditions. The housing may be waterproof or at least water resistant. The housing may be waterproof when submerged underwater at a depth of about 10 meters or more, or even 20 meters or more. The housing may be waterproof when submerged underwater at a depth of about 60 meters or less, or even 50 meters or less.

The sensor apparatuses may traverse one or more paths. The paths may be defined in two-dimensional space, three-dimensional space, or both. The paths may at least partially surround one or more three-dimensional objects. The paths may be located above, level with, or below one or more three-dimensional, or any combination thereof.

The data sets may be acquired by the sensors irrespective of any pre-identification of the three-dimensional objects and/or sub-components. That is, since data of objects is collected in bulk while a sensor apparatus traverses a path, collocated, identified with respect to the object to which the data is associated, and compared to determine the presence of similarities and/or differences, there may be no need for a human operator or otherwise to identify points or regions of interest that need to be observed by the sensors and/or identify the objects being observed by the sensors (e.g., by a verbal descriptor).

The paths may extend along one or more planes. The planes may be vertical, horizontal, at an angle, or any combination thereof. The angle may be about 5° or more, 10° or more, 30° or more, 50° or more, or even 70° or more. The angle may be about 175° or less, 160° or less, 140° or less, 120° or less, or even 100° or less. The paths may meander through one or more planes. The paths may extend in one or more straight segments through one or more planes. The straight segments may be oriented at an angle with respect to one another. The angle may be about 5° or more, 10° or more, 20° or more, 30° or more, or even 40° or more. The angle may be about 85° or less, 80° or less, 70° or less, 60° or less, or even 50° or less.

The paths may be curved. The curve may be defined by a circle, ellipse, parabola, segments thereof, the like, or any combination thereof. The paths may rise and/or fall with respect to the ground. The paths may rise and/or fall in a stepwise manner, a wave-like manner, a zigzag manner, or any combination thereof. A path may intersect with itself at one or more intersections.

The paths may include a start point, end point, or both. The paths may start, end, or both at one or more docking stations. The starting point may be the same as or different from the end point. For example, two docking stations may be located within a site and the sensor apparatus may start its path at one docking station and end it at the other docking station. The paths may comprise a plurality of different positions along the course of the path. The plurality of positions may be located a distance from three-dimensional objects and/or subcomponents thereof. The distance may be about 1 meter or more, 5 meters or more, 10 meters or more, 15 meters or more, 20 meters or more, or even 25 meters or more. The distance may be about 50 meters or less, 45 meters or less, 40 meters or less, 35 meters or less, or even 30 meters or less.

The paths may be predetermined. The paths may be adjusted while a sensor apparatus traverse the paths. The adjustments may be determined by a user, autonomously, or both. For example, a sensor apparatus may detect an obstacle in the path and adjust the path to avoid the obstacle. Path adjustment may employ artificial intelligence.

The sensor apparatuses may retrace paths. The same path may be traversed during subsequent iterations of data collection. The paths may be different for subsequent iterations of data collection. Whereas prior methods by some require data collection, at different iterations, along the same path in order to accurately identify three-dimensional objects, the present disclosure provides for an improved method whereby three-dimensional objects may be identified without requiring the same path to be traversed. This feature may be attributed, at least in part, by the collocation of sensed three-dimensional data and the comparison and/or overlaying of three-dimensional models.

The sensor apparatuses may comprise one or more sensors. The sensors may include a plurality of sensors. The plurality of sensors may include different sensors. The sensors may include one or more camera sensors, LiDAR sensors, laser interferometer sensors, thermal sensors, acoustic sensors, chemical sensors, the like, or any combination thereof. The one or more sensors may include one or more manufactured electronic devices or other hardware devices. The sensors may interact with the physical environment and converts its interaction with the physical environment to electrical signals.

The camera sensors may include one or more charge-coupled devices (CCD), active-pixel sensors (CMOS), or both. Photons may pass through one or more lenses and interact with the one or more camera sensors. The camera sensors may convert its interaction with photons into electrical signals.

The LiDAR sensors may include topographic LiDAR sensors, bathymetric LiDAR sensors, or both. The LiDAR sensors may include a laser array, photodetector, or both. The laser array may emit photons, the photons may reflect from a surface of an object, and the reflected photons may interact with the photodetector. The photodetector may convert its interaction with photons into electrical signals. Topographic LiDAR sensors may utilize near-infrared light in a wavelength range of from about 800 nm to about 2500 nm. Bathymetric LiDAR sensors may utilize green light at a wavelength of about 100 nm to 1000 nm (e.g., about 532 nm).

The thermal sensors may include a pyrometer, thermometer, or both. The thermal sensors may include an infrared sensor. Infrared radiation may pass through one or more lenses and/or interact with the infrared sensor. The infrared sensor may convert its interaction with infrared radiation into electrical signals.

The acoustic sensors may include one or more microphones. The microphone may include a diaphragm. The diaphragm may interact with air molecules having sound waves propagating therethrough. The sound waves may cause the diaphragm to vibrate. The vibration may be converted to electrical signals. The acoustic sensors may be adapted to sense low-frequencies (1,000 Hz or less), high-frequencies (greater than 1,000 Hz), or both.

The chemical sensors may include a chemical sniffer, laser spectrometry sensor, tunable diode laser sensors, optical gas imaging cameras, or both. The chemical sniffer may utilize ultra-fast gas chromatography technology, acoustic wave technology, or both.

The sensors may capture data associated with a plurality of attributes of three-dimensional objects and/or subcomponents thereof. The camera sensors may capture data associated with one or more points in physical space, color, illuminance, or both. The LiDAR sensors may capture data associated with points in physical space, a vibration signature, or both. The laser interferometry sensors may capture data associated with one or more points in physical space, a vibration signature, or both. The thermal sensors may capture data associated with a thermal signature. The acoustic sensors may capture data associated with an acoustic signature. The chemical sensors may capture data associated with a chemical signature.

The data collected by the plurality of sensors may be processed into derivative data. The derivative data may include a sub-section of the captured data. For example, an acoustic signature may include data at several different frequencies and derivative data may include a dominant frequency, decomposition of the several frequencies based upon frequency bands, or decomposition of data based upon incident angle with a surface of a three-dimensional object. The derivative data may include a combination of the captured data. The derivative data may include an output of one or more calculations performed on the captured data. The sensors may have a positional variance from other sensors. The positional variance may be defined by a distance between two or more sensors. The positional variance may be corrected for so that the positional variance is not reflected in collocated data, resulting in inaccurate and/or distorted models.

The data collection and processing system may comprise one or more docking stations. The docking stations may function to receive data, transmit data, perform operations with data, charge one or more sensor apparatuses, or any combination thereof. The sensor apparatuses may be located at docking stations when the sensor apparatuses are not traversing a path. The sensor apparatuses may return to docking stations to communicate data, charge a battery, be stored in between data collections, or any combination thereof. The docking stations may charge one or more sensor apparatuses via a wired connection, wireless connection (e.g., inductive charging), or both. The docking stations may be a starting point of a path, end point of a path, or both.

The docking stations may receive data from the sensor apparatuses via a wired connection, wireless connection, or both. The docking stations may communicate with sensor apparatuses via a network. The docking stations may communicate data via a wired connection, wireless connection, or both. The docking station may communicate data via a network. The docking stations may communicate data with one or more computing devices, database servers, application servers, diagnostic devices, or any combination thereof.

The docking stations may function to provide edge computing. That is, docking stations may be located at facilities, remote from other computing devices. The docking stations may receive data from sensor apparatuses and perform operations on the data. The operations, described herein as the method, may reduce the size of data and/or prepare data for viewing by human operators. In this manner, the data may be managed by the docking stations and the communication of large quantities of data to other computing devices may be avoided.

The docking stations may comprise one or more processors, storage media, batteries, power ports, data ports, network modules, location modules, user interfaces, or any combination thereof.

The system may comprise one or more computing devices. The computing devices may function to receive and/or transmit data, perform operations with data, store data, retrieve data, execute computer-readable instructions, or any combination thereof. The computing devices may include one or more personal computers, mobile devices, or both. The personal computers may include a laptop computer, desktop computer, or both. The mobile devices may include a tablet, mobile phone, smart watch, the like, or any combination thereof.

The one or more computing devices may include or communicate with one or more other computing devices, processors, storage media, databases, user interfaces, or any combination thereof. The computing devices may communicate via a wired connection, wireless connection, or both. The processors, storage media, databases, user interfaces, or any combination thereof may be local to and/or remote from the computing devices. The computing devices may communicate with other computing devices, sensor apparatuses, docking stations, database servers, application servers, diagnostic devices, or any combination thereof via an interaction interface. The interaction interface may be an application programming interface ("API").

The computing devices may include one or more processors, storage media, batteries, power ports, data ports, network modules, location modules, user interfaces, or any combination thereof.

The system may comprise one or more database servers. The database servers may function to receive, store, or transmit data, or any combination thereof.

The database servers may receive data from and/or transmit data to one or more sensor apparatuses, docking stations, computing devices, application servers, diagnostic devices, or any combination thereof. The one or more database servers may communicate via a wired connection, wireless connection, or both.

The database servers may store data in a database. The database servers may store catalogs of pre-fabricated three-dimensional models. The database servers may store a historical database of data collected according to the presently disclosed method. The database servers may store a historical database of three-dimensional models fabricated according to the presently disclosed method.

The database servers may include one or more cloud-based servers. The database servers may be accessible via a web-based application. As referred to herein, web-based application may refer to an application that is accessible via an internet browser and associated with computer-readable instructions that are not entirely stored and/or executed by hardware of a client's computing device.

The database servers may also be referred to as one or more application servers if the one or more database servers also performs operations on data via computer-readable instructions stored on one or more non-transitory computer storage media and carried out by one or more processors, according to the method of the present disclosure (i.e., dual-purpose server).

The database servers may comprise one or more processors, storage media, power ports, data ports, network modules, user interfaces, or any combination thereof.

The system may comprise one or more application servers. The application servers may function to receive data, perform operations with data, transmit data, or any combination thereof.

The application servers may receive data from one or more sensor apparatuses, docking stations, computing devices, database servers, diagnostic devices, or any combination thereof. The application servers may communicate via a wired connection, wireless connection, or both. The application servers may perform operations on data via computer-readable instructions stored on one or more non-transitory computer storage media and carried out by one or more processors, according to the method of the present disclosure.

The application servers may include one or more cloud-based servers. The application servers may be accessible via a web-based application.

The application servers may also be referred to one or more database servers if the one or more application servers store data (i.e., dual-purpose server).

The application servers may comprise one or more processors, storage media, power ports, data ports, network modules, user interfaces, or any combination thereof.

The sensor apparatuses, docking stations, computing devices, database servers, application servers, diagnostic devices, or any combination thereof may comprise one or more processors. The processors may function to retrieve data, receive data, perform one or more operations with data, transmit data, or any combination thereof.

The one or more operations may include executing one or more computer-readable instructions, executing one or more algorithms, applying one or more rules, or any combination thereof. The processor may retrieve and/or receive computer-readable instructions, algorithms, rules, or any combination thereof from storage media. The processor may retrieve and/or receive data from storage media (input), perform operations with the data (processing), and transmit processed data to one or more storage media (output).

The processors may include one or more central processing units ("CPU"), graphics processing units ("GPU"), field-programmable gate arrays ("FPGA"), or any combination thereof. An example of a suitable CPU may include the Intel® Core™ i9-10900K, incorporated herein by reference in its entirety for all purposes. An example of a suitable GPU may include the NVIDIA Geforce RTX™ 3090, incorporated herein by reference in its entirety for all purposes.

The processors may be local to (on-board) sensor apparatuses, docking stations, computing devices, database servers, application servers, diagnostic devices, or any combination thereof. The processors may be remote from sensor apparatuses, docking stations, computing devices, database servers, application servers, diagnostic devices, or any combination thereof. The processors may communicate with other processors, storage media, network modules, data ports, or any combination thereof.

The processors may include one or more cloud-based processors. The cloud-based processors may be located remote from sensing apparatuses, docking stations, computing devices, diagnostic devices, or any combination thereof. The cloud-based processors may be included in application servers, database servers, or both. The cloud-based processors may be accessible via one or more networks. An example of a suitable cloud-based processor may include the Amazon Elastic Compute Cloud™ (EC2™) provided by Amazon Web Services®, incorporated herein by reference in its entirety for all purposes. Another example of a suitable cloud-based processor may include Lambda™ provided by Amazon Web Services®, incorporated herein by reference in its entirety for all purposes.

The sensor apparatuses, docking stations, computing devices, database servers, application servers, diagnostic devices, or any combination thereof may comprise one or more storage media. The storage media may include non-transitory storage media. The storage media may function to store one or more applications, data, databases, computer-readable instructions, algorithms, rules, the like, or any combination thereof.

The data stored within the storage media may be compressed, encrypted, or both. The storage media may store data in a native format, foreign format, or both. The storage media may store data as one or more databases. The storage media may store data as objects, files, blocks, or any combination thereof. The storage media may receive and/or store data collected by sensors of the present disclosure.

The storage media may cooperate with one or more processors for accessing, executing, and/or storing one or more applications, data, databases, algorithms, rules, computer-readable instructions, the like, or any combination thereof.

The storage media may include one or more hard drives, chips, discs, flash drives, memory cards, the like, or any combination thereof. The hard drives may include a solid state disk ("SSD"), hard drive disk ("HDD"), the like, or any combination thereof. The chips may hold memory temporarily via random access memory ("RAM"), permanently via read only memory ("ROM"), or both. The chips may include dynamic random access memory ("DRAM") chips, static random access memory ("SRAM") chips, first in first out ("FIFO") chips, erasable programmable read only memory ("EPROM"), programmable read only memory ("PROM"), the like, or any combination thereof. The discs may include floppy diskettes, hard disk drives, optical data storage media (e.g., CD ROMs, DVDs), the like, or any combination thereof.

The storage media may be local to sensor apparatuses, docking stations, computing devices, database servers, application servers, diagnostic devices, or any combination thereof. The storage media may be remote from sensor apparatuses, docking stations, computing devices, database servers, application servers, diagnostic devices, or any combination thereof.

The storage media may include cloud-based storage media. The cloud-based storage media may be located remote from sensing apparatuses, docking stations, computing devices, or any combination thereof. The cloud-based storage media may be included in database servers, application servers, or both. The cloud-based storage media may be accessible via one or more networks. An example of a suitable cloud-based storage media may include Amazon S3™ provided by Amazon Web Services®, incorporated herein by reference in its entirety for all purposes.

The storage media may include one or more databases. The databases may function to receive data, organize data, or both. The databases may be stored on storage media. The databases may be accessible by one or more processors to retrieve data for performing one or more operations with the data. Processed data may be provided to databases by one or more processors for storage.

The databases may include any type of database suitable for storing data. The data may be stored within databases in any suitable storage form using any suitable database management system ("DBMS"). Exemplary storage forms may include relational databases, non-relational databases, correlation databases, ordered/unordered flat files, structured files, the like, or any combination thereof. The relational databases may include SQL database, row-oriented, column-oriented, the like, or any combination thereof. The non-relational databases may include NoSQL database.

The databases may store one or more classifications of data models. The classifications may include column (e.g., wide column), document, key-value (e.g., key-value cache, key-value store), object, graph, multi-model, the like, or any combination thereof.

The databases may be stored on storage media local to sensor apparatuses, docking stations, computing devices, database servers, application servers, or any combination thereof. The databases may be stored on storage media remote from sensor apparatuses, docking stations, computing devices, database servers, application servers, diagnostic devices, or any combination thereof. The databases may include cloud-based databases. The cloud-based databases may be included in database servers, application servers, or both. The cloud-based databases may be located remote from one or more sensing apparatuses, docking stations, computing devices, diagnostic devices, or any combination thereof. The cloud-based databases may be accessible via one or more networks. An example of a suitable cloud-based database may include Amazon DynamoDB® offered through Amazon Web Services®, incorporated herein by reference in its entirety for all purposes.

The sensor apparatuses, docking stations, computing devices, database servers, application servers, diagnostic devices, or any combination thereof may comprise one or more batteries. The batteries may function to provide power to sensor apparatuses, the docking stations, diagnostic devices, elements thereof, or any combination thereof. The batteries may include rechargeable batteries, single-use batteries, or both. The batteries may include alkaline batteries, lithium-ion batteries, nickel-metal hydride batteries, the like, or any combination thereof. The batteries may be connected to sensors, processors, storage media, location modules, network modules, or any combination thereof.

The sensor apparatuses, docking stations, computing devices, database servers, application servers, diagnostic devices, or any combination thereof may comprise one or more power ports. The power ports may function to provide power to one or more sensor apparatuses, docking stations, batteries, or any combination thereof. The batteries may be chargeable via power ports. The power ports may include universal serial bus ("USB") ports, DC ports, the like, or any combination thereof.

The sensor apparatuses, docking stations, computing devices, database servers, application servers, diagnostic devices, or any combination thereof may comprise one or more data ports. The data ports may function to transmit and/or receive data. The data ports may include universal serial bus ("USB") ports, thunderbolt ports, firewire ports, the like, or any combination thereof. The data ports may communicate with storage media, processors, or both. The data ports may provide communication between sensor apparatuses, docking stations, computing devices, diagnostic devices, or any combination thereof. The data ports may communicate with other data ports via a wired connection.

The sensor apparatuses, docking stations, computing devices, database servers, application servers, diagnostic devices, or any combination thereof may comprise one or more location modules. The location modules may function to send and/or receive location information to and/or from a global positioning system ("GPS") satellite. The location modules may include a global navigation satellite system ("GNSS") module. The location information may be defined by latitude, longitude, altitude, or any combination thereof. Relating the latitude, longitude, altitude, or any combination thereof, of one location to another location may denote movement information (e.g., distance, speed, or both).

The sensor apparatuses, docking stations, computing devices, database servers, application servers, diagnostic devices, or any combination thereof may comprise one or more network modules. The network modules may receive data from and/or transmit data to devices, integrate devices into a network, or both. As referred to herein, "device" as used apart from a modifier (e.g., "computing" device) may refer to one or more sensor apparatuses, docking stations, computing devices, database servers, application servers, diagnostic devices, or any combination thereof. The network modules may communicate with other network modules via a network. The network modules may provide for communication between sensor apparatuses, docking stations, computing devices, database servers, application servers, diagnostic devices, or any combination thereof. The communication may be via networks.

The network modules may include wired network modules, wireless network modules, or both. A wired network module may be any module capable of transmitting and/or receiving data via a wired connection. The wired network module may communicate with networks via a direct, wired connection. The wired network module may include a network interface controller, PC Card, PCMCIA card, PCI card, the like, or any combination thereof. The wired connection may include an ethernet port. The wireless network module may include any module capable of transmitting and/or receiving data via a wireless connection. The wireless network modules may communicate with one or more networks via a wireless connection. The one or more wireless network modules may include a cellular transceiver, Wi-Fi transceiver, Bluetooth® transceiver, infrared transceiver, radio frequency transceiver, near-field communication ("NFC") module, the like, or any combination thereof.

The sensor apparatuses, docking stations, computing devices, database servers, application servers, diagnostic devices, or any combination thereof may communicate with each other via one or more networks. The networks may function to transmit data between sensor apparatuses, docking stations, computing devices, database servers, application servers, or any combination thereof.

The networks may be formed by placing two or more devices in communication with one another. The networks may be temporarily and/or permanently connected to devices. The devices may be in selective communication with the networks. The networks may allow for devices to be connected to other devices to transmit data, receive data, or both. The networks may allow for devices to transmit data to or receive data from storage media, or both. The networks may allow for transmission of data for processing by processors. The networks may be connected to other networks.

The networks may include one or more local area networks ("LAN"), wide area networks ("WAN"), virtual private network ("VPN"), personal area networks ("PAN"), cellular networks, Bluetooth® networks, intranet, internet, the like, or any combination thereof. The networks may include a wireless network, wired network, or both.

The sensor apparatuses, docking stations, computing devices, database servers, application servers, diagnostic devices, or any combination thereof may include one or more user interfaces. The user interfaces may function to display data in a visual format, receive user inputs, transmit data associated with the user inputs, or any combination thereof.

The user interfaces may include one or more cameras, graphical user interfaces ("GUI"), microphones, speakers, keyboards (e.g., physical keyboard, digital keyboard, or both), mice, controllers (e.g., video game controllers), the like, or any combination thereof. The user interface may be on-board a device (e.g., a mobile phone screen), remote from a device (e.g., a separate peripheral computer monitor), or both. The graphical user interface may be included on a headset (e.g., virtual reality headset).

Models disclosed herein may be explorable with virtual reality technology. User controlled (e.g., computer mouse) and/or sensor controlled (e.g., accelerometer) inputs may direct the pose viewed in virtual reality. The route of a sensor apparatus may be explorable and/or programmed with virtual reality technology. By way of example, a user may explore a model of a site in virtual reality and the path of exploration may be traced and translated to a sensor apparatus route.

User interfaces that receive user inputs may be referred to as input devices. The input devices may function to receive one or more user inputs from a user, convert user inputs into signals, or both. The input devices may include one or more buttons, wheels, keyboards, switches, mice, joysticks, touch pads, touch-sensitive screens, microphones, the like, or any combination thereof.

The touch pad may include a touch-sensitive area, provided as a separate peripheral or integrated into a computing device, that does not display visual output. The touch-sensitive screens may function to accept user inputs from a user based on tactile contact. The touch-sensitive screens may include a screen, display controller, or both. The touch-sensitive screens may detect contact and convert the detected contact into interaction with one or more interface objects (e.g., buttons, icons, web pages, images, menus, the like, or any combination thereof) that are displayed on the touch-sensitive screen. The touch-sensitive screens may detect contact via touch sensing technology. The touch sensing technology may include capacitive, resistive, infrared, surface acoustic wave technologies, or any combination thereof. The touch-sensitive screens may detect contact from an appendage (e.g., finger), an object (e.g., a stylus), or both.

The user interfaces may include one or more graphical user interfaces ("GUI"). The graphical user interfaces may include one or more screens. The screens may be located on a device, remote from a device, or both. An example of a screen located on a device may include a mobile phone screen. An example of a screen located remote from a device may include an external monitor for a desktop computer.

The one or more screens may utilize liquid crystal display ("LCD") technology, light emitting polymer display ("LPD") technology, light emitting diode ("LED") technology, organic light emitting diode (OLED) technology, the like, or any combination thereof.

The graphical user interface may display a visual reproduction of three-dimensional models. The graphical user interface may allow a user to manipulate and/or interact with a visual reproduction of three-dimensional models.

The graphical user interfaces may be in communication with user input devices. The input devices may be integrated with the graphical user interfaces. The input devices may include one or more touch-sensitive screens.

The graphical user interfaces may display one or more interface metaphors (i.e., "interface objects"). The interface metaphor may function to give the user instantaneous knowledge about how to interact with the user interface. The interface metaphor may include visuals, actions, and procedures that exploit specific knowledge that users may already possess from other domains of life. An example of an interface metaphor may include a file folder icon, which a user generally intuitively knows to contain one or more individual files. Another example of an interface metaphor may include one or more menus (e.g., drop-down menus), which a user generally intuitively knows to list functions that may be selected. Another example of an interface metaphor may include a button displayed on a touch-sensitive monitor screen, which a user generally intuitively knows that upon pressing a button, an associated function may be initiated.

The data collection and processing system may include one or more diagnostic devices. The diagnostic devices may function to collect data about a three-dimensional object, transmit the data, or both. The diagnostic devices may be employed to follow up on data collected by sensor apparatuses. The diagnostic devices may be activated in response to data collected by a sensor apparatus. The diagnostic device may be independent from a sensor apparatus. The diagnostic device may include a roving device, stationary device, or both.

The diagnostic device may be equipped with one or more sensors. The sensors may be specialized sensors. The specialized sensors may provide for a greater data quality and/or quantity relative to one or more sensors of a sensor apparatus. The specialized sensors may be configured to inspect three-dimensional objects with greater detail relative to the sensors of a sensor apparatus. For example, the data collection and processing system may determine that a pipe is corroded, and the diagnostic device may be employed to determine the extent of corrosion by measuring a thickness of the pipe (e.g., via an ultrasonic thickness gauge). It may be advantageous to separate specialized sensors from the sensor apparatus to reduce the weight and cost of the sensor apparatus. Specialized sensors may not be necessary for routine inspections and may only be required if a particular issue of an object is observed.

The diagnostic device may determine the location of a three-dimensional object and/or portion thereof to be inspected in detail via mapping of an overlay model. A three-dimensional object and/or portion thereof may be indicated by the data collection and processing system as having a difference by comparing collocated data to a model.

The diagnostic device may communicate with computing devices, sensor apparatuses, docking stations, database servers, application servers, or any combination thereof. The diagnostic device may communicate via a wired connection, wireless connection, or both. The diagnostic device may be associated with its own docking station or the same docking station as a sensor apparatus.

The diagnostic device may comprise one or more sensors, processors, storage media, batteries, power ports, data ports, network modules, location modules, user interfaces, or any combination thereof.

Models of Three-Dimensional Objects

The one or more three-dimensional objects may be represented by one or more three-dimensional models ("models"). The models may function to digitally represent three-dimensional objects. The models may comprise collocated data. The models may comprise collocated data that has been pre-processed.

Collection of data from a plurality of different positions may enable the creation of three-dimensional models. Typically, objects may be modelled by 20 or less, 15 or less, 10 or less, or even 5 or less images. More images obtained from different poses relative to a three-dimensional object may be needed due to the complexity of some objects contemplated by the present teachings. By way of example, in some poses, regions of the object may be obstructed but may be visible from other poses. One example of a complex environment is an oil refinery having a multitude of pipelines extending tortuously through the site and extending in front of or behind other pipelines. This is just one example and other type of environments may be appreciated by the present disclosure. Moreover, the present disclosure contemplates the construction of high-resolution three-dimensional models in order to detect anomalies that are dimensioned 10% or less, 5% or less, 1% or less, 0.1% or less, or even 0.01% or less relative to the overall dimensions of the three-dimensional object. To this end, video images from a plurality of different poses may be employed to construct the three-dimensional model.

The three-dimensional models may be segregated into objects and/or sub-components that are labeled and connected to physical and operational attributes and to a history of thereof.

The three-dimensional models may visually display a visual signature, thermal signature, acoustic signature, vibration signature, chemical signature, or any combination thereof. The visual signature may construct a virtual point cloud. Virtual surfaces may be applied to the virtual point cloud. The model may include a shell model. Texture mapping may be applied to the virtual point cloud. A thermal signature, acoustic signature, vibration signature, chemical signature, or any combination thereof may be applied to the virtual surfaces of the model.

The three-dimensional models may include various models of the same objects, the various models having different resolutions. The resolution of a model may be selected based upon the type of computing device being used to view the model and/or the connectivity of the computing device. For example, mobile phones typically have less processing power as compared to laptops so a lower resolution model may be viewed on a mobile phone and a higher resolution model may be viewed on a laptop. As another example, mobile phones connected via a cellular carrier may receive lower resolution models to avoid approaching a data cap.

The three-dimensional models may be constructed from and/or comprise data derived from one or more types of sensors. The models may be constructed according to computer-readable instructions executed by one or more processors. The models may be stored in one or more storage media. The models may be displayed on a graphical user interface.

The three-dimensional models may be viewable by a user. The models may be explorable by a user. The models may be explorable by rotation of an X, Y, Z coordinate space, zooming-in, zooming-out, panning in the X, Y or Z directions, or any combination thereof.

The models may be explorable in real-time. Real-time may refer to a time substantially contemporaneous with the collection of data by a sensor apparatus and/or diagnostic device.

A user may zoom-in on details of particular three-dimensional models. A user may view an entire space where a plurality of three-dimensional objects corresponding three-dimensional models are situated. A user may manipulate the viewing angle of models, a site where objects are situated, or both. A user may view a particular model. A user may view a plurality of models simultaneously. A user may toggle between different models (e.g., models from data captured on different days). A user may toggle between views of different attributes (e.g., visual signature, thermal signature, etc.). Each attribute may be projected on a three-dimensional model. Each attribute may be viewed as textures of a three-dimensional model. Each attribute may be viewed separately as images with a position in the model coordinate system.

A user may program a route for the sensor apparatus with three-dimensional models of a site. A user may designate the route within one or more three-dimensional models of the site. The model may comprise one or more three-dimensional models of objects situated within the site. The route may be disposed proximate to one or more three-dimensional objects situated within the site. In this manner, a sensor apparatus traversing the route may collect data associated with the objects as it traverses the route. The inspection route of the sensor apparatus may correspond to the route designated in the three-dimensional model. The sensor apparatus may collect data while traversing the route. Data collection may occur throughout the entire route or along one or more segments of the route.

The identity of three-dimensional objects proximate to the sensor apparatus may be determined, causing one or more sensors to start collecting data. In this manner, data collection may be performed selectively throughout the route. Moreover, a selection of sensors that are activated may be tailored to the particular object to be observed. As a result, the quantity of data collected may be reduced in comparison to collection of data from all sensors throughout the entirety of the route.

Where identity of three-dimensional objects is performed prior to data collection disclosed herein, such identification may proceed in a manner distinct from identification performed after data collection and collocation. Such object identification may be obtained by GPS position correlation (e.g., correlation to a map of a site), 2D image recognition, route correlation (e.g., correlating to objects known or at least expected to be at some point along the route), or any combination thereof.

It may be appreciated that the robustness of object identification may not be required to the same extent for sensor activation as it is for object identification after data collection and collocation (for the purpose of comparing two models. By way of example, if sensors are activated by mis-identification, the result is merely more data. On the other hand, if time-lapse comparisons are based on mis-identification, then inspection integrity may be compromised. In this case, an inspection may have to be repeated. Identification by comparisons of collocated data sets may be more robust than 2D image recognition, which may be more robust than GPS position correlation and/or route correlation.

The models may include one or more pre-fabricated three-dimensional models, boundary models, three-dimensional baseline models, three-dimensional working models, three-dimensional overlay models, or any combination thereof.

The models may include one or more pre-fabricated three-dimensional models ("pre-fabricated models"). The pre-fabricated models may function to represent three-dimensional objects as provided by original equipment manufacturers ("OEM"), in accordance with a planned construction, or both. The pre-fabricated models may represent an ideal construction with no defects or blemishes and/or operating under normal operating conditions. The pre-fabricated models may be compared against working models to identify similarities and/or differences between them.

The pre-fabricated three-dimensional models may include models constructed by computer assisted design ("CAD") applications. The pre-fabricated models may be constructed by OEMs, consumers, or both. The pre-fabricated models may be stored on storage media. The pre-fabricated models may be stored in a database. The pre-fabricated models may be stored in one or more sensor apparatuses, docking stations, computing devices, database servers, application servers, or both. The pre-fabricated models may be provided as a catalog. The catalog may be searchable by users to obtain particular models of interest. For example, upon purchasing new equipment, a user may search the catalog for a model of the equipment.

The pre-fabricated three-dimensional models may be overlaid with one or more three-dimensional baseline models, three-dimensional working models, or both to produce one or more three-dimensional overlay models. The pre-fabricated models may be compared to one or more three-dimensional baseline models, three-dimensional working models, or both. In this manner, the identity of the three-dimensional objects associated with the baseline models and/or working models may be determined. Moreover, the existence of similarities and/or differences (e.g., wear and tear) between pre-fabricated models and baseline models and/or working models may be determined.

An identification may be determined if the correspondence of compared models exceeds a threshold. The threshold may be about 85% correspondence or more, more preferably 90% correspondence or more, more preferably 95% correspondence or more, more preferably 98% correspondence or more, or even more preferably 99% correspondence or more.

The pre-fabricated models may be free of extraneous data, as defined herein. Comparison of pre-fabricated models to baseline models and/or working models may indicate extraneous data present in the baseline models and/or working models, which may be discarded.

The models may include one or more three-dimensional working models ("working models"). The working models may represent three-dimensional objects as sensed by a plurality of sensors. The working models may represent three-dimensional objects at various points in time. The working models may be characterized by the identities of the three-dimensional objects associated with the working models.

The three-dimensional working models may represent three-dimensional objects that have been and/or are currently operational. The working models may be constructed from and/or comprised of data captured by sensors. The working models may be constructed from collocated data. The working models may be constructed from data that has been processed by processors according to computer-readable instructions associated with the method of the present disclosure. The working models may be overlaid with pre-fabricated models and/or baseline models, producing overlay models.

The three-dimensional working models may be stored on storage media. The working models may be stored in a database. The working models may be accessible from computing devices, database servers, application servers, or both. The working models may be compared to pre-fabricated models and/or baseline models.

The models may include one or more three-dimensional baseline models ("baseline models"). The baseline models may be compared to working models. The baseline models may be compared to working models at subsequent points in time to determine how a three-dimensional object changes over time with respect to baseline. The baseline models may include three-dimensional working models that have been designated as a baseline by a user. A pre-fabricated model or a prior-in-time working model may be designated as a baseline model. That is, users may choose to compare a present working model against a pre-determined ideal model (pre-fabricated model) or a model of an object that represents the object at various points in time (working models).

The three-dimensional baseline models may be characterized by an identity of the objects associated with the baseline models. The baseline models may represent objects that have been and/or are currently operational. The baseline models may be stored on storage media. The baseline models may be stored in a database. The baseline models may be accessible from computing devices, database servers, application servers, or any combination thereof.

The three-dimensional baseline models may be overlaid with pre-fabricated models and/or working models, producing three-dimensional overlay models. The baseline models may be compared to pre-fabricated models and/or working models. The baseline models may be compared to working models in lieu of pre-fabricated models.

Comparison of a working model with one or more pre-existing models may involve comparing the same attribute mapped onto the models and/or jointly analyzing multiple attributes mapped onto the models.

The three-dimensional baseline models may be free of extraneous data, as defined herein. Comparison of baseline models to working models may indicate extraneous data present in the working models, which may be discarded.

The baseline model and/or pre-fabricated models may be referred to herein as pre-existing models.

The models may include one or more three-dimensional overlay models ("overlay models"). The overlay models may function to communicate similarities and/or differences in three-dimensional objects at one or more points in time.

The three-dimensional overlay models may comprise an overlay of pre-fabricated models, working models, baseline models, or any combination thereof. The overlay models may represent objects that have been and/or are currently operational. The overlay models may include one or more visual indicators.

The three-dimensional comparison models may comprise at least a point cloud (e.g., derived from visual data) and one or more other attributes. Each point in physical space within the point cloud may be assigned data associated with a visual signature, a thermal signature, an acoustic signature, a vibration signature, a chemical signature, or any combination thereof. Collocation of data collected by different sensors may assign data points from different types of sensors to specific points in physical space. In this manner, each point in physical space (e.g., defined in Euclidian coordinates) may be assigned various data.

The three-dimensional overlay models may be stored on storage media. The overlay models may be stored in a database. The overlay models may be accessible by computing devices, database servers, application servers, or any combination thereof.

The models may include one or more boundary models. The boundary models may function to identify objects associated with the models. The boundary models may comprise one or more geometric boundaries arranged in two-dimensional space, three-dimensional space, or both. The geometric boundaries may indicate the general area and/or volume of site occupied by one or more three-dimensional objects. Each of the geometric boundaries may be associated with a pre-determined identity. Point clouds constructed from visual sensors may be juxtaposed with boundary model and points present within a geometric boundary may indicate the identity, presence, and/or absence of the object associated with those points.

The geometric boundaries may encapsulate physical sites occupied by each of the three-dimensional objects. The geometric boundaries may be defined by a length, width, height, one or more angles, or any combination thereof. The geometric boundaries may be generally equal to the physical dimensions of the three-dimensional objects.

The geometric boundaries may be larger than the physical dimensions of the three-dimensional objects. A larger geometric boundary may be particularly advantageous in identifying, within a margin of error, three-dimensional objects that are shifted and/or moved with respect to the three-dimensional object's original position. The geometric boundaries may be 1% larger, 5% larger, or even 10% larger than the physical dimensions of the three-dimensional object.

The geometric boundaries may be pre-determined. The geometric boundaries may be artificially drawn by a user. The geometric boundaries may be autonomously drawn based on the physical dimensions of the three-dimensional objects, models, or both.

A threshold may be set to determine whether the comparison of points in physical space to one or more geometric boundaries returns a positive identification or a failure of identification. The threshold may be represented as a percentage. For example, a threshold of a 90% match between points in physical space and one or more geometric boundaries may be set in order for a positive identification to be returned.

The three-dimensional overlay models may indicate similarities and/or differences between the three-dimensional objects at different points in time. The similarities and/or differences may be of a plurality of attributes sensed by a plurality of sensors at two or more points in time.

Differences may be referred to herein as anomalies, but not all differences are anomalies. That is, differences between models may be expected or normal. For example, machines typically operate within a range of operating conditions (e.g., a range of temperatures, pressures, rotations per minute, etc.). Some differences that are not expected or normal may be anomalous. Anomalies require operating condition adjustment, maintenance, or otherwise addressing by human operators.

The similarities and/or differences may be associated with corrosion, gauge readings (analog or digital), location of three-dimensional objects, location of sub-components, presence or absence of three-dimensional objects, presence or absence of sub-components, presence or absence of chemicals, thermal signature, acoustic signature, the like, or any combination thereof. For example, if an object that has developed corrosion between a first time and a second time, the corrosion may be identified from points in physical space present at a first time but not a second time, and color that changes between a first time and a second time.

The similarities and/or differences may be visually represented by one or more visual indicators. The similarities and/or differences may be summarized in a report.

The three-dimensional overlay models may comprise one or more visual indicators. The visual indicators may function to indicate similarities and/or differences between three-dimensional objects at one or more points in time. The visual indicators may assist users identify similarities and/or differences. For example, a user may review dozens or more of same or similar images of a three-dimensional object and similarities and/or differences that are sufficiently small may be easy for the user to overlook in absence of visual indicators.

The visual indicators may be overlaid on models. The visual indicators may be displayed on a graphical user interface. The visual indicators may include color, icons, geometric boundaries, the like, or any combination thereof.

Color, as referred to with respect to visual indicators, may be different from an actual color of one or more surfaces of the objects and/or subcomponents. The color may be arbitrarily chosen. The color may indicate an absolute deviation, a binary deviation, or both.

The absolute deviation may be visually represented by a color gradient. The color gradient may include one or more colors and/or one or more hues of the colors. For example, hues of red may indicate differences between an object at a first time and the object at a second time while hues of blue may indicate similarities between an object at a first time and the object at a second time. The hues may indicate a degree to which an object at a first time is similar to or different from the object at a second time. For example, lighter hues of blue may indicate higher degrees of similarity and darker hues of blue may indicate lower degrees of similarity. In other words, the absolute deviation may visually represent the quantitative difference. The quantitative difference may be measured in distance, temperature, frequency, wavelength, concentration, loudness, the like, or any combination thereof.

The binary deviation may be visually represented by a color binary. The color binary may include two different colors. One color may indicate differences between an object at a first time and the object at a second time while another color may indicate similarities between the object at a first time and the object at a second time. It may be particularly advantageous to represent similarities and/or differences by a color binary to reduce the visual complexity of the overlay models and assist users to determine where similarities and/or differences exist on the objects.

The icons may include any suitable symbol shown on a graphical user interface. The icons may be located on, adjacent to, or circumscribing similarities and/or differences, or any combination thereof. The icons may alert users to similarities and/or differences between objects at a first time and the objects at a second time. The geometric boundaries may circumscribe areas of similarities and/or differences.

A threshold may be utilized to determine which of the one or more colors, icons, geometric boundaries, or any combination thereof are visually represented. The threshold may be defined by a degree of difference numerically represented by a percentage. For example, a measurable quantity that is 10% different or less may be represented by one color and a measurable quantity that is 11% or more different may be represented by another color. In this manner, users may be alerted only to similarities and/or differences that surpass a threshold. This may be particularly advantageous to reduce visual complexity of models.

The models may be constructed from one or more data sets, data sub-sets thereof, or both. The data set and/or sub-set may comprise data associated with the plurality of attributes. The data set and/or sub-set may comprise data collected by a plurality of sensors. The data set and/or sub-set may be defined by a point in time when the data was collected.

The data set and/or sub-set may include extraneous data. As referred to herein, extraneous data may mean data not associated with three-dimensional objects sought to be inspected. Extraneous data may be captured from objects and/or structures that are situated beyond one or more three-dimensional objects but are in the field-of-view of the sensors. Extraneous data may be captured while sensors are not oriented toward objects sought to be inspected. Extraneous data may be captured during periods of a sensor apparatus traversing from one object to another. Extraneous data may include duplicative data of the same points on an object observed by sensors at different angles.

Extraneous data may be discarded. It may be particularly advantageous to discard extraneous data in order to reduce the size of data in a model thereby avoiding occupying more data storage space than necessary, transmitting data sets faster, performing operations on data faster, avoiding exceeding bandwidth limitations, avoiding exceeding network data caps, or any combination thereof, relative to data sets including extraneous data. For example, deep sea oil rigs are typically restricted in an amount of bandwidth available to them due to their remote location.

The extraneous data may include two-dimensional image data from which a three-dimensional model has already been extrapolated. For example, a plurality of two-dimensional images may be utilized to construct a model in three-dimensional space and after a point cloud has been constructed, the two-dimensional image data has served its purpose and is no longer needed. The extraneous data may include noise. The noise may include data that is corrupted, distorted, or has a low signal-to-noise ratio.

The extraneous data may be designated by a user. The extraneous data may be designated based upon particular needs of a user. For example, in an environmentally controlled environment, corrosion may not be a concern to users so users may designate color data as extraneous.

The data set may be collocated resulting in a collocated data set. As referred to herein, collocating may refer to juxtaposing data from a plurality of sensors with a point cloud resulting in data associated with each of the plurality of attributes being assigned to points in physical space. Collocation may include projection, ray tracing, or both. Collocation may be performed autonomously. Collocated data may be arranged in one or more matrices.

Collocation may provide for proper comparisons of three-dimensional models. That is, before attribute data (e.g., a temperature reading) is compared between two three-dimensional models, the location of the attribute data to its corresponding point in physical space in the model is performed.

Collocation may provide for joint analysis. That is, analysis of data associated with multiple attributes.

Users may select to view a range of data or single data point. The range of data series or single data series may be viewable on a model. Users may toggle between different ranges or single data series. For example, an acoustic sensor may collect data associated with sound in a frequency range of between 20 Hz and 20,000 Hz and a user may select to view only data in a range of between 500 Hz and 2,000 Hz. Different ranges may reveal different properties of a three-dimensional object. For example, motor operation of a fluid pump may be discernable within a first frequency range and inlet and outlet fluid flow of the fluid pump may be discernable within a second frequency range. Selecting a range of data series or single data series may reveal attributes and/or properties of three-dimensional objects that would otherwise be indiscernible or obscured if viewing an entire data set collected by one or more sensors. For example, acoustic data in a particular frequency range may reveal whether fluid flow within a pipe is turbulent or laminar.

Method

The method may comprise one or more of the following steps. It is understood that any of the method steps can be performed in virtually any order. Some of the steps may be duplicated, removed, rearranged relative to other steps, combined into one or more steps, separated into two or more steps, or any combination thereof.

The method of the present disclosure may be performed at the direction of computer-readable instructions stored on one or more non-transient storage media and executed by one or more processors. Reference to one or more storage media and one or more processors in the paragraphs that follow may refer to hardware local to or remote from one or more sensor apparatuses, docking stations, computing devices, database servers, application servers, diagnostic devices, or any combination thereof. It is also contemplated by the present disclosure that any combination of steps may be performed on hardware local to one of the one or more sensor apparatuses, docking stations, computing devices, database servers, diagnostic devices, or any combination thereof while any other combination of other steps may be performed on any other of the one or more sensor apparatuses, docking stations, computing devices, database servers, diagnostic devices, or any combination thereof.

As referred to herein, "first time", "second time", and so on may refer to discrete durations of time. For example, a sensor apparatus may capture data while traversing a factory on a first day (first time) and then capture data while traversing a factory on a second day (second time). The duration of time may begin when sensors start capturing data and end when sensors stop capturing data. It may take minutes or even hours from the initiation of data collection until sensors complete data collection of three-dimensional objects they are targeting.

A. Autonomous Operations

The method of the present disclosure relates to autonomous operations. The autonomous operations may be utilized for operation of facilities ("sites"), maintenance of assets, inspection of assets, operational controlling of assets, or any combination thereof. The assets may include three-dimensional objects.

The method of autonomous operations may be carried out by a system. The system may comprise one or more sensors, sensor apparatuses, docking stations, computing devices, or any combination thereof. Sensors may be on-board sensor apparatuses. These elements of the system may comprise one or more storage media. The storage media may store data and/or computer-readable instructions. These elements of the system may comprise one or more processors. The processors may retrieve computer-readable instructions from storage media and carry out the instructions on data (e.g., data captured by sensors).

The autonomous operations may utilize the latest available fit-for-purpose technology. That is, a sensor apparatus (e.g., ground-mobile robot and/or air-mobile drone) and sensors located on-board the sensor apparatus may be selected for a particular end-use. By way of example, inspection of an oil rig, which may have limited surfaces for ground travel may be performed by an aerial sensor apparatus (e.g., air-mobile drone). As another example, inspection of a construction site where there is ample space for ground travel may be performed by a ground-mobile robot.

Moreover, utilization of particular types of sensors may be appropriate for different purposes. The sensors may be selected at least from visual sensors (e.g., cameras and/or FLIR), thermal sensors, low-frequency acoustic sensors, high-frequency acoustic sensors, chemical sensors (e.g., gas sensors), or any combination thereof. By way of example, inspection of pipe structural integrity may be performed with at least visual sensors for the purpose of characterizing surface material integrity. As another example, inspection of chemical storage tanks may be performed with at least chemical sensors for the purpose of characterizing whether any chemical is leaking to the environment surrounding the chemical tanks.

The sensors may be located on-board a sensor apparatus. The sensor apparatus may be mobile. The sensors may be stand-alone devices. The stand-alone devices may be fixed in position. By way of example, one or more sensors may be positionally fixed and supported by a tri-pod located in proximity to one or more three-dimensional objects.

Mobile sensor apparatuses may be particularly advantageous for existing infrastructure where adding enhanced sensing capabilities with an IoT ("internet of things") solution may be cost prohibitive. Mobile sensor apparatuses may offer flexibility to autonomous operations. That is, if a site is modified (e.g., by moving around assets within a site), a sensor apparatus can be provided a new path to monitor. By way of the flexible mobile sensor apparatuses, the autonomous operations may be future-proof as sensor apparatuses and sensors can be easily upgraded as technology advances.

The autonomous operations may be enabled by a software platform. The software platform may be adapted for edge computing. Edge computing, as referred to herein, may be the locating of computing devices proximate to the sources of data (e.g., three-dimensional objects of which the sensors capture data) to enable faster processing times, avoid bandwidth limitations, provide faster insights, and improve response times for management of facilities ("sites"). By way of comparison, conventional robotic inspections may generate tens of gigabytes of data per hour, which requires large quantities of bandwidth to communicate to human operators in a meaningful format and in a reasonable amount of time. With the edge computing of the present disclosure, data pre-processing, construction of detailed three-dimensional models, identification of anomalies, anomaly classification by criticality, and communication to operators may be performed by computers at the site.

The present disclosure provides for a method of time lapse analysis. That is, data captured at one point in time may be compared to data captured at another point in time. The time lapse analysis may be performed by processing data in-situ and/or remotely, depending on the site's network connectivity.

Reports may be generated from the time lapse analysis. The reports may be autonomously generated. The report may be provided in an electronic format. The reports may indicate whether one or more three-dimensional objects at a site is functioning within normal working conditions and/or if any anomalies are present. The report may include three-dimensional models. The models may be viewable and/or manipulable on computing devices (e.g., mobile devices) operable by human operators (e.g., field engineers). By way of the reports and/or models, the human operators may be provided detailed diagnostic data at their fingertips. The detailed diagnostic data may inform human operators that maintenance should be carried out on the three-dimensional objects, operating conditions of the three-dimensional objects should be adjusted, or both.

The method of the present disclosure may construct and maintain models without expending engineering hours to construct and/or update the models. The construction and maintenance of models may be performed autonomously. The models may be updated in substantially real-time. The models may be digital recreations of three-dimensional objects and their attributes at various points in time. Human operators may view a chronology of changes to three-dimensional objects by way of their models. The autonomous construction and maintenance of models may reduce the staffing requirements, reduce costs, reduce safety risks, improve inspection reliability, or any combination thereof. Inspection reliability may be improved by increasing the size of the available data and/or reducing inspection intervals.

The method of the present disclosure may utilize analytics and artificial intelligence to detect anomalies, rank anomalies, prioritize the addressing of anomalies by human operators, establish maintenance schedules (e.g., based upon a latest acceptable completion date), or any combination thereof.

The method may comprise a sensor apparatus departing a docking station. The method may comprise a sensor apparatus traversing a path through a site. The site may have three-dimensional objects located therein. The method may comprise sensors on-board a sensor apparatus obtaining one or more data sets throughout a path. Each of the data sets may be associated with an attribute of three-dimensional objects. The method may comprise a sensor apparatus returning to a docking station.

The sensors may obtain data from a different positions of the sensors, throughout the path, relative to points in physical space on the objects. The method may comprise a sensor apparatus locating and traveling to a proximity of an object. The sensor apparatus may locate the object by utilizing pre-existing models of three-dimensional objects to detect the positions of the three-dimensional objects within the site; utilizing the detected positions of three-dimensional objects to direct the sensor apparatus to the proximity of the three-dimensional objects; or both. The method may comprise an autonomous sensor apparatus and/or sensors orienting toward objects. The sensors may orient toward objects by utilizing the detected positions of objects to direction of the objects. Orienting may be performed with the objective of achieving the best measurements of the objects' properties by the sensors. The plurality of sensors may rotate and/or linearly translate relative to the sensor apparatus.

The method may comprise communicating human-readable instructions. The instructions may direct human operators to address anomalies. The instructions may be communicated to compute devices. The instructions may be communicated over a network (e.g., cellular network or satellite link).

B. Analyzing Sensed Data in 3D Space

The present disclosure provides for a method for analyzing sensed data of one or more three-dimensional objects.

The method may comprise acquiring a first data set at a first time. The first data set may be associated with a first plurality of attributes of the one or more three-dimensional objects. This step may be performed by a first plurality of sensors that each acquire the first data set from a plurality of different positions of the plurality of sensors relative to one or more points in physical space on the one or more three-dimensional objects. This step may be performed autonomously.

The method may comprise collocating the first data set resulting in a first collocated data set. The first collocated data set may correspond with one or more first three-dimensional working models of the one or more three-dimensional objects, respectively. This step may be performed by one or more processors. The processors may be local to (on-board) one or more sensor apparatuses, docking stations, computing devices, application servers, or any combination thereof. This step may be performed autonomously. This step may utilize a neural network.

The method may comprise interpreting the first collocated data set. Interpreting may be performed by comparison of the first collocated data set to one or more pre-fabricated three-dimensional models, to determine an identity of the one or more three-dimensional objects associated with the one or more first three-dimensional working models. The interpreting may be performed by one or more processors. The processors may be local to (on-board) one or more sensor apparatuses, docking stations, computing devices, application servers, or any combination thereof. This step may be performed autonomously. This step may utilize a neural network.

Interpreting may be performed by comparison of the one or more points in physical space on the one or more three-dimensional objects to a boundary model comprising pre-determined boundaries of the one or more three-dimensional objects within a site to determine the identity of the one or more three-dimensional objects. The pre-defined boundaries may be defined in two-dimensional space, in three-dimensional space, or both. This step may be performed by one or more processors. The processors may be local to one or more sensor apparatuses, docking stations, computing devices, application servers, or any combination thereof. This step may be performed autonomously. This step may utilize a neural network.

Advantageously, the comparison to determine three-dimensional objects' identity may drastically reduce the amount of time and susceptibility to error involved with identification of objects via human visual inspection.

The method may comprise acquiring a second data set at a second time. The second data set may be associated with a second plurality of attributes of the one or more three-dimensional objects. This step may be performed by a plurality of sensors that each acquire the second data set from a plurality of different positions of the plurality of sensors relative to one or more points in physical space on the one or more three-dimensional objects. This step may be performed autonomously. The second data set may be collected by the first plurality of sensors or a second plurality of sensors.

The method may comprise collocating the second data set resulting in a second collocated data set. The second collocated data set may correspond with one or more second three-dimensional working models of the one or more three-dimensional objects. This step may be performed by one or more processors. The processors may be local to one or more sensor apparatuses, docking stations, computing devices, application servers, or any combination thereof. This step may be performed autonomously. This step may include utilizing a neural network.

The method may comprise interpreting the second collocated data set. Interpreting may be performed by comparison of the second collocated data set to the one or more pre-fabricated three-dimensional models and/or the one or more first three-dimensional working models, to determine the identity of the one or more three-dimensional objects associated with the one or more second three-dimensional working models. The interpreting may be performed by one or more processors. The processors may be local to (on-board) one or more sensor apparatuses, docking stations, computing devices, application servers, or any combination thereof. This step may be performed autonomously. This step may utilize a neural network.

Interpreting may be performed by comparison of the one or more points in physical space on the one or more three-dimensional objects to a boundary model comprising pre-determined boundaries of the one or more three-dimensional objects within a site to determine the identity of the one or more three-dimensional objects. The pre-defined boundaries may be defined in two-dimensional space, in three-dimensional space, or both. This step may be performed by one or more processors. The processors may be local to one or more sensor apparatuses, docking stations, computing devices, application servers, or any combination thereof. This step may be performed autonomously. This step may utilize a neural network.

Advantageously, the comparison to determine three-dimensional objects' identity may drastically reduce the amount of time and susceptibility to error involved with identification of objects via human visual inspection.

The method may comprise comparing the first collocated data set and the second collocated data set, respectively associated with a matching identity of the one or more three-dimensional objects to determine the existence of similarities and/or differences between the first collocated data set and the second collocated data set and thereby determine the existence of similarities and/or differences between the first plurality of attributes and the second plurality of attributes. This step may be performed by one or more processors. The processors may be local to one or more sensor apparatuses, docking stations, computing devices, application servers, or any combination thereof. This step may be performed autonomously. This step may utilize a neural network.

The comparing step may additionally or alternatively include comparing the second set of collocated data to the one or more pre-fabricated three-dimensional models associated with the matching identity of the one or more three-dimensional objects to determine the similarities and/or differences between the one or more pre-fabricated three-dimensional models relative to the second collocated data set. This step may be performed by one or more processors. The processors may be local to one or more sensor apparatuses, docking stations, computing devices, application servers, or any combination thereof. This step may be performed autonomously. This step may utilize a neural network.

The method may include a step of extrapolating one or more properties, operating conditions, or both from the first plurality of attributes, the second plurality of attributes, or both. The extrapolating step may be performed autonomously. The extrapolating step may be performed by one or more processors.

The method may include a step of retrieving one or more pre-fabricated three-dimensional models. The retrieving step may be performed autonomously. The retrieving step may be performed by a processor. The one or more pre-fabricated three-dimensional models may each be associated with the identity of the one or more three-dimensional objects, respectively. The processor may retrieve the one or more pre-fabricated three-dimensional models from a storage medium. The storage medium may be local to one or more sensor apparatuses, docking stations, computing devices, database servers, diagnostic devices, or any combination thereof. The storage medium may be remote from one or more sensor apparatuses, docking stations, computing devices, diagnostic devices, or any combination thereof.

The method may include the steps of designating the one or more first three-dimensional working models as one or more three-dimensional baseline models, respectively; and receiving the identity of the one or more three-dimensional objects associated with the one or more three-dimensional baseline models. The designating and/or receiving steps may be performed by a user. The step of comparing may include comparing the second set of collocated data to the one or more three-dimensional baseline models to determine the identity of the three-dimensional object. The step of comparing may be performed autonomously. The step of comparing may be performed by a processor.

The method may include a step of overlaying the pre-fabricated three-dimensional model, the one or more first three-dimensional working models, the one or more second three-dimensional working models, or any combination thereof resulting in a three-dimensional overlay model. The method may further include a step of displaying visual indicators of the similarities and/or differences on a visual reproduction of the one or more three-dimensional models. The overlaying step, the displaying step, or both may be performed autonomously. The overlaying step, the displaying step, or both may be performed upon a user's command. The overlaying step may be performed by one or more processors. The displaying step may be performed by a graphical user interface. A user may toggle between different visual reproductions, each showing one or more of the plurality of attributes. A user may explore the visual reproduction of the one or more three-dimensional models. The visual reproduction may be explorable in real-time. The time-lapse similarities and/or differences between two visual reproductions of three-dimensional models can be displayed. In this manner, human operators can review the models to determine what, if any, action is required to conduct maintenance operations. The similarities and/or differences may be displayed in a variety of forms, including color difference (e.g., on a red-green-blue or any other multi-dimensional color scheme) and/or brightness difference. Similarities and/or differences observed at present may be stored and may be employed to predict future occurrences. The visual reproduction may be explorable via the graphical user interface. The method may further include a step of summarizing differences into a report.

Time-lapse comparisons may be animated. That is, models fabricated from data at different periods of time may be presented as video frames. The frames may be organized in chronological order. The animation may comprise a progression through frames.

The second data set acquired last-in-time may be autonomously compared with any of one or more prior data sets.

One or any combination of the above steps may be repeated for one or more iterations. The second data set may comprise data sets acquired last-in-time and the first data set may comprise data sets acquired prior to the data set acquired last-in-time. The first data set may comprise data sets acquired immediately prior to the data set acquired last-in-time.

Advantageously, anomalies of three-dimensional objects that are relatively small in dimension or quantity may be identified by comparing models with sensed data.

Comparison of data sets to models may reduce the amount of time involved in identifying anomalies as compared to human visual inspection. Anomalies may be identified autonomously, and human inspectors may be alerted to the location of anomalies substantially instantaneously (in real-time as data is captured; or 10 minutes or less, 5 minutes or less, or even 1 minute or less after data collection is completed). Thus, human inspectors may not need to inspect images in detail in order to identify anomalies. Furthermore, the method of the present disclosure provides for inspections on a magnitude and/or frequency that may not be achievable via human inspection, either in-person human inspections or by human visual comparisons of images. That is, in a single work shift, an inspector has a finite amount of time to perform inspections. For sites with a large magnitude of three-dimensional objects that need inspecting (e.g., oil refineries), three-dimensional objects built on a large scale (e.g., cranes), or three-dimensional objects that are not easily accessible without specialized equipment (e.g., steel framing of skyscrapers), inspections may require more than one work shift to perform (e.g., over one or more, two or more, three or more, or even four or more days). As the time to perform a complete inspection increases, there may be delays in addressing issues.

The resolution of inspections may be limited by visual comparisons of images of three-dimensional objects by human inspectors. During a finite amount of time allotted to perform an inspection, an inspector may only focus on broad areas of images. For example, the amount of time it takes to compare 0.1 cm by 0.1 cm sections of two images may be one or more orders of magnitude larger than the time it takes to compare 3 cm by 3 cm sections of the two images. The system and method of the present disclosure provides for high resolution inspections performed autonomously and substantially instantaneously (in real-time as data is captured; or 10 minutes or less, 5 minutes or less, or even 1 minute or less after data collection is completed). Furthermore, the system and method of the present teachings allows for the identification of anomalies that are sized one or more orders of magnitude smaller relative to the size of anomalies that may be identified via visual comparison of images.

Individual components of the collocated data sets may be autonomously compared. For example, only thermal data of two collocated data sets may be compared. More than one component of the collocated data sets may be autonomously compared, which may be otherwise referred to herein as a joint analysis. More than one component of the collocated data sets may characterize the same attribute of a three-dimensional object. For example, both a thermal signature and a vibrational signature may indicate that an engine is operational. One component of the collocated data sets may indicate the presence of an anomaly and other components of the collocated data set may confirm presence of an anomaly. Joint analysis may be utilized to indicate an underlying cause of an anomaly.

While the collocating steps and/or interpreting steps may be recited herein together with other steps, not all steps are necessary or essential to be employed with the collocating step and/or interpreting step.

The method may include populating a database with time-lapse progressions of models. That is, models fabricated from data collected at different periods of time. The models may include data associated with one or more attributes. The time-lapse progression of models may be analyzed to predict maintenance incidents. By way of example, an acoustic signature of a three-dimensional object may convey that noise in a region of an object becomes progressively louder over time. At some point, a maintenance incident may be ordered to address the noise. Thus, time-lapse progressions of models and/or a history of maintenance orders may be employed to predict when a future maintenance incident may be ordered for the same or a similar occurrence. A neural network may be employed to predict maintenance incidents based on time-lapse progressions of models and/or a history of maintenance orders.

C. Pre-Processing

The method may include a step of discarding extraneous data in the first data set and/or the second data set. The discarding step may be performed after one or both of the interpreting steps. The discarding step may be performed autonomously. The discarding step may be performed by a processor. The extraneous data may include data not associated with the one or more three-dimensional objects. After the discarding step the first collocated data set may have a size that is less than a size of the first data set, the second collocated data set may have a size that is less than a size of the second data set, or both.

The method may include a step of combining data sub-sets. The step of combining data sub-sets may be performed independent of the collocating step. The step of combining data sub-sets may be performed before or after the collocating step. The data sub-sets being may be associated with a particular sensor type. For example, data sub-sets comprising visual signatures of one or more three-dimensional objects may be combined and data sub-sets comprising acoustic signatures and thereafter the visual signatures and acoustic signatures may be collocated. The combining step may be performed autonomously. The combining step may be performed by a processor. The combining step may have the effect of compressing a size of and/or reducing noise of the first data set and/or the second data set.

The method may include a step of compensating for differences in illuminance with two-dimensional image data based on colocation of the two-dimensional image data through the one or more three-dimensional models. The differences in illuminance may include light incident on surfaces of the one or more three-dimensional objects, shadows cast onto the one or more three-dimensional objects, shadows cast by the one or more three-dimensional objects, or any combination thereof. The improved method of the present disclosure may utilize three-dimensional models to estimate which surfaces of the one or more three-dimensional objects have shadows cast upon them. In this manner, the comparison of two-dimensional image data to determine differences in illuminance between one point in time and another point in time is not obfuscated by shadows cast upon the one or more three-dimensional objects. The method may further include a step of compensating for differences in illuminance with two-dimensional data. As referred to herein, two-dimensional data may refer to visual data that is derived from one or more camera sensors at a discrete point in time. For example, the two-dimensional data may be derived from a still image from a video. The compensating step may be performed by one or more processors. The compensating step may be performed autonomously.

The method may include a step of compressing the first data set, the second data set, or both. The compressing step may be performed autonomously. The compressing step may be performed by a processor. The first data set, the first collocated data set, the second data set, the second collocated data set, or any combination thereof may be compressed by about 100× or more, 300× or more, 500× or more, 700× or more, or even 900× or more. The first data set, the first collocated data set, the second data set, the second collocated data set, or any combination thereof may be compressed by about 2000× or less, 1800× or less, 1600× or less, 1400× or less, or even 1200× or less. For example, a data set having a size of 5 GB may be compressed 1000× to a size of 5 MB.

The method may include one or any combination of steps performing calculations and/or corrections on data sets, including correcting for positional variance between sensors, calculating a mean of quantitative values associated with each of the one or more points in physical space and captured from the plurality of different positions, correcting for an angle of incidence of the plurality of sensors relative to the one or more points in physical space, or any combination thereof. These steps may be performed by a processor. These steps may be performed autonomously. These steps may be performed in substantially real-time. These steps may produce extraneous data, which may be discarded.

The method may include a step of correcting for a positional variance between sensors. This step may be performed by a processor. This step may be performed autonomously. This step may be performed in substantially real-time. The positional variance may be defined by a distance between sensors, a distance between sensors and a point of reference, or both. The point of reference may be arbitrarily assigned. For example, the point of reference may include a geometrical center of a sensor apparatus. Sensors may be located a distance from each other, even if they are affixed to the same apparatus. The distance may be about 1 cm or more, 5 cm or more, 10 cm or more, 20 cm or more, or even 30 cm or more. The distance may be about 1 m or less, 90 cm or less, 80 cm or less, 70 cm or less, or even 60 cm or less. A central observation axis of one or more sensors may be oriented at different or the same angle as one or more other sensors. The central observation axis may be the center-most axis, extending between the sensor and a three-dimensional object, in a sight-picture of the sensor. By way of example, the sight-picture of a sensor may extend conically from the sensor and the central observation axis may extend longitudinally through the conical sight-picture. The angle may be about 5° or more, 10° or more, 20° or more, or even 30° or more. The angle may be about 60° or less, 50° or less, 40° or less, or even 30° or less. The positional variance may result in improper collocation of a data set, improper comparison of collocated data sets, distortions of one or more models, or any combination thereof. For example, a visual signature may be skewed a distance from a thermal signature, the distance being generally equal to a distance between a camera sensor and thermal sensor. As a result, one or more models may not be accurate unless the positional variance is corrected. The positional variance may be corrected by subtracting out the positional variance from coordinates of points in physical space. The positional variance may be corrected by less than, equal to, or greater than the distance positional variance. The positional variance may be corrected to produce the best image as represented by a model. Best image may refer to an image that is most representative of the three-dimensional object. For example, subtracting out the positional variance, plus 1 mm, may produce a better image than the positional displacement alone.

Positional variance may be determined by calculating a position of sensors relative to a model constructed from the data gathering of the sensors. That is, a model comprising one type of data (e.g., visual data) and one or more models comprising one or more other types of data (e.g., thermal data, acoustic data, etc.) may be overlaid to provide a best fit of all models. This step may be performed by machine learning techniques. As a result, the positional offsetting required to produce a best fit overlay model may account for the positional variance of the sensors. Advantageously, the computational time and processing power may be reduced relative to performing a correction calculation on each and every data set as they are captured by the sensors.

The method may include calculating a mean of quantitative values associated with each of one or more points in physical space and captured from the plurality of different positions. This step may be performed by a processor. This step may be performed autonomously. This step may be performed in substantially real-time. The quantitative values may be associated with the first and/or second collocated data set. The quantitative values may include those associated with a visual signature, thermal signature, acoustic signature, vibration signature, chemical signature, or any combination thereof. It may be particularly advantageous to calculate a mean to simplify models, improve an aesthetic representation of models, reduce a size of a collocated data set, reduce noise of data in a collocated data set, or any combination thereof. For example, due to instrument (sensor) error, a sensed temperature of a portion of a three-dimensional object may vary, from point-to-point, by +/−2%. However, due to the proximity of points in physical space, it may be proper to assume that the points should all be the same temperature and thus a mean of temperatures associated with multiple proximal points in physical space may be attributed to all, or at least a portion of, the points in physical space. As another example, due to instrument (sensor) error, each iteration of measuring the same point in physical space may involve an error of +/−2%. By obtaining a mean of multiple iterations of measuring the same point in physical space, a more accurate model may be constructed. Each iteration of measurement may be performed all at a first time, all at a second time, or both. The quantitative values may be associated with one or more points in physical space captured from a plurality of different positions. The quantitative values may include multiple measurements of the same point in physical space. The multiple measurements may be performed during a single data collection instance. For example, a sensor may travel a path around a three-dimensional object and capture measurements of the same point in physical space from various positions along the path. The mean may be calculated from 10 or more, 20 or more, 30 or more, or even 50 or more quantitative values. The mean may be calculated from 10,000 or less, 1,000 or less, or even 100 or less quantitative values. While reference is made to the mean herein, the present application contemplates that other statistical measures (e.g., median) may be employed. The particular statistical measure employed may depend on the characteristics of the data set on which it is applied to. For example, a data set with outliers having a large magnitude may be better averaged by a median.

The method may include correcting for angle of incidence. This step may be performed by a processor. This step may be performed autonomously. This step may be performed in substantially real-time. The angle of incidence may be between the plurality of sensors relative to the one or more points in physical space. The angle of incidence may be defined by a position of the plurality of sensors relative to an orthogonal axis of the one or more points in physical space. On curved surfaces, the orthogonal axis may be relative to a tangent line. The angle of incidence may be 0° when a sensor is colinear with an orthogonal axis of a point in physical space. The angle of incidence may affect accuracy of measurements. Measurements may generally be most accurate when taken along an orthogonal axis of a point in physical space. For example, temperature of a point in physical space on the three-dimensional object taken from an incidence angle of 60° may be different than temperature of the same point taken from an incidence angle of 0°.

The method may include a step of correcting for sensor variance. This step may be performed by a processor. This step may be performed autonomously. This step may be performed in substantially real-time. Sensor variance may be characterized by differences in quality and/or quantity of data collected by the same sensor, different sensors of the same type (e.g., a first camera sensor and a second camera sensor), or both. Sensor variance may result from different manufacturer models, wear and tear, measurement tolerance, the like, or any combination thereof. For example, a CMOS sensor may be characterized by a +/−0.5% tolerance from the manufacturer and while capturing images of the same three-dimensional object at two different times, a first CMOS sensor may operate at +0.5% and a second CMOS sensor may operate at −0.3%. One or more first sensors may collect data at a first time and any number of subsequent times. One or more first sensors may collect data at a first time and one or more second sensors may collect data at any number of subsequent times. One or more sensors may capture one or more baseline measurements. One or more baseline measurements may be compared to a standard reference. Data collected by a sensor may be corrected by adjusting by a difference between one or more baseline measurements and a standard reference. One or more first sensors may capture one or more first baseline measurements and one or more second sensors may capture one or more second baseline measurements. Data collected by the one or more first and/or second sensors may be corrected by adjusting by a difference between the one or more first baseline measurements and the one or more second baseline measurements.

The method may include a step of prioritizing similarities and/or differences. This step may be performed by a processor. This step may be performed autonomously. This step may be performed in substantially real-time. The similarities and/or differences may be prioritized based on a dangerous condition. For example, presence of a chemical leak (e.g., hydrocarbon) near a heat source may be a dangerous condition. A user may be alerted to a dangerous condition. The similarities and/or differences may be identified. Identities of similarities and/or differences may be cross-referenced to a pre-determined correlations of dangerous conditions. The similarities and/or differences may be associated with one or more points in physical space. A distance may be calculated between one or more points in physical space of a first similarity and/or difference and one or more points in physical space of a second similarity and/or difference. A distance may be calculated between one or more points in physical space of a similarity and/or difference and one or more points of a three-dimensional object. The distance may be cross-referenced with a pre-determined threshold distance. The pre-determined threshold distance may include a distance under which a dangerous condition may be present. For example, a chemical leak 1 meter away from a heat source, where a pre-determined threshold distance is 10 meters, may result in a determination that a dangerous condition may be present.

The method may include a step of adjusting one or more operating conditions. This step may be performed by a processor. This step may be performed autonomously. This step may be performed in substantially real-time. One or more operating conditions may be adjusted by a controller of a three-dimensional object. One or more sensor apparatuses, docking stations, computing devices, diagnostic devices, or any combination thereof may be in communication with a controller of a three-dimensional object. The three-dimensional object may have a pre-determined operating condition and/or pre-determined operating condition range. For example, a three-dimensional object may have a pre-determined operating temperature range of between 30° C. and 50° C. A sensor apparatus may sense that a three-dimensional object is operating outside of a pre-determined operating condition and/or pre-determined operating condition range. The sensor apparatus may communicate with a controller of a three-dimensional object and direct the controller to adjust an operating condition to within pre-determined operating condition and/or pre-determined operating condition range. Adjusting an operating condition may include, but is not limited to, turning on/off a three-dimensional object, adjusting a temperature, adjusting a speed, adjusting a frequency, adjusting a fluid flow, the like, or any combination thereof. The sensor apparatus may communicate with one or more docking stations and/or computing devices. The sensor apparatus may direct one or more docking stations and/or computing devices to direct a controller to adjust an operating condition to within pre-determined operating condition and/or pre-determined operating condition range.

The method may include a step of calculating a gauge reading. This step may be performed by a processor. This step may be performed autonomously. This step may be performed in substantially real-time. The gauge reading may be digital, analog, or both. The gauge may include an indicator. The indicator may include a digital numeral display, needle, fluid meniscus, float, the like, or any combination thereof. An indicator and/or position thereof at a first time may be compared to an indicator and/or position thereof at a second time. The position may be linear, angular, or both. For example, a pressure gauge may include a needle and the needle may be oriented at an angle at a first time and another angle at a second time. The position may be correlated to graduations of a gauge. A camera sensor may detect a position of an indicator. A gauge reading may be calculated by comparing the position of the indicator to pre-determined graduations of a gauge. A camera sensor may detect a position of an indicator at a first time and a second time. A gauge reading may be calculated by comparing a position of an indicator at the first time to a position of an indicator at the second time and/or pre-determined graduations. The correlation between graduations and indicator position may be pre-determined. For example, it may be pre-determined that an angle of an indicator of 30° correlates to a graduation of 200 psi. Where the indicator is a digital display, an image of the digital display may be converted, by a processor, into text via optical character recognition.

The method may include a step of comparing operating states of two or more three-dimensional objects. This step may be performed by a processor. This step may be performed autonomously. This step may be performed in substantially real-time. The two or more three-dimensional objects may have a similar or identical make, model, the like, or any combination thereof. Facilities may include two or more three-dimensional objects with similar or identical make, model, or the like. It may be useful to compare operating states of similar or identical three-dimensional objects to determine issues that may otherwise not be discernable. For example, a first CNC machine may be known to produce workpieces with tighter tolerances than a second CNC machine and upon comparing operating states of the first and second CNC machines, via collocated data, a user may determine that the second CNC machine vibrates slightly more than the first CNC machine and the second CNC machine may be adjusted accordingly.

The method may include a step of deploying a diagnostic device. The diagnostic device may be deployed upon instruction of a processor. This step may be performed autonomously. This step may be performed in substantially real-time. The diagnostic device may be deployed upon the determination of a similarity and/or difference. The diagnostic device may be deployed upon the determination that a dangerous condition is present. The diagnostic device may be deployed in substantially real-time upon determination of a similarity, difference, dangerous condition, or any combination thereof. The diagnostic device may collect data associated with a similarity, difference, dangerous condition, or any combination thereof. The diagnostic device may include one or more specialized sensors. The specialized sensors may provide for a greater data quality and/or quantity relative to one or more sensors of a sensor apparatus. A model may be updated with data collected from a diagnostic device.

The method may include a step of deriving an acoustic fingerprint from an acoustic signature. The acoustic signature may comprise acoustic data of one or more three-dimensional objects and/or one or more three-dimensional subcomponents thereof. The acoustic data may include a number of samplings collected over a length of time. The acoustic data may be associated with one or more frequency ranges. An eigenvalue decomposition may be performed on samplings collected over a length of time and associated with a particular frequency range. The eigenvalue decomposition may produce an acoustic fingerprint. The acoustic fingerprint may be associated with a point in physical space of one or more three-dimensional objects and/or one or more three-dimensional sub-components thereof. An amplitude of an acoustic fingerprint at one or more points in physical space may be attributed to a source of an acoustic signature. For example, an acoustic fingerprint of a motor within a three-dimensional object may have an amplitude that is highest where the motor is physically located within the three-dimensional object. Furthermore, the motor may produce an acoustic signature at one or more points in physical space on the three-dimensional object where the motor is not located (e.g., vibrations travelling through the three-dimensional object), however, the amplitude may be lower at these locations as compared to where the motor is located. It may be appreciated that by this method, an acoustic fingerprint may be attributed to one or more three-dimensional objects and/or one or more three-dimensional subcomponents thereof. The method may further include detecting changes in operating conditions of one or more three-dimensional objects and/or one or more three-dimensional subcomponents thereof. Changes may be detected by comparing a first acoustic fingerprint generated at a first time and a second acoustic fingerprint generated at a second time.

The following are general observations applicable to all embodiments or other teachings of the present disclosure. The system and method of the present disclosure generally relates to monitoring one or more three-dimensional objects over time and reporting similarities and differences of the one or more three-dimensional objects over time. The system and method of the present disclosure may achieve this technical effect by employing electronic sensing devices (sensors) to capture data from one or more three-dimensional objects. The electronic sensing devices may employ manufactured hardware that interacts with the physical environment and converts its interaction with the physical environment to electrical signals. The electrical signals may be transmitted to a computer processor for operations, algorithms, rules, or any combination thereof to be applied to the electrical signals. The system and method of the present disclosure further may employ one or more processors to collocate the collected data, compare the collocated data of one or more three-dimensional objects captured at a first time and the collocated data of one or more three-dimensional objects captured at a second time. In contrast with conventional approaches, the collocation of data may be performed autonomously and substantially in real-time upon the instant of data collection. In contrast with conventional approaches, the collocation of data may be performed after correcting the illuminance of the data (e.g., reconciling the illuminance difference between pixels of a three-dimensional object at a first time and pixels of a three-dimensional object at a second time). The system and method of the present disclosure may compare the collocated data of one or more three-dimensional objects at a first time and the collocated data of one or more three-dimensional objects at a second time. Based upon the comparing step, a computing device may report the presence of similarities and/or differences over time. The collocating and comparing steps may be performed with or without generating (rendering) an optical image that may be displayable on a graphical user interface (e.g., computer monitor). The collocating and comparing steps may be performed with or without a human operator visually observing an optical image displayed on a graphical user interface. It may be appreciated by the teachings presented herein that performing the collocating and comparting steps without generating (rendering) an optical image and/or a human operator visually observing an optical image, results in less time in human labor spent visually observing images and also results in a compiled data set that is characterized by a size (e.g., byte size) that is considerably less as compared to conventional methods.

The method may include autonomously refining one or more points in physical space associated with the first collocated data set, the second collocated data set, or both. During each iteration of data acquisition, instrument (sensor) error may result in the one or more points in physical space being shifted, in one or more directions, from its true position with respect to the three-dimensional object being sensed. This may result in smooth surfaces of a three-dimensional object being digitally displayed on a user interface as rough, jagged, undulating, or the like. The autonomous refining may comprise comparing the first collocated data set, the second collocated data set, or both to the pre-fabricated three-dimensional model. The autonomous refining may comprise differentiating one or more anomalies, if present, from instrument error. The autonomous refining may comprise shifting the one or more points in physical space not associated with the one or more anomalies to cooperate with the pre-fabricated three-dimensional model. Shifting of one or more points in physical space associated with anomalies of the three-dimensional object being sensed may be avoided. That is, the refining may avoid masking the presence of anomalies. Anomalies may be differentiated from instrument error by defining a threshold variance. For example, shifting may be avoided for a point in physical space in a data set that varies by 1% or greater from a point in physical space in a pre-fabricated three-dimensional model. The threshold variance may be about 0.1% or more, 0.5% or more, 1% or more, or even 2% or more. The threshold variance may be about 5% or less, 4% or less, or even 3% or less. The refining step may be performed by one or more processors.

The method may include a step of providing results to a computerized maintenance management system (CMMS) and/or an enterprise resource planning (ERP). An exemplary, non-limiting example of a suitable CMMS may include IBM Maximo Maintenance Database. The CMMS may function to organize, plan, and regulate a business activities. The business activities may include inspections, maintenance, preventative maintenance, inventory, stocking, the like, or any combination thereof. The ERP may function to manage business forms including but not limited to accounting, purchasing, manufacturing, inventory, procurement, project management, the like, or any combination thereof. The CMMS and/or ERP may be accessed via an application programming interface (API).

The results of the method herein may be provided to a CMMS and/or ERP. The CMMS may generate a work ticket.

The work ticket may convey to a human person (e.g., mechanic) repairs, modifications, and/or adjustments that need to be performed on one or more three-dimensional objects. The human person may indicate to the CMMS that the repairs, modifications, and/or adjustments have been performed. The CMMS may generate a scheduled future inspection date to determine if the underlying issue has been resolved.

After one or more of the pre-processing steps, a model (e.g., overlay model) may have a size that is about 1 or more, 2 or more, or even 3 or more orders of magnitude less than the data sets obtained by the sensors. After one or more of the pre-processing steps, a model may have a size that is about 6 or less, 5 or less, or even 4 or less orders of magnitude less than the data sets obtained by the sensors.

Exemplary Applications

Some exemplary applications of the system and method of the present disclosure are discussed herein. These examples are intended not to exclude other applications. These examples are merely illustrative.

The system and method of the present disclosure may be employed to determine if operating conditions of objects are normal. For example, sensors may determine if an oven intended to operate at 200° C. is actually operating at that temperature.

The system and method of the present disclosure may be employed to control operating conditions. Upon determining an object is operating outside of normal operating conditions, the system of the present disclosure may communicate with a controller of the object to modify the operating condition. Such communication may be autonomous.

The system and method of the present disclosure may be employed to monitor construction. Inspections may be performed at various points in time to determine if a construction project is proceeding according to schedule, the construction is being properly executed, or both.

The system and method of the present disclosure may be employed to monitor inventory. Sensors may identify inventory and determine what inventory is incoming and outgoing.

The system and method of the present disclosure may be employed to perform maintenance. Sensors may determine if an object is damaged or operating sub-optimally. Maintenance employees may be notified of any action that may be required. Advantageously, the plurality of different types of sensors, data collocation, and/or model creation may identify sub-optimal operation that would otherwise result in damage to the object, and direct operational adjustments to prevent damage from occurring.

The system and method of the present disclosure may be employed to perform quality control on manufactured articles. The system and method of the present disclosure may be particularly suited for quality control of large-scale or complex articles.

Illustrative Examples

Figure 4:
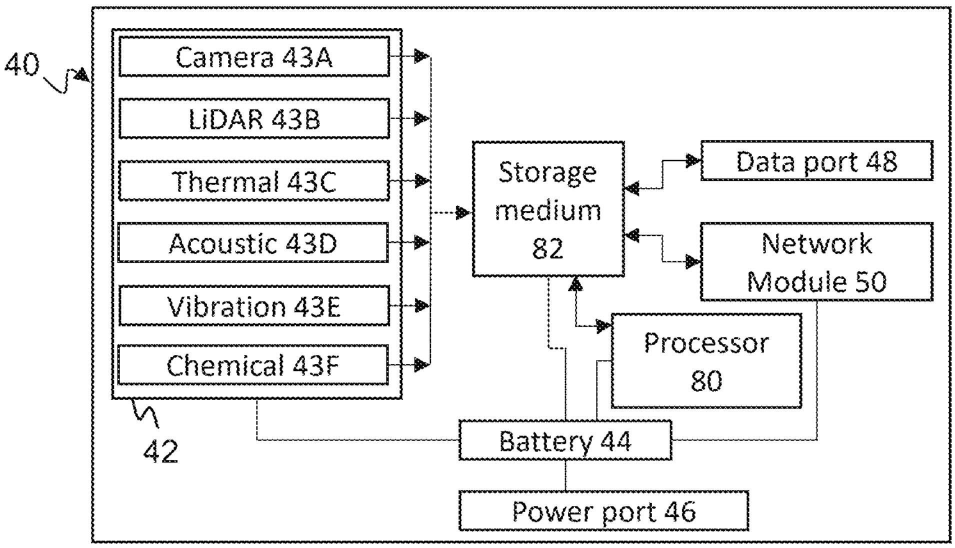
FIG. 4 illustrates a schematic of a sensor apparatus.

FIG. 1 shows a plan view of a roving operation 200 of a sensor apparatus 40. Three-dimensional objects 10 are statically located within and spatially distributed throughout a site 16. One of the objects 10 comprises a three-dimensional sub-component 12 and an interface 24 is situated therebetween. Surrounding spaces 26 are located adjacent to and surrounding the objects 10. The objects 10, the sub-component 12, the interface 24, and the surrounding spaces 26 are sensed by the sensor apparatus 40. The sensor apparatus 40 departs from a docking station 60 and traverses a path 68 that extends around perimeters 20 of the three-dimensional objects 10. A plurality of sensors 42, such as shown in FIG. 4, captures data associated with the objects 10 at a plurality of different positions that lie along the path 68 as the sensor apparatus 40 traverses the path 68. At the end of the path 68, the sensor apparatus 40 returns to the docking station 60.

Figure 2:
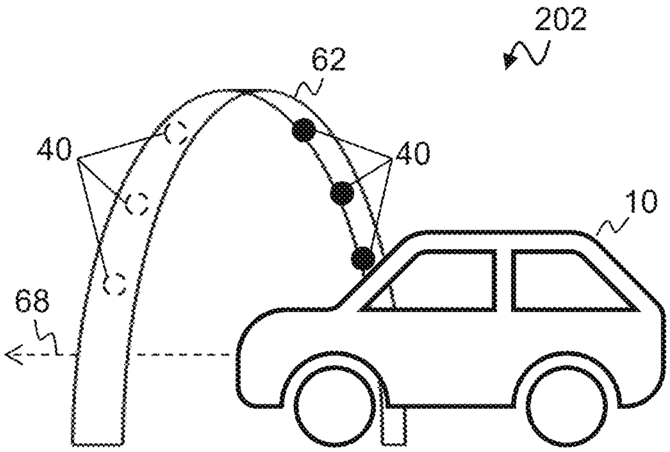
FIG. 2 shows a perspective view of a stationary operation of a plurality sensor apparatuses.

FIG. 2 shows a perspective view of a stationary operation 202 of a plurality sensor apparatuses 40. The plurality of sensor apparatuses 40 are statically mounted to a frame 62. A three-dimensional object 10 traverses a path 68 that passes by the sensor apparatuses 40. Each of the sensor apparatuses 40 include a plurality of sensors 42, such as shown in FIG. 4. The plurality of sensors 42 capture data associated with the object 10 as the object 10 traverses the path 68.

Figure 3:
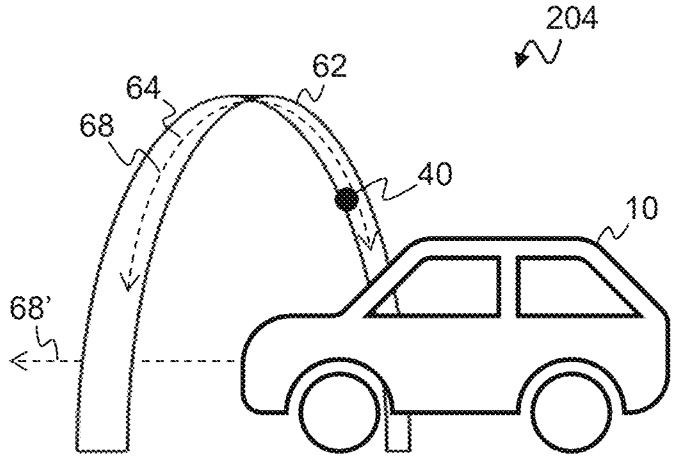
FIG. 3 shows a perspective view of a mutually relative motion operation of a sensor apparatus.

FIG. 3 shows a perspective view of a mutually relative motion operation 204 of a sensor apparatus 40. The sensor apparatus 40 is movably mounted to a frame 62 and the sensor apparatus 40 is movable along a track 64 on the frame 62. The track 64 guides the sensor apparatus 40 along a path 68 along the frame 62. The sensor apparatus 40 includes a plurality of sensors 42, such as shown in FIG. 4. A three-dimensional object 10 traverses another path 68' that passes by the sensor apparatus 40. During operation, the sensor apparatus 40 and the object 10 traverses their respective paths 68, 68' and the sensors 42 capture data associated with the object 10.

Figure 6A:
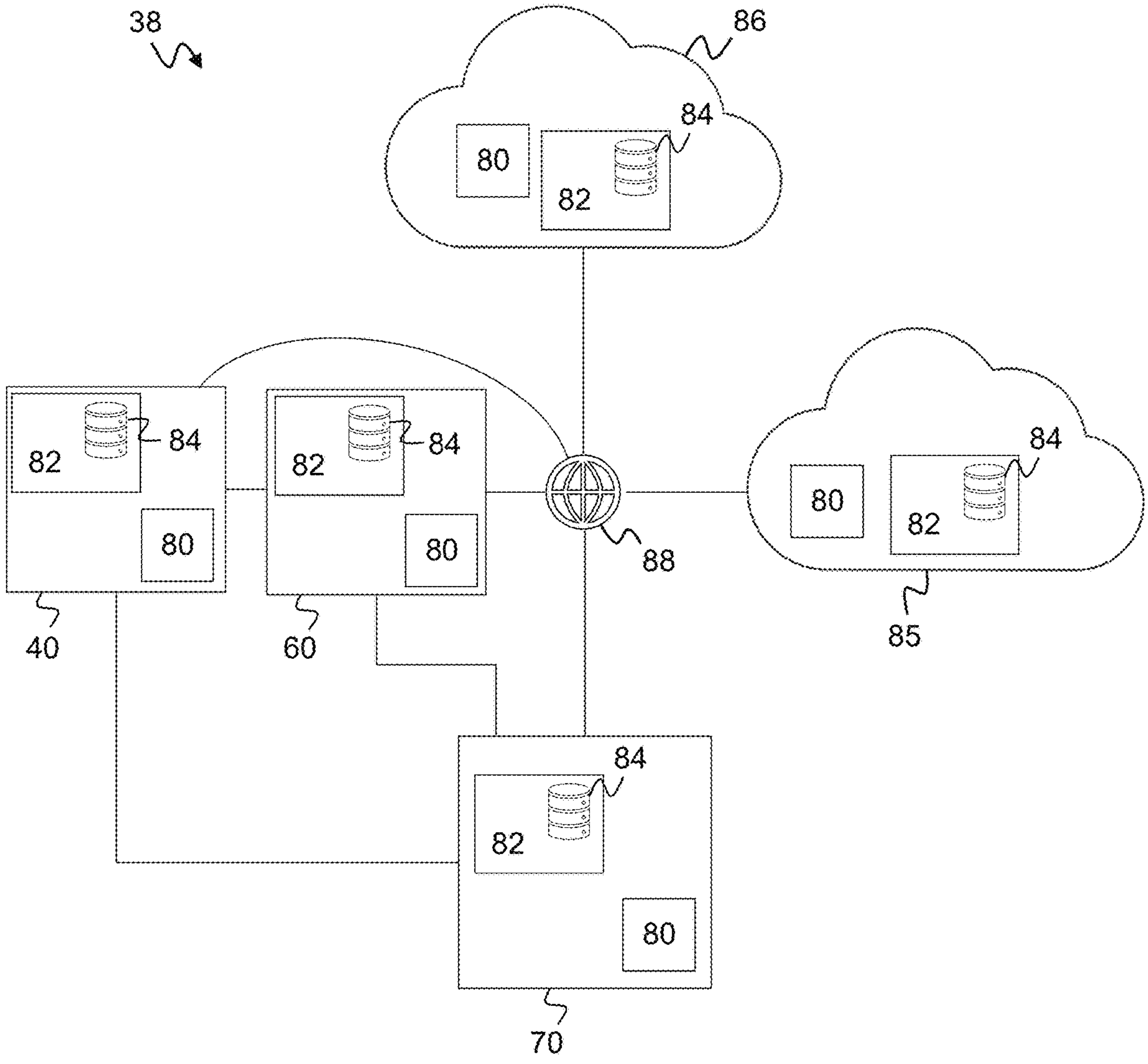
FIG. 6A illustrates a system according to the present disclosure.

FIG. 4 illustrates a schematic of a sensor apparatus 40. The sensor apparatus 40 comprises a plurality of sensors 42 including a camera sensor 43A, a LiDAR sensor 43B, a thermal sensor 43C, an acoustic sensor 43D, a vibration sensor 43E, and a chemical sensor 43F. The plurality of sensors 42 capture data associated with three-dimensional objects, such as illustrated in FIGS. 1-3. The data is transmitted from the plurality of sensors 42 to a storage medium 82. The storage medium 82 is in communication with a processor 80, a data port 48, and a network module 50. The processor 80 retrieves the data from the storage medium 82 and performs operations on the data according to the method of the present teachings. The data port 48 can transmit the data to a docking station 60 and/or a computing device 70, such as shown in FIG. 6A, via a wired connection. The network module 50 can transmit the data to a docking station 60 and/or a computing device 70, such as shown in FIG. 6, via a wireless connection. The plurality of sensors 42, the processor 80, the storage medium 82, and the network module 50 are powered by a battery 44. The battery 44 is re-chargeable via a power port 46.

Figure 5:
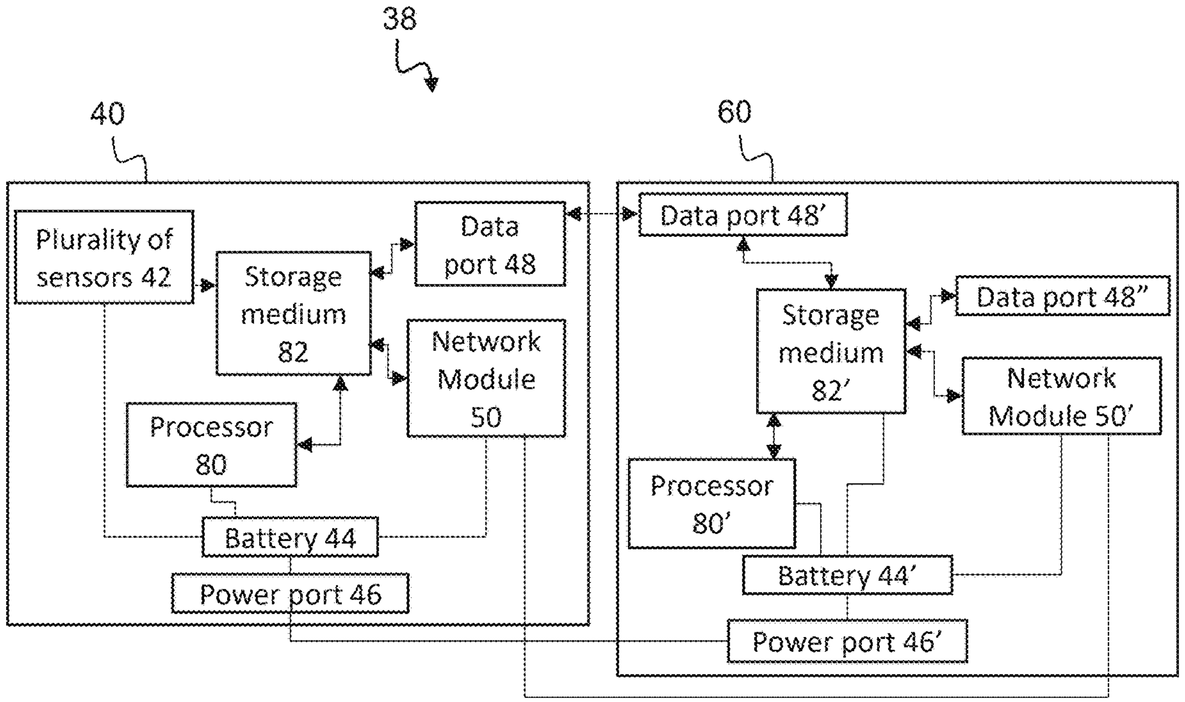
FIG. 5 illustrates a schematic of sensor apparatus and a docking station.

FIG. 5 illustrates a schematic of a sensor apparatus 40 and a docking station 60. The sensor apparatus 40 includes a plurality of sensors 42, a processor 80, a storage medium 82, a data port 48, a network module 50, a battery 44, and a power port 46. The data is transmitted from the sensors 42 to a storage medium 82. The storage medium 82 is in communication with a processor 80, a data port 48, and a network module 50. The processor 80 receives the data from the storage medium 82 and performs operations with the data according to the method of the present disclosure. The data port 48 receives the data from the storage medium 82 and transmit the data to a data port 48' of a docking station 60 via a wired connection. The network module 50 receives the data from the storage medium 82 and transmits the data to a network module 50' of a docking station 60 via a wireless connection. The sensors 42, the processor 80, the storage medium 82, and the network module 50 are powered by a battery 44. The battery 44 is re-chargeable via a power port 46.

The docking station 60 includes a processor 80', a storage medium 82', two data ports 48', 48", a network module 50', a battery 44', and a power port 46'. The docking station 60 receives the data by either or both of the data port 48' and the network module 50'. The data can be stored in the storage medium 82'. A processor 80' receives the data from the storage medium 82' and performs operations with the data according to the method of the present disclosure. The docking station 60 can transmit the data to a computing device 70, such as shown in FIG. 6, via a wired connection of the data port 48". The docking station 60 can transmit the data to a computing device 70, such as shown in FIG. 6, via a wireless connection of the network module 50'. The processor 80', the storage medium 82', and the network module 50' of the docking station 60 are powered by a battery 44' that is chargeable via a power port 46'. The battery 44 of the sensor apparatus 40 can be charged via the power port 46' of the docking station 60.

FIG. 6A illustrates a data collection and processing system 38. The data collection and processing system 38 comprises a sensor apparatus 40, a docking station 60, a computing device 70, a database server 85, and an application server 86, all of which are connected via a network 88. Data collected by the sensor apparatus 40 during the course of the operations such as illustrated in FIGS. 1-3 can be communicated to the docking station 60, the computing device 70, the database server 85, the application server 86, or any combination thereof. Each of the sensor apparatus 40, docking station 60, computing device 70, database server 85, and application server 86 comprise storage media 82 that includes a database 84 for storing the data. Each of the sensor apparatus 40, docking station 60, computing device 70, database server 85, and application server 86 comprise processors 80 for performing operations with the data. One or any combination of method steps according to the present teachings may be performed on a device while other method steps may be performed by other devices.

Figure 6B:
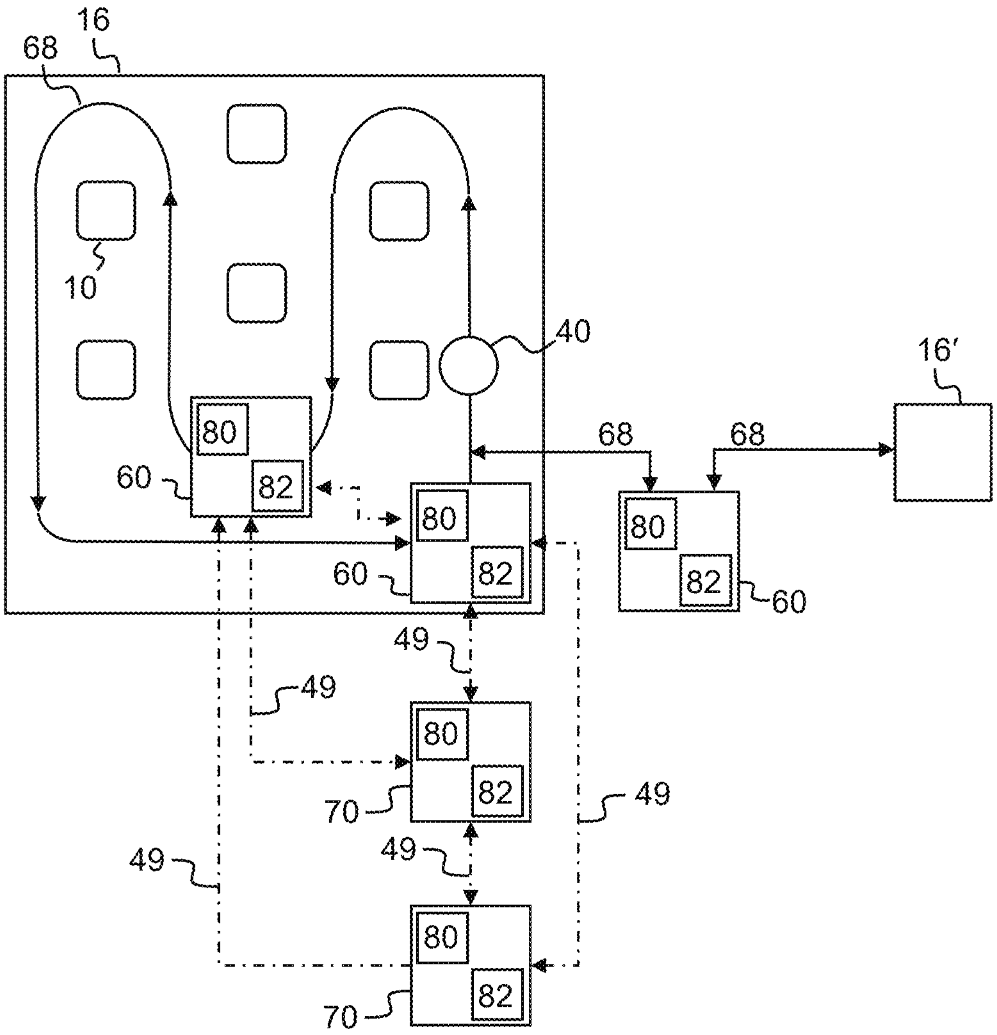
FIG. 6B illustrates a system according to the present disclosure.

FIG. 6B illustrates a schematic of the system of the present disclosure. The system comprises one or more distributed docking stations 60. The docking stations 60 are located within a site 16 and external from the site 16, 16'. The docking stations 60 include processors 80 and storage media 82. The method of the present teachings or at least a portion thereof may be carried out by the processors 80 executing computer-readable instructions. The computer-readable instructions may be stored on the storage media 82. Inputs and outputs of the processors 80 may be stored on the storage media 82.

The system comprises a sensor apparatus 40. The sensor apparatus 40 comprises a plurality of sensors 42, as illustrated in FIG. 4. The sensor apparatus 40 includes a processor 80 and storage medium 82, as illustrated in FIG. 4. The method of the present teachings or at least a portion thereof may be carried out by the processor 80 executing computer-readable instructions. The computer-readable instructions may be stored on the storage media 82. Inputs and outputs of the processor 80 may be stored on the storage medium 82.

The system comprises computing devices 70. The computing devices 70 are located remote from the sites 16, 16', although the present disclosure contemplates the computing devices 70 being located within or proximate to the sites 16, 16'. The computing devices 70 include a processor 80 and storage medium 82. The method of the present teachings or at least a portion thereof may be carried out by the processor 80 executing computer-readable instructions. The computer-readable instructions may be stored on the storage medium 82. Inputs and outputs of the processor 80 may be stored on the storage medium 82.

The sensor apparatus 40 may traverse within sites 16, 16' travel in between sites 16, 16', or both. The sensor apparatus 40 may traverse a path 68. The path 68 may be around one or more three-dimensional objects 10. The sensors 42 of the sensor apparatus 40, as shown in FIG. 4, may capture data of the objects 10 as it traverses the path 68. The sensor apparatus 40 may depart from a docking station 60, return to a docking station 60, temporarily stop at a docking station 60, or any combination thereof. The sensor apparatus 40 may signally communicate with the docking stations 60. The sensor apparatus 40 may exchange data with the docking stations 60 and/or charge its battery when engaged with a docking station 60.

The docking stations 60 may signally communicate with one another via a signal connection 49. The docking stations may signally communicate with computing devices 70 via a signal connection 49. Data captured by the sensors 42 and/or processed by one or more processors 80 may be communicated between the sensor apparatus 40, docking stations 60, computing devices 70, or any combination thereof.

Figure 7A:
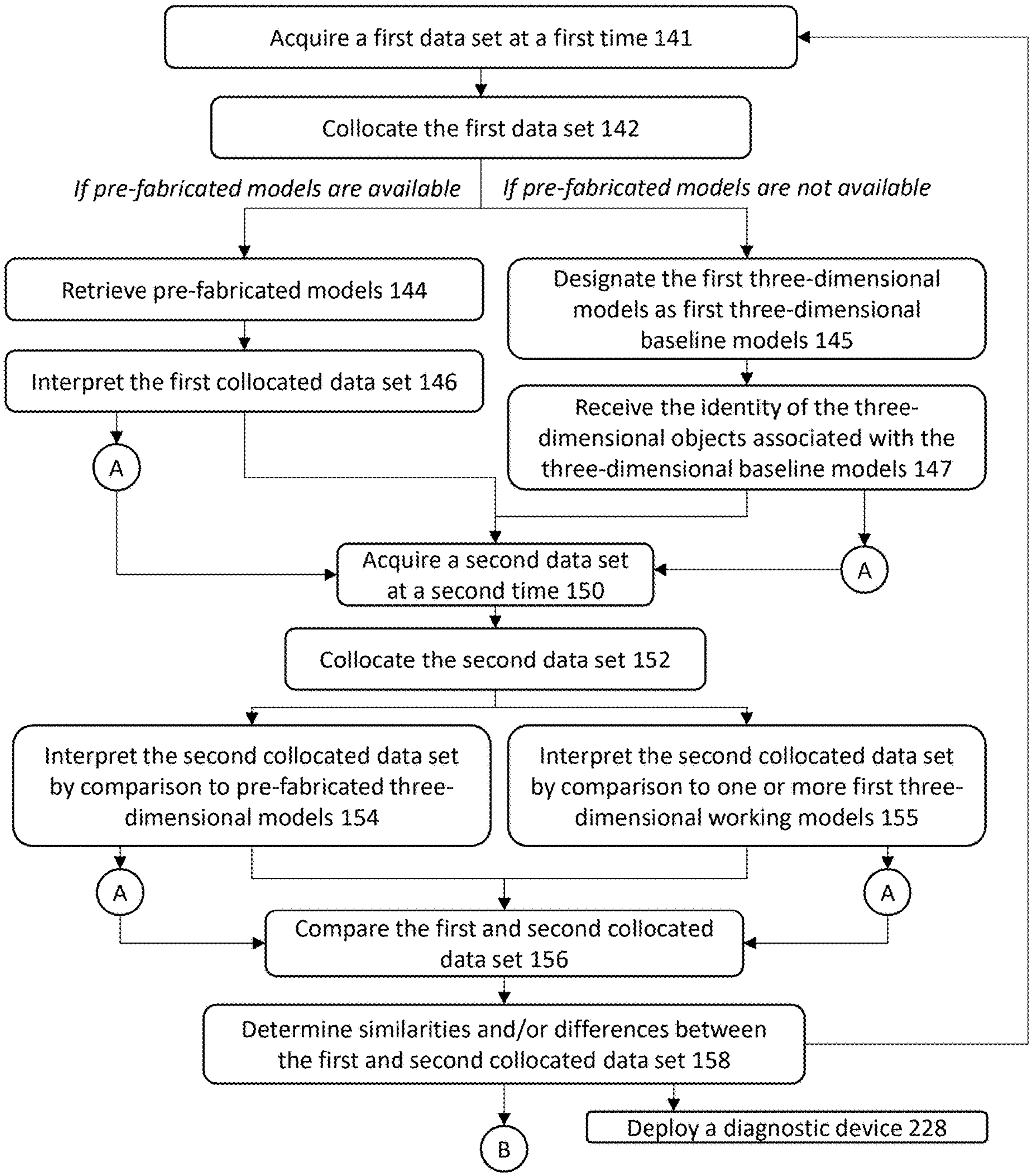
FIG. 7A illustrates a method according to the present disclosure.

FIG. 7A illustrates a method according to the present teachings. The method includes the steps of acquiring a first data set at a first time 141 and collocating the first data set 142, one or more first three-dimensional working models can be constructed from the first collocated data set.

If one or more pre-fabricated three-dimensional models are available, the pre-fabricated models are retrieved 144 and then the first collocated data set is interpreted 146 utilizing the pre-fabricated models to determine an identity of the first three-dimensional working models. The identity of objects from which the pre-fabricated models is pre-determined. Thus, comparing the pre-fabricated models to the working models informs of the identity of the objects of the working models.

If the pre-fabricated models are not available, the one or more first three-dimensional working models are designated as one or more first three-dimensional baseline models 145. The identity of the objects associated with the one or more three-dimensional baseline models 147 is then received. For instance, a human user may input the identity.

Figure 7B:
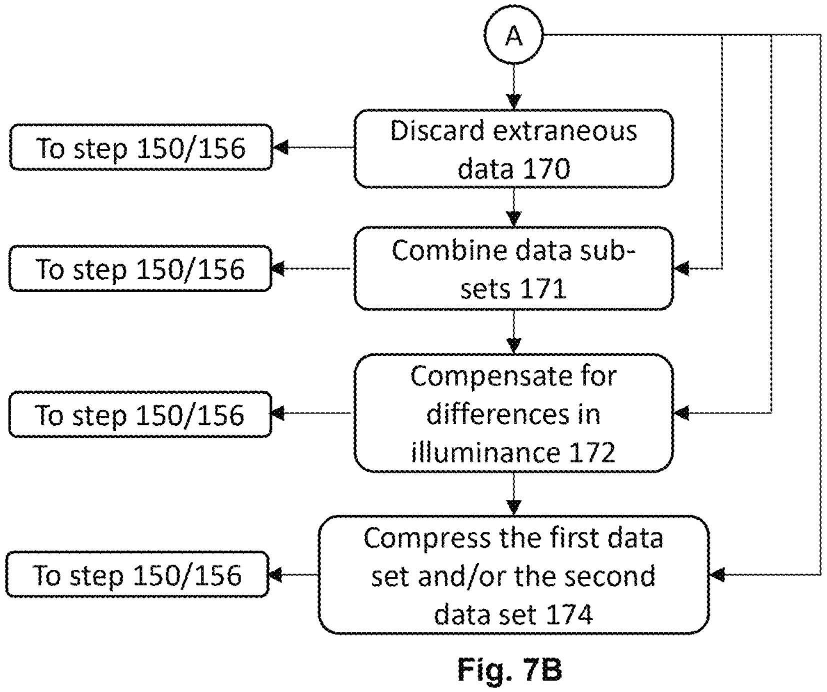
FIG. 7B illustrates a method according to the present disclosure.

After the steps 146 or 147, the method optionally includes the steps of FIG. 7B. After the steps 146 or 147, or the steps of FIG. 7B, a second data set is acquired at a second time 150 and then the second data set is collocated 152, one or more second three-dimensional working models can be constructed from the second collocated data set.

The second data set can be interpreted by either or both of comparison to pre-fabricated three-dimensional models 154 and comparison to first three-dimensional working models 155. After the steps 154 or 155, the method optionally includes the steps of FIG. 7B. After the steps 154 or 155, or the steps of FIG. 7B, the first and second collocated data sets are compared 156 and similarities and/or differences between the first and second collocated data set are determined 158. After step 158, the method optionally includes the steps illustrated in FIG. 7C. After step 158, the method optionally includes deploying a diagnostic device 228.

FIG. 7B illustrates a method according to the present teachings. The method optionally includes discarding extraneous data 170, compensating for differences in illuminance 172, compressing the first data set and/or the second data set 174, or any combination thereof.

Figure 7C:
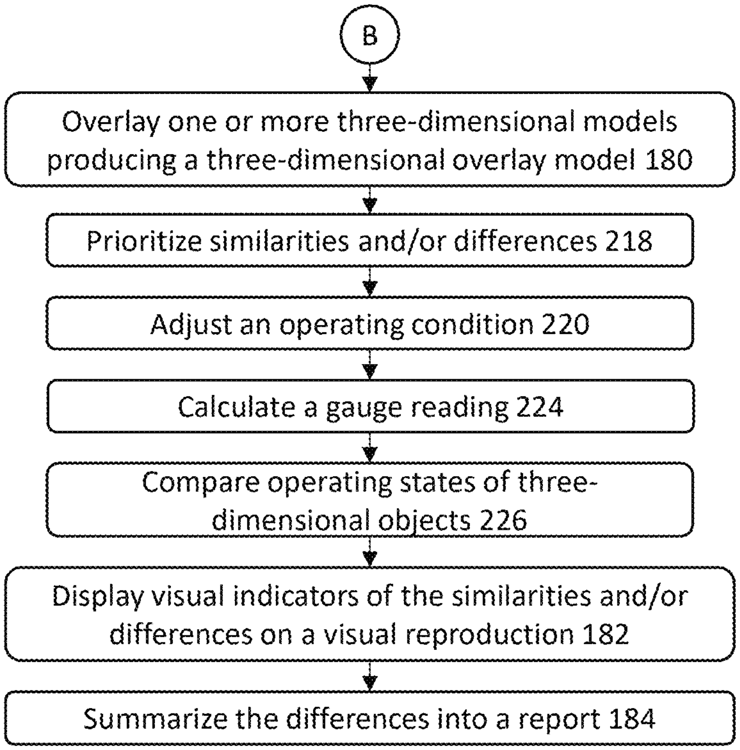
FIG. 7C illustrates a method according to the present disclosure.

FIG. 7C illustrates a method according to the present teachings. The method optionally includes overlaying one or more three-dimensional models-including pre-fabricated models, first working models, and second working models—to produce a three-dimensional overlay model 180. The method includes one or any combination of prioritizing similarities and/or differences 218, adjusting an operating condition 220, calculating a gauge reading 224, comparing operating states of objects 226, displaying visual indicators of similarities and/or differences on a visual reproduction of the models 182, summarizing differences into a report 184.

Figure 7D:
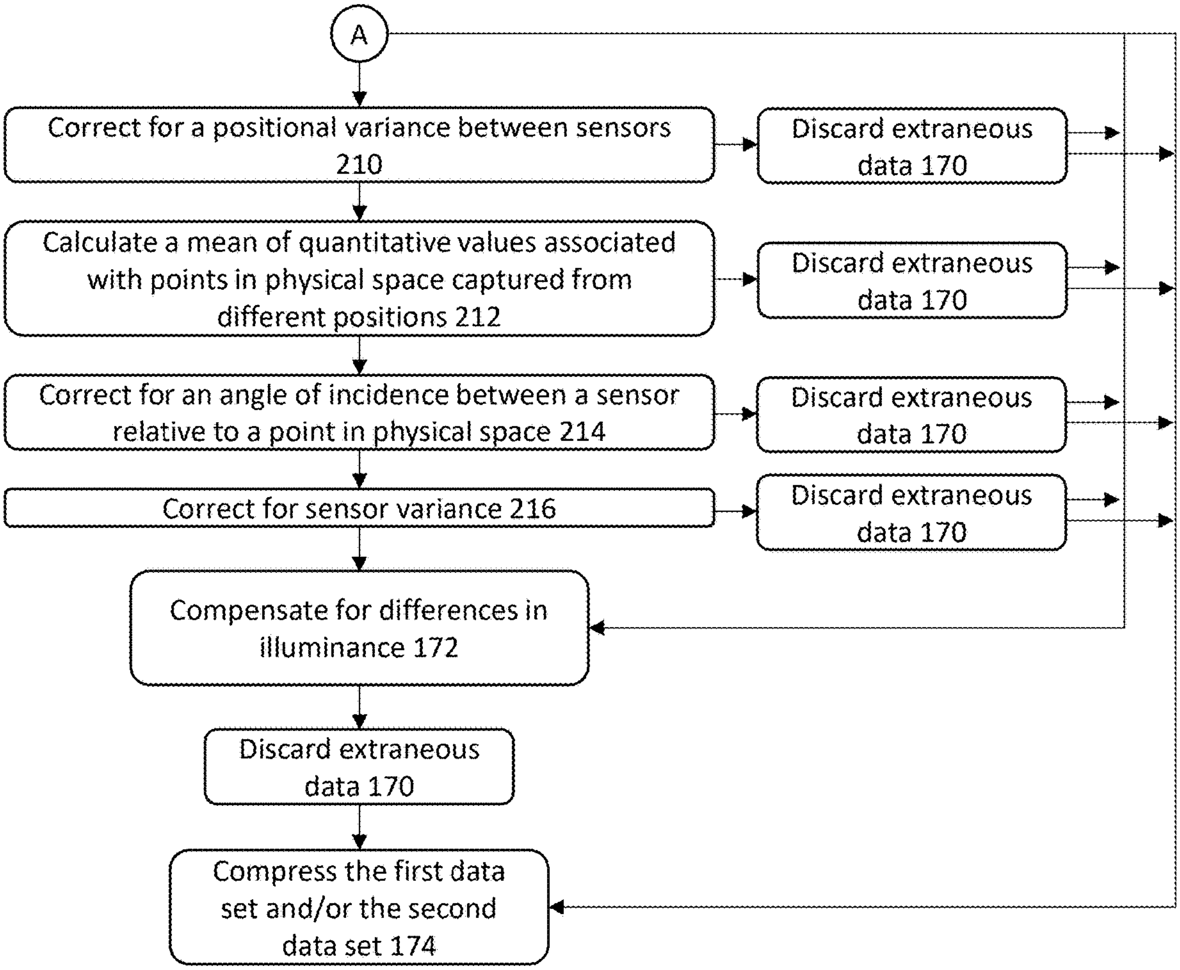
FIG. 7D illustrates a method according to the present disclosure.
Figure 8:
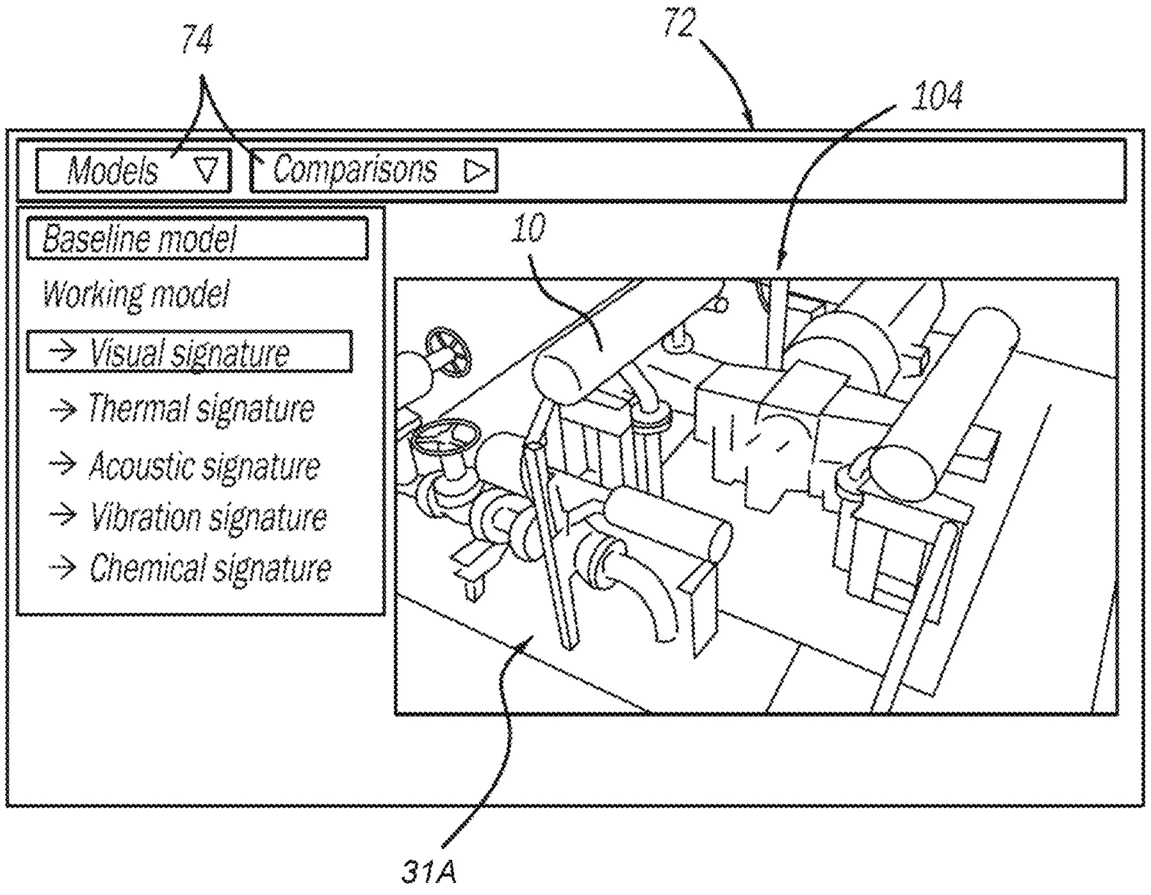
FIG. 8 illustrates a graphical user interface.

FIG. 7D illustrates a method according to the present teachings. The method optionally includes correcting for a positional variance between sensors 210, calculating a mean of quantitative values associated with points in physical space captured from different positions 212, correcting for an angle of incidence between a sensor relative to a point in physical space 214, correcting for sensor variance 216, and compensating for differences in illuminance 172. After each of steps 210, 212, 214, 216, and 172, the method optionally includes discarding extraneous data 170. The method optionally includes compressing the first data set and/or the second data set 174 after discarding extraneous data 170.

FIGS. 8-11 illustrate a graphical user interface 72. The graphical user interface 72 of FIG. 8 displays a three-dimensional baseline model 104 of a three-dimensional object 10. The object 10 is illustrated as an air compressor. The data embodying the baseline model 104 is a first data set that was captured by a sensor apparatus 40, such as shown in FIG. 4, at a first time. The data includes points in physical space 31A, which make up the point cloud of the compressor.

Figure 9:
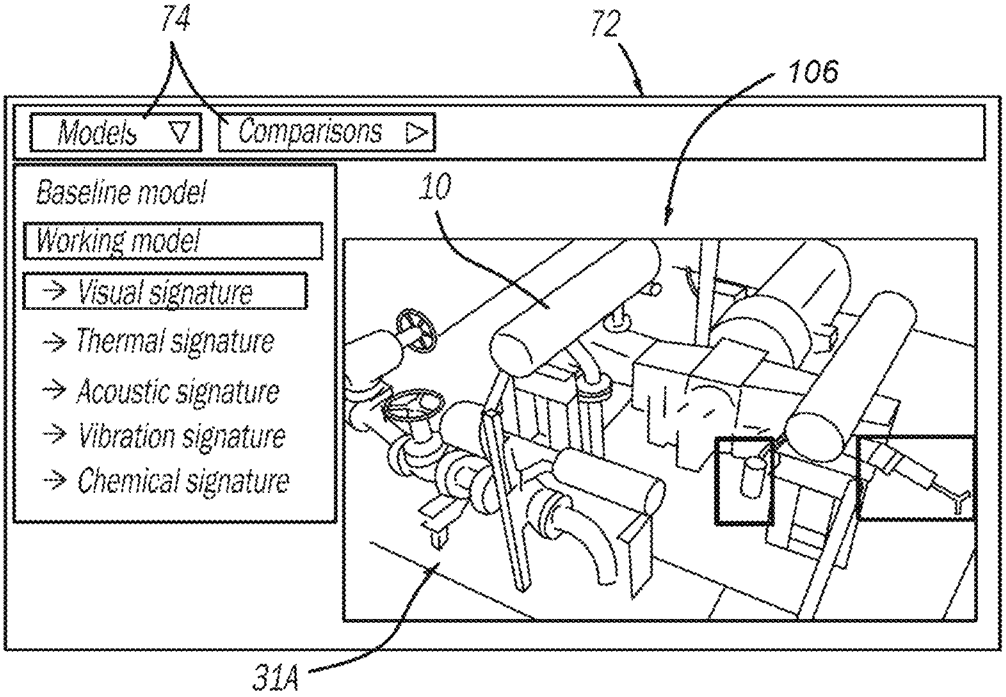
FIG. 9 illustrates a graphical user interface.

The graphical user interface 72 of FIG. 9 graphically displays a three-dimensional working model 106 of the object 10. The data embodying the working model 106 is a second data set that was captured by the sensor apparatus 40 at a second time. The data includes points in physical space 31A, which make up the point cloud of the compressor. The working model 106 includes additional sub-components not included in the baseline model 104 of FIG. 8. The additional sub-components are circumscribed by rectangles. The additional sub-components were added to the three-dimensional object 10 at a time between the first time and the second time.

The baseline model 104 and working model 106 can be overlaid, producing a three-dimensional overlay model 108, to assist an observer identify differences between the baseline model 104 and the working model 106.

Figure 10:
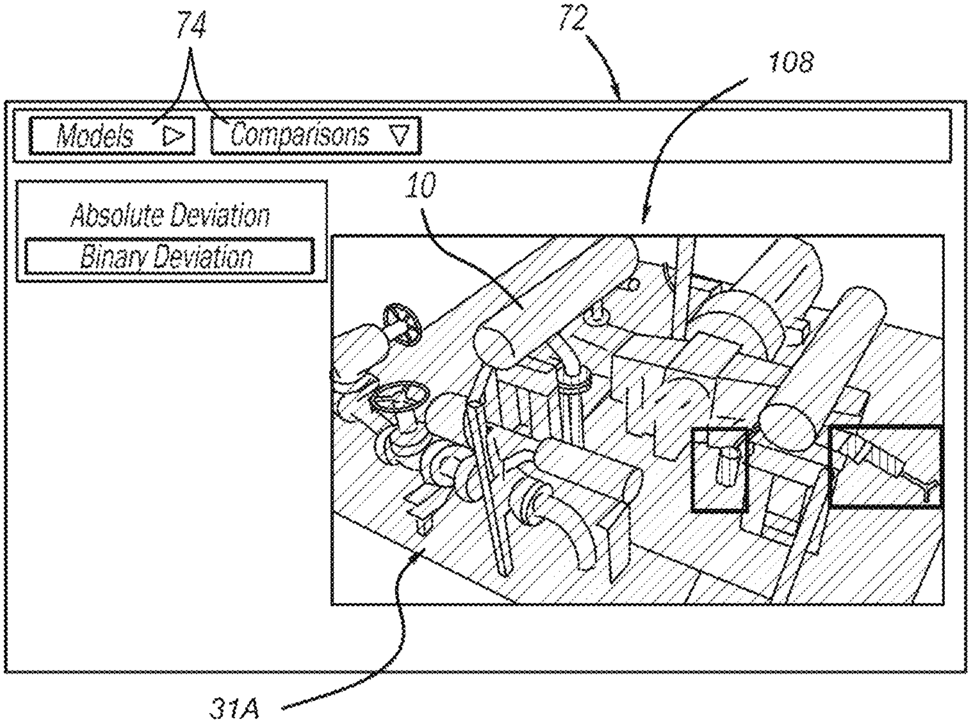
FIG. 10 illustrates a graphical user interface.
Figure 11:
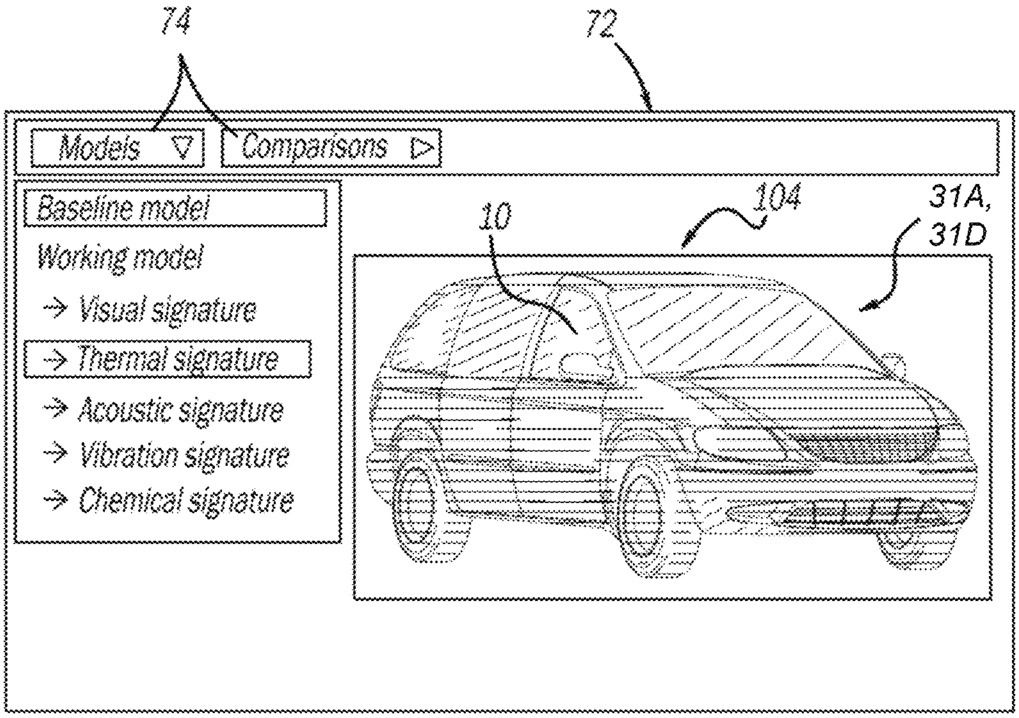
FIG. 11 illustrates a graphical user interface.

As shown in FIG. 10, a binary deviation is visually represented on the overlay model 108 by a color binary, whereby a second color (represented by vertical lines) is easily discernable from a first color (represented by diagonal lines). The data includes points in physical space 31A. The first color represents surfaces of the working model 106 that are similar to the same surfaces of the baseline model 104. The second color represents surfaces of the working model 106 that are different from the same surface of the baseline model 104.

A user can toggle between the baseline model 104, working model 106, and overlay model 108 by interacting with drop-down menus 74.

FIGS. 11-14 illustrate a graphical user interface 72. The graphical user interface 72 of FIG. 11 displays a three-dimensional baseline model 104 of a three-dimensional object 10. The data embodying the baseline model 104 is a first data set that was captured by a sensor apparatus 40, such as shown in FIG. 4 at a first time. The data includes points in physical space 31A and a thermal signature 31D. The object 10 illustrated is a mini-van. The body of the mini-van has a generally uniform thermal signature 31D (represented by horizontal lines). The windows of the mini-van have a generally uniform thermal signature 31D (represented by diagonal lines), but the signature is different from that of the body. This is due to the difference in how surfaces of different types of material conduct heat.

Figure 12:
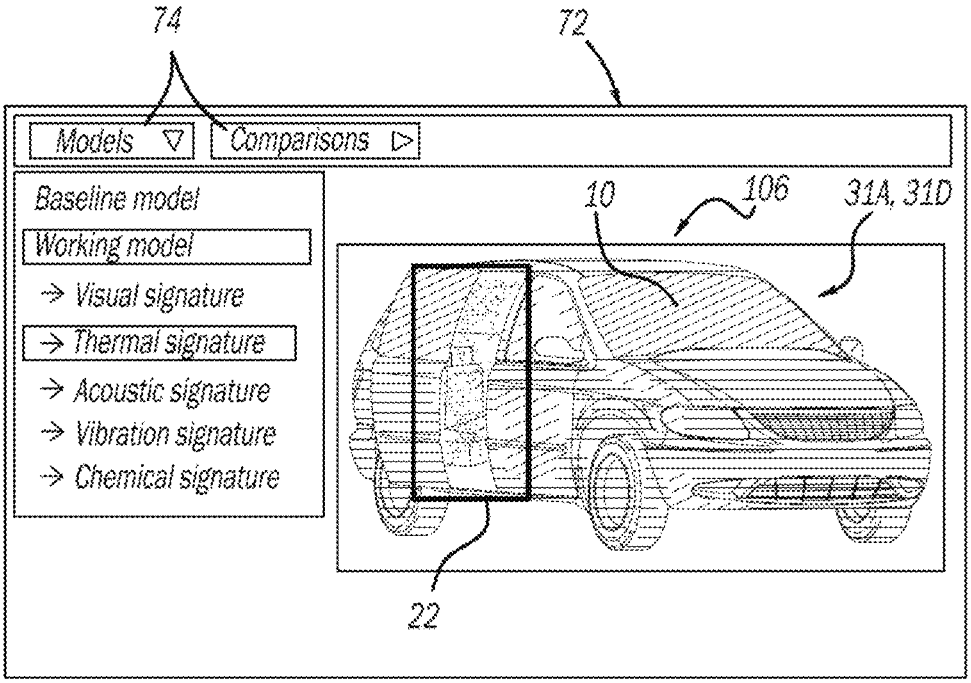
FIG. 12 illustrates a graphical user interface.

The graphical user interface 72 of FIG. 12 displays a three-dimensional working model 106 of the object 10. The data embodying the working model 106 is a second data set that was captured by the sensor apparatus 40 at a second time. The data includes points in physical space 31A and a thermal signature 31D. A surface 22 (circumscribed by a rectangle) of the working model 106 is different as compared to the baseline model 104, shown in FIG. 11. In particular, a sliding door of the object 10 was opened at a time between the first time and the second time. The positional shift of the door exposes the interior of the object 10. As illustrated in FIG. 12, the interior of the object 10 provides a different thermal signature 31D (represented by stippling) as compared to the thermal signature 31D of the external surfaces of the object 10 (represented by horizontal and diagonal lines). The baseline model 104 and working model 106 can be overlaid, producing a three-dimensional overlay model 108, to assist an observer identify differences between the baseline model 104 and working model 106.

Figure 13:
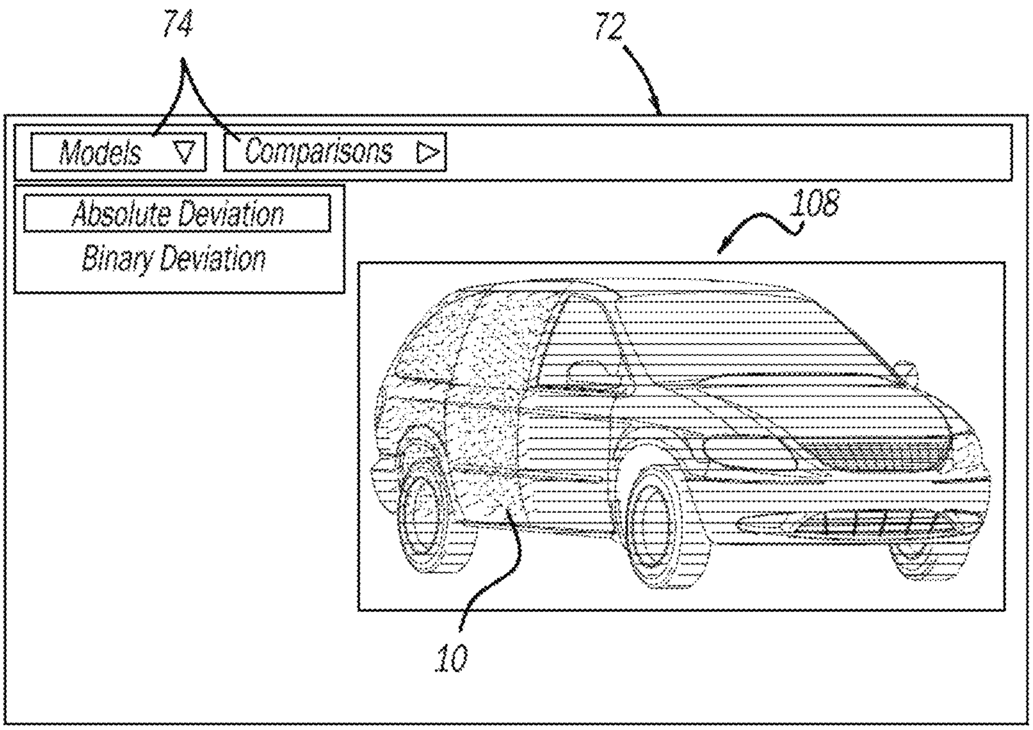
FIG. 13 illustrates a graphical user interface.

In FIG. 13, an absolute deviation is visually represented on the overlay model 108. The absolute deviation utilizes a color gradient, whereby hues of a second color (represented by stippling and diagonal lines around the boundaries of the stippling) are easily discernable from hues of a first color (represented by horizontal lines). The hues of the first color represent that a thermal signature 31D of the working model 106 is similar to the thermal signature 31D of the baseline model 104. The hues of the second color represent that the thermal signature 31D of the working model 106 is different from the thermal signature 31D of the baseline model 104. Each particular hue of the first color is determined by the degree of similarity. Each particular hue of the second color is determined by the degree of difference. Here, the stippling represents areas of greater differences relative to the diagonal lines.

Figure 14:
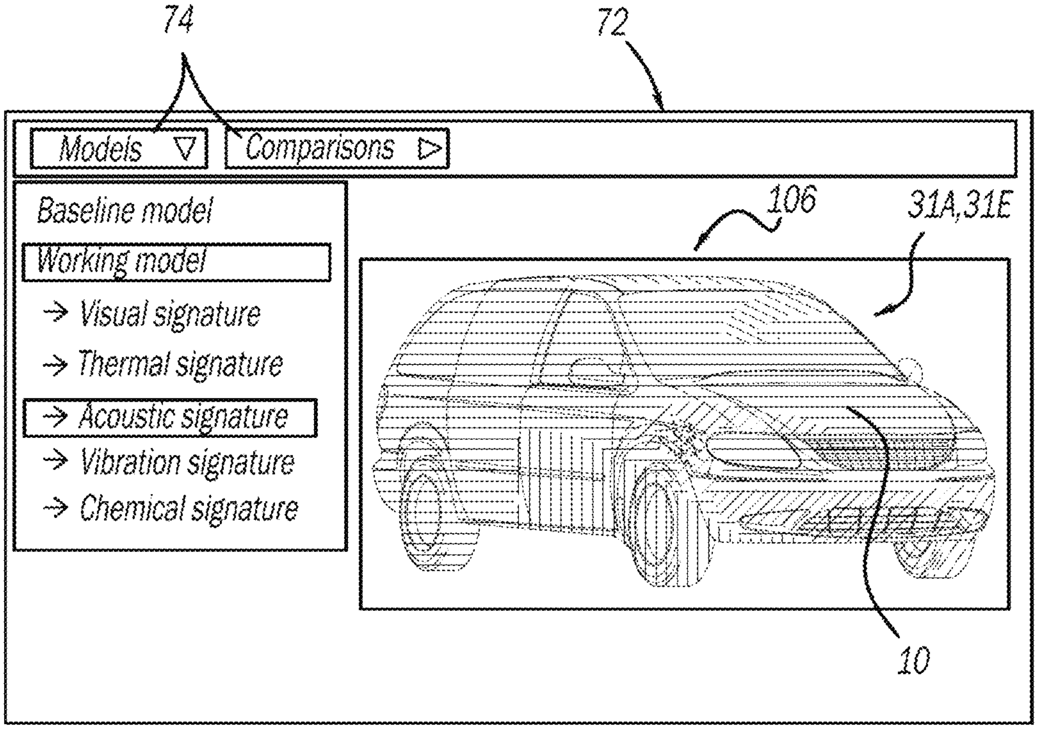
FIG. 14 illustrates a graphical user interface.

FIG. 14 illustrates a graphical user interface 72. The graphical user interface 72 displays a three-dimensional working model 106 of a three-dimensional object 10. The data embodying the working model 106 was captured by a sensor apparatus 40, such as shown in FIG. 4. The data includes points in physical space 31A and an acoustic signature 31E. The acoustic signature 31E comprises areas of relatively higher acoustic intensity, represented by vertical lines, diagonal lines, and stippling, and areas of relatively lower acoustic intensity, represented by horizontal lines. The areas of relatively higher acoustic intensity vary in intensity. That is, stippling conveys a higher acoustic intensity relative to diagonal lines and the diagonal lines convey a higher acoustic intensity relative to vertical lines. As a result, a user can determine the operating condition of the object 10. The working model 106 conveys to a user that the engine of the mini-van is operational. The acoustic energy from the engine located within the engine compartment is being translated to the front quarter panel, hood, fender, and front wheels.

A user can toggle between the baseline model 104, working model 106, and overlay model 108, as well as the attribute (e.g., thermal signature), by interacting with drop-down menus 74.

Figure 15:
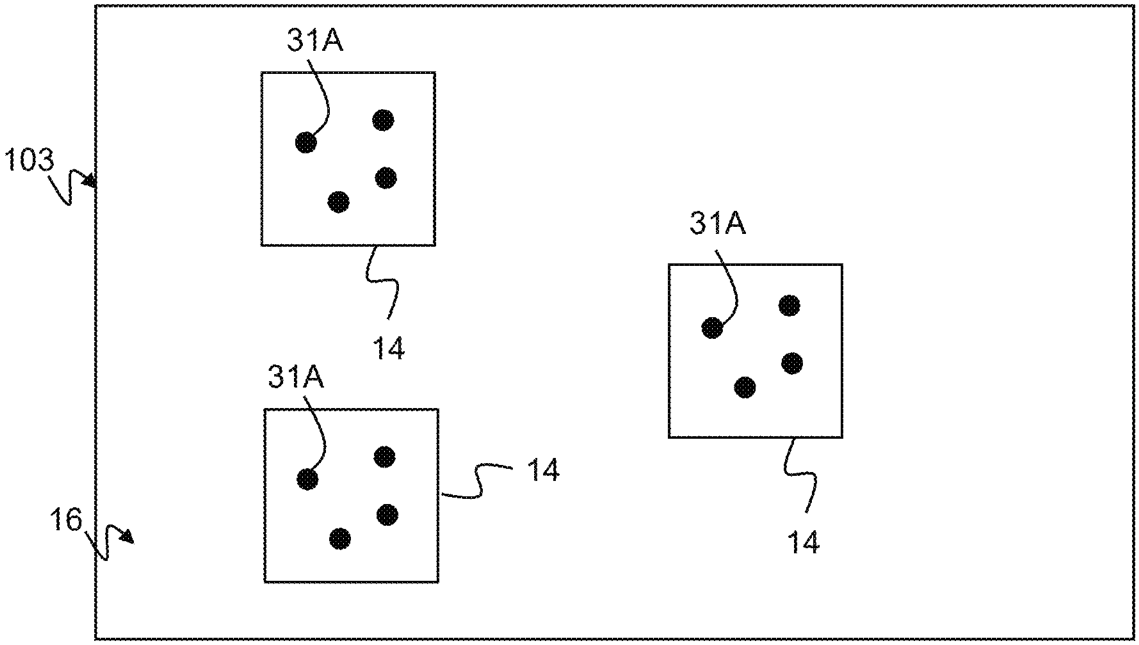
FIG. 15 illustrates a boundary model.

FIG. 15 illustrates a boundary model 103. The boundary model 103 includes a site 16 and three boundaries 14 distributed throughout the site 16. Each of the boundaries 14 were pre-drawn within the site 16 according to where a human operator expects objects 10, as shown in FIG. 1, associated with the boundaries 14 to be located within the site 16. Each of the boundaries 14 are designated with an identity of the object 10 expected to be situated therein. The boundary model 103 is overlaid with a working model comprising points in physical space 31A that were observed by a sensor apparatus 40, such as the one shown in FIG. 4. By overlaying the boundary model 103 with a working model, the points in physical space 31A become situated within the several boundaries 14, which indicates to a user the identities of the objects 10, that belong to those points in physical space 31A.

Figure 16A:
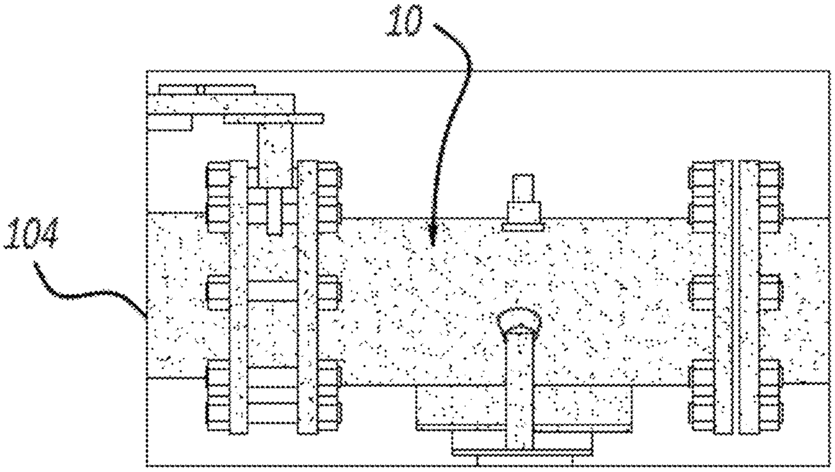
FIG. 16A illustrates a baseline model.
Figure 16B:
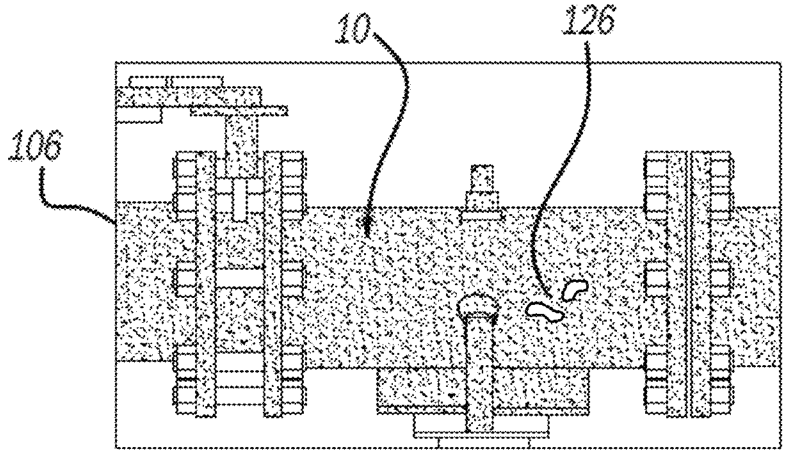
FIG. 16B illustrates a working model.
Figure 16C:
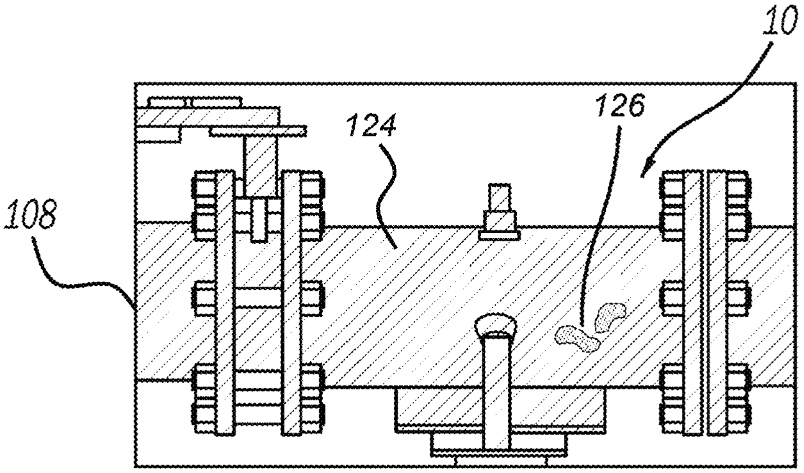
FIG. 16C illustrates an overlay model.

FIG. 16A through FIG. 16C illustrate a three-dimensional baseline model 104, three-dimensional working model 106, and three-dimensional overlay model 108, respectively. The three-dimensional object 10 depicted by the models is a pipe. A difference 126 between the baseline model 104 and the working model 106 is shown. Moreover, the illumination of the pipe's surface is darker in the working model 106 as compared to the baseline model 104, conveyed by comparatively heavier stippling in FIG. 16B. This could be due, for example, by less incident light upon the pipe's surface. The difference 126 is corrosion that has developed on the pipe's surface. The overlay model 108 is an overlay of the baseline model 104 and the working model 106. The overlay model 108 illustrates areas of similarity 124 and areas of difference 126.

Figure 17A:
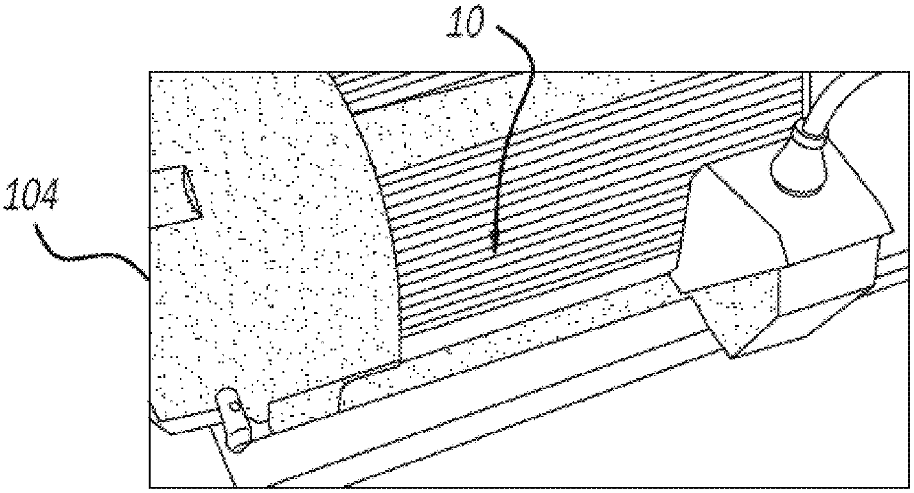
FIG. 17A illustrates a baseline model.
Figure 17B:
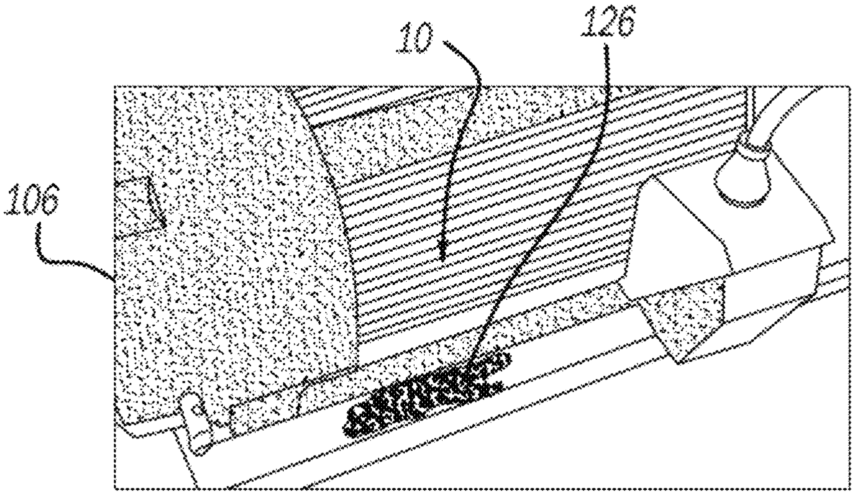
FIG. 17B illustrates a working model.
Figure 17C:
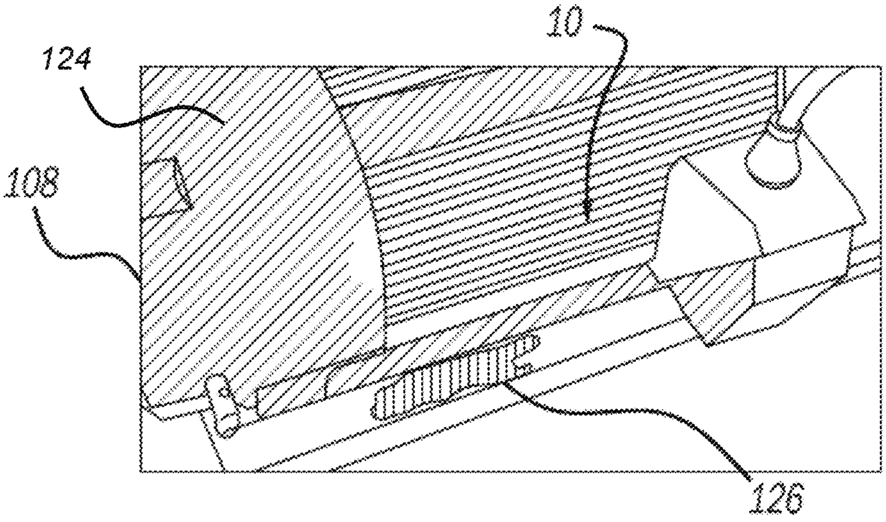
FIG. 17C illustrates an overlay model.

FIG. 17A through FIG. 17C illustrate a three-dimensional baseline model 104, three-dimensional working model 106, and three-dimensional overlay model 108, respectively. The three-dimensional object 10 depicted by the models is a motor. A difference 126 between the baseline model 104 and the working model 106 is shown. The difference 126 is an oil that has leaked onto the floor next to the motor. Moreover, the illumination of the motor's surface is darker in the working model 106 as compared to the baseline model 104, conveyed by comparatively heavier stippling in FIG. 17B. This could be due, for example, to less incident light upon the motor's surface. The overlay model 108 is an overlay of the baseline model 104 and the working model 106. The overlay model 108 illustrates areas of similarity 124 and areas of difference 126.

Figure 18A:
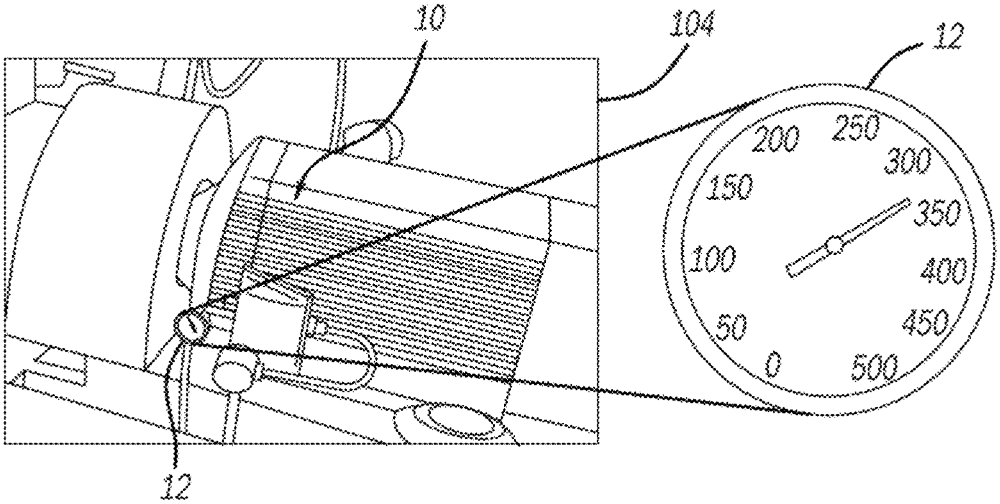
FIG. 18A illustrates a baseline model.
Figure 18B:
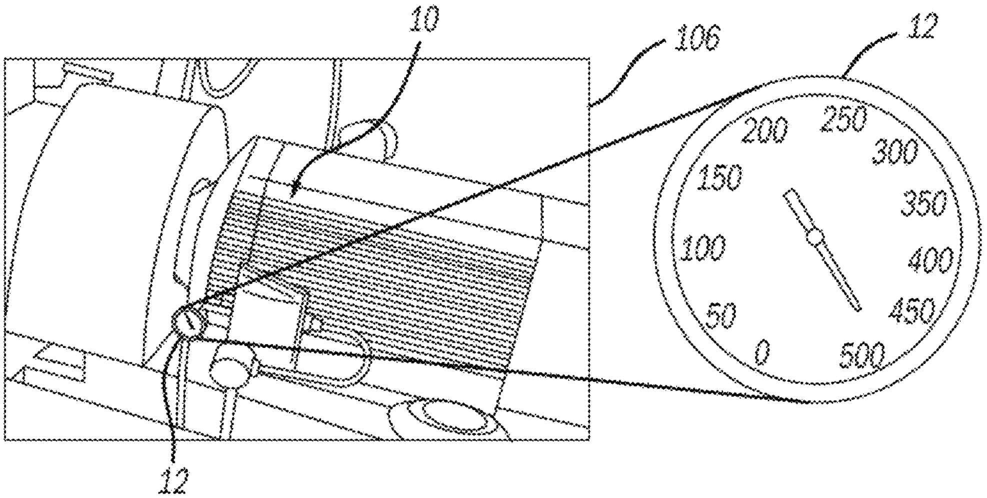
FIG. 18B illustrates a working model.
Figure 18C:
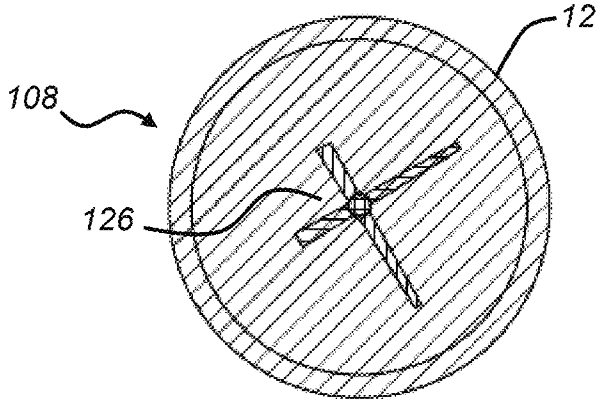
FIG. 18C illustrates an overlay model.

FIG. 18A through FIG. 18C illustrate a three-dimensional baseline model 104, three-dimensional working model 106, and three-dimensional overlay model 108, respectively. The three-dimensional object 10 depicted by the models is a motor and the object 10 includes a three-dimensional subcomponent 12, a pressure gauge. A difference 126 between the baseline model 104 and the working model 106 is shown, which is a differing angular position of an indicator (dial) on the pressure gauge. The overlay model 108 is an overlay of the baseline model 104 and working model 106. The overlay model 108 illustrates a difference in pressure between the time at which data for the baseline model 104 was obtained and the time at which data for the working model 106 was obtained.

Figure 19A:
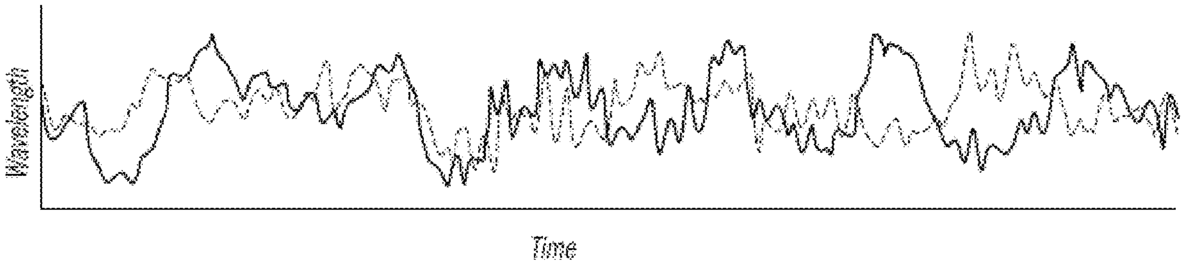
FIG. 19A illustrates an acoustic signature.
Figure 19B:
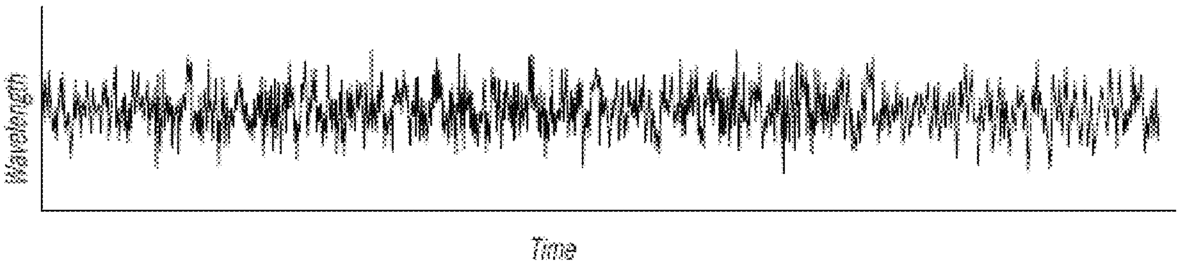
FIG. 19B illustrates an acoustic signature.

FIG. 19A and FIG. 19B illustrate acoustic signatures. In FIG. 18A, two acoustic signatures, indicated by solid and dashed lines, were obtained from two generally identical (e.g., same make and model) compressors. The compressors include rotating members (e.g., impellers) that perform generally repetitive movements. As a result, the acoustic signature appears to follow a general pattern. The acoustic signature of one compressor is distinguishable from the acoustic signature of the other compressor. Individual frequencies may be extracted from the acoustic signatures by a transformation (e.g., wavelet transform). By analyzing and comparing the acoustic signatures of each compressor, one may determine if an operating condition is abnormal. In FIG. 19B, an acoustic signature was obtained from a motor. The operation of the motor involves a plurality of moving parts (e.g., pistons) that frictionally engages other components of the motor (e.g., cylinders). As a result, the acoustic signature appears chaotic and irregular. Individual frequencies may be extracted from the acoustic signatures by a transformation (e.g., wavelet transform). In this manner, some analysis may be performed upon the chaotic and irregular acoustic signature. Inspection involving analyzing acoustic signatures and/or components thereof provides more insightful information of the inspected object than visual inspections, such as those performed in-person by a human inspector.

Figure 20A:
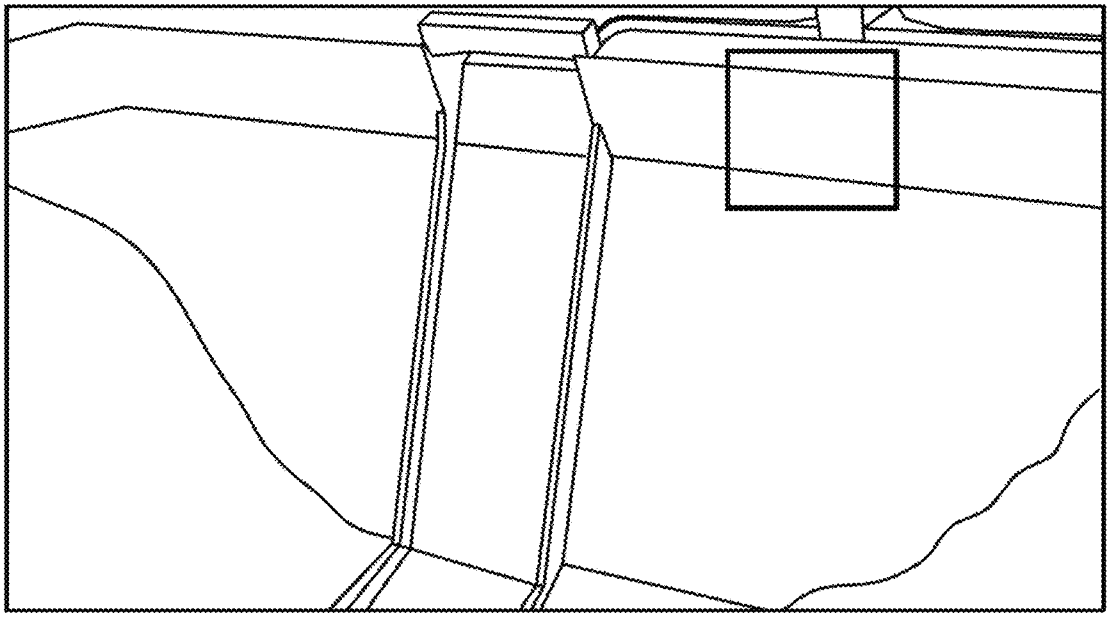
FIG. 20A illustrates a model with a visual signature.

FIG. 20A illustrates a model with a visual signature of a dam. The visual signature was captured by an aerial drone sensor apparatus at a distance and elevated from the dam.

Figure 20B:
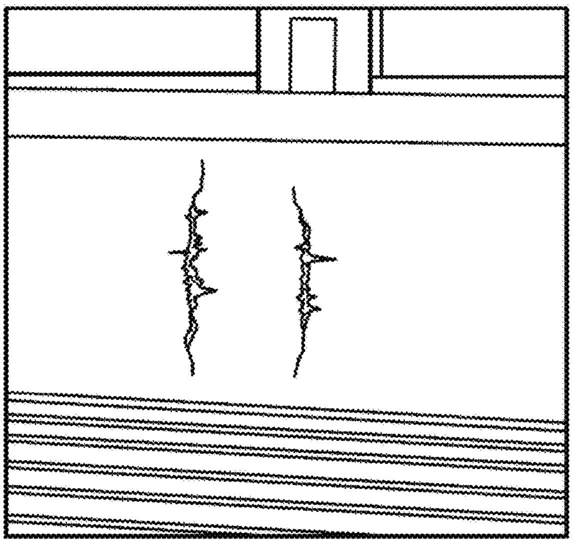
FIG. 20B illustrates a model with a visual signature.

FIG. 20B illustrates a model with a visual signature of the dam shown in FIG. 20A. The view of FIG. 20B is zoomed-in, relative to FIG. 20A, on the portion of FIG. 20A circumscribed by the box. FIG. 20B is focusing on water leakage on a surface of the dam. Around the leakage in the dam's surface, dried hard water deposits (area of the jagged lines) are observed, indicating leakage of water that has evaporated leaving the hard water deposits.

Figure 20C:
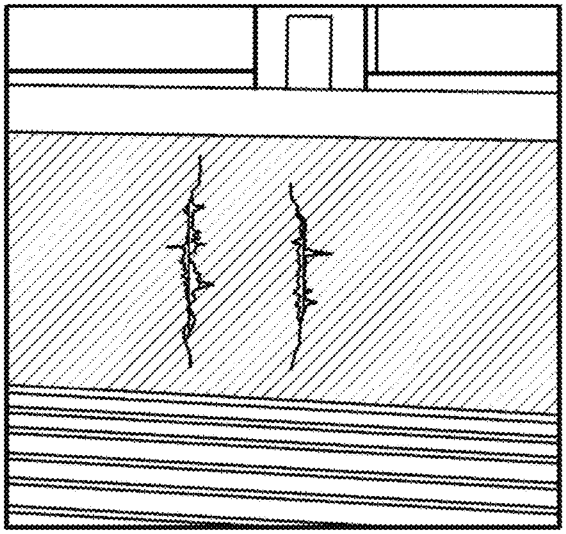
FIG. 20C illustrates a model with a thermal signature.

FIG. 20C illustrates a model with a thermal signature of the dam shown in FIG. 20A. The view of FIG. 20C is zoomed-in, relative to FIG. 20A, on the portion of FIG. 20A circumscribed by the box. FIG. 20C is focusing on water leakage on a surface of the dam. Around the leakage in the dam's surface, cooler portions of the dam's surface (area of the jagged lines) are observed relative to the surrounding surfaces (area filled with diagonal lines). The cooler portions correspond to water evaporation carrying heat away from the surfaces around the leakage.

By cross-referencing the visual signature of FIG. 20B and the thermal signature of FIG. 20C, a user can confirm the presence of an anomaly (water leakage) on the surface of the dam. Utilizing two different types of signatures to determine the presence of the same anomaly may be referred to herein as a joint analysis. That is, comparing different types of signatures can characterize the same anomaly. Referencing just one of the two types of signatures may inform a user that an anomaly is present but may not convey to a user the underlying cause of the anomaly, the underlying cause in this case being a water leak. By combining the analysis of two or more types of signatures, the underlying cause of the anomaly may be identified and/or confirmed by a user's inspection and/or autonomously. For instance, machine learning may be employed to identify the underlying cause of an anomaly by referencing a historical database of models comprising various anomalies. In this case, machine learning may reference a historical database of visual signature images of dried hard water deposits and thermal signature images of water evaporation and ultimately infer that the underlying cause of the anomaly is a water leak.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value is from 1 to 90, from 20 to 80, or from 30 to 70, it is intended that intermediate range values (such as for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints.

The use of "about" or "approximately" in connection with a range applies to both ends of the range. Thus, "about 20 to 30" is intended to cover "about 20 to about 30", inclusive of at least the specified endpoints.

The terms "generally" or "substantially" to describe measurements may mean about +/−10° or less, about +/−5° or less, or even about +/−1° or less. The terms "generally" or "substantially" to describe measurements may mean about +/−0.01° or greater, about +/−0.1° or greater, or even about +/−0.5° or greater.

REFERENCE NUMBERS

10—Three-dimensional object; 12—Three-dimensional subcomponents; 14—Pre-determined boundary; 16—Site; 20—Perimeter; 22—One or more surfaces; 24—One or more interfaces; 26—One or more surrounding spaces; 30—Plurality of attributes; 31A—Points in physical space; 31B—Color; 31C—Illuminance; 31D—Thermal signature; 31E—Acoustic signature; 31F—Vibration signature; 31G—Chemical signature; 32—Identity; 34—One or more properties; 36—One or more operating conditions; 38—Data collection and processing system; 40—Sensor apparatus; 42—Plurality of sensors; 43A—Camera sensor; 43B—LiDAR sensor; 43C—Thermal sensor; 43D—Acoustic sensor; 43E—Vibration sensor; 43F—Chemical sensor; 44—Battery; 46—Power port; 48—Data port; 49—Signal connection; 50—Network module; 52—Location module; 60—Docking station; 62—Frame; 64—Track; 66—Plurality of different positions; 67A—First time; 67B—Second time; 68—Path; 70—Computing device; 72—Graphical user interface; 74—Menu; 80—Processor; 82—Storage medium; 84—Database; 85—Database server; 86—Application server; 88—Network; 100—Catalog; 102—Pre-fabricated three-dimensional model; 103—Boundary model; 104—Three-dimensional baseline model; 106—Three-dimensional working model; 108—Three-dimensional overlay model; 109—Visual reproduction; 110—Data set; 111—Data sub-set; 112—Collocated data set; 120—Size; 122—Noise; 124—Similarity; 126—Difference; 130—Visual indicator; 131—Absolute deviation; 132—Color gradient; 134—Binary deviation; 136—Color binary; 138A—First hue; 138B—Second hue; 138C—Third hue; 140A—First color; 140B—Second color. 141—Acquire a first data set at a first time; 142—Collocate the first data set; 144—Retrieve pre-fabricated three-dimensional models; 145—Designate the first three-dimensional models as first three-dimensional baseline models; 146—Interpret the first collocated data set; 147—Receive the identity of the objects of the three-dimensional baseline models; 150—Acquire a second data set at a second time; 152—Collocate the second data set; 154—Interpret the second collocated data set by comparison to pre-fabricated three-dimensional models; 155—Interpret the second collocated data set by comparison to first three-dimensional working models; 156—Compare the first and second collocated data set; 158—Determine the similarities and/or differences between the first and second collocated data set; 170—Discard extraneous data; 171—Combine data sub-sets; 172—Compensate for differences in illuminance; 174—Compress the first data set and/or the second data set; 180—Overlay one or more three-dimensional models resulting in a three-dimensional overlay model; 182—Display visual indicators of the similarities and/or differences on a visual reproduction; 184—Summarize the differences into a report; 200—Roving operation; 202—Stationary operation; 204—Mutually relative motion operation; 210—Correct for a positional variance between sensors; 212—Calculate a mean of quantitative values associated with points in physical space captured from different positions; 214—Correct for an angle of incidence between a sensor relative to a point in physical space; 216—Correct for sensor variance; 218—Prioritize similarities and/or differences; 220—Adjust an operating condition; 222—Calculate a gauge reading; 224—Calculate a gauge reading; 226—Compare operating states of three-dimensional objects; 228—Deploy a diagnostic device.

What is claimed is:

1. A method for performing an autonomous inspection comprising:

traversing, by an autonomous sensor apparatus, a path through a site having one or more three-dimensional objects located therein, wherein a plurality of sensors are on-board the autonomous sensor apparatus, wherein the plurality of sensors includes a camera sensor, a thermal sensor, and a chemical sensor, and wherein at least one sensor of the plurality of sensors is configured to sense a location of one or more points on at least one surface of the one or more three-dimensional objects;

obtaining, by the plurality of sensors, one or more data sets along the path, each of the one or more data sets including one of a plurality of attributes of the one or more three-dimensional objects, wherein the plurality of attributes include the location of the one or more points, a visual signature at the location of the one or more points, a thermal signature at the location of the one or more points, and a chemical signature at the location of the one or more points, wherein the plurality of sensors obtain the one or more data sets from a plurality of different positions of the plurality of sensors along the path relative to the one or more points on the at least one surface of the one or more three-dimensional objects;

collocating, by at least one processor, the one or more data sets by assigning three-dimensional coordinates, wherein the assigned three-dimensional coordinates correspond to the location of the one or more points on the at least one surface of the one or more three-dimensional objects and each assigned three-dimensional coordinate corresponds individually to data points in the one or more data sets based on the location of the one or more points on the at least one surface of the one or more three-dimensional objects to produce a collocated data set, wherein the data points are the visual signature, the thermal signature, and the chemical signature that are arranged in a point cloud;

generating, by the at least one processor, a working model from the collocated data set by first determining the plurality of different positions of the plurality of sensors with respect to the one or more three-dimensional objects and then projecting the one or more data sets onto the working model;

comparing, by the at least one processor, the working model with i) a baseline model of the one or more three-dimensional objects, the baseline model either being provided by an original equipment manufacturer, being created in accordance with a planned construction of the one or more three-dimensional objects, or both and ii) one or more pre-existing models to determine a presence and/or an absence of anomalies, wherein the comparing with the one or more pre-existing models includes comparing each of the data points of the working model to data points having corresponding three-dimensional coordinates of the one or more pre-existing models;

defining, by the at least one processor, criticality of the anomalies; and adjusting, autonomously by a respective controller of the one or more three-dimensional objects, one or more operating conditions of the one or more three-dimensional objects based on the determined anomalies, wherein the adjusting of the one or more operating conditions includes adjusting a temperature, adjusting a speed, adjusting a frequency, adjusting a fluid flow, or any combination thereof of the one or more three-dimensional objects.

2. The method according to claim 1, further comprising correcting the one or more data sets for a positional variance between the plurality of sensors, wherein the positional variance is corrected by a distance between the plurality of sensors; or the positional variance is corrected by a distance between each of the plurality of sensors and a point of reference.

3. The method according to claim 1, further comprising receiving, by the at least one processor, an overlay model, wherein the overlay model is an overlay of the working model, the baseline model, and the one or more pre-existing models, wherein the working model, the baseline model, the one or more pre-existing models, and the overlay model are three-dimensional digital models of the one or more three-dimensional objects, including the at least one surface thereof and including the plurality of attributes of the one or more three-dimensional objects.

4. The method according to claim 1, further comprising:

departing, by the autonomous sensor apparatus, a docking station; and returning the autonomous sensor apparatus to the docking station.

5. The method according to claim 1, further comprising orienting toward, by the autonomous sensor apparatus and/or the plurality of sensors that are on-board the autonomous sensor apparatus, the one or more three-dimensional objects.

6. The method according to claim 1, further comprising pre-processing, by the at least one processor, the one or more data sets including: a) compensating, by the at least one processor, for differences in illuminance with two-dimensional image data; b) removing, by the at least one processor, extraneous sensed data that is not associated with the at least one surface of the one or more three-dimensional objects; and c) compressing the one or more data sets.

7. The method according to claim 6, wherein the pre-processing further comprises one or more of:

combining, by the at least one processor, data sub-sets, wherein the data sub-sets are associated with redundant data obtained by each of the plurality of sensors which reduce a digital memory size occupied by the one or more data sets on a non-transitory storage medium and/or reduce noise of the one or more data sets;

correcting, by the at least one processor, the one or more data sets for a positional variance between the plurality of sensors, wherein the positional variance is corrected by a distance between the plurality of sensors or the positional variance is corrected by a distance between each of the plurality of sensors and a point of reference;

calculating, by the at least one processor, a mean of quantitative values associated with each of the one or more points on the at least one surface of the one or more three-dimensional objects obtained from the plurality of different positions along the path; and correcting, by the at least one processor, an angle of incidence of the plurality of sensors relative to the one or more points on the one or more three-dimensional objects, the angle of incidence being defined by the plurality of different positions of the plurality of sensors relative to an orthogonal axis of the one or more points on the at least one surface of the one or more three-dimensional objects.

8. The method according to claim 1, further comprising:

obtaining an acoustic signature comprising acoustic data of the one or more three-dimensional objects, the acoustic data including a number of samples collected over a period of time;

deriving a first acoustic fingerprint from the acoustic signature at a first time in the period of time;

deriving a second acoustic fingerprint from the acoustic signature at a second time in the period of time; and detecting a change in the one or more operating conditions by comparing, via the at least one processor, the first acoustic fingerprint and the second acoustic fingerprint.

9. The method according to claim 1, wherein the one or more pre-existing models are constructed of one or more prior data sets obtained earlier in time relative to the one or more data sets, or by computer assisted design software; and wherein an identity of the one or more pre-existing models is pre-identified by a human operator.

10. The method according to claim 1, further comprising retrieving, by the at least one processor, the one or more pre-existing models from at least one storage medium.

11. The method according to claim 1, wherein the plurality of attributes further includes an acoustic signature, a vibration signature, or any combination thereof.

12. The method according to claim 1, wherein a plurality of attributes for normal operating conditions of the one or more three-dimensional objects are defined in the baseline model and/or the one or more pre-existing models; and wherein the method further comprises autonomously determining, by the at least one processor, differences between a current state of the plurality of attributes and the normal operating conditions of the plurality of attributes.

13. The method according to claim 1, wherein the at least one processor comprises multiple processors, and said collocating, generating, comparing, defining, and adjusting are performed by distributing computational functions among the multiple processors.

14. The method according to claim 1, wherein each position of the plurality of different positions is arranged at a distance of no more than 10 meters from the one or more three-dimensional objects.

15. The method according to claim 1, wherein the chemical sensor comprises a tunable diode laser sensor.

16. The method according to claim 1, wherein the autonomous sensor apparatus comprises a ground-mobile robot.

17. The method according to claim 1, wherein the autonomous sensor apparatus comprises an air-mobile drone.

* * * * *